July 24, 1934.   DU VAL R. GOLDTHWAITE   1,967,238
METHOD OF AND MEANS FOR PRODUCING MUSICAL TONES
Filed Sept. 14, 1928    23 Sheets-Sheet 1
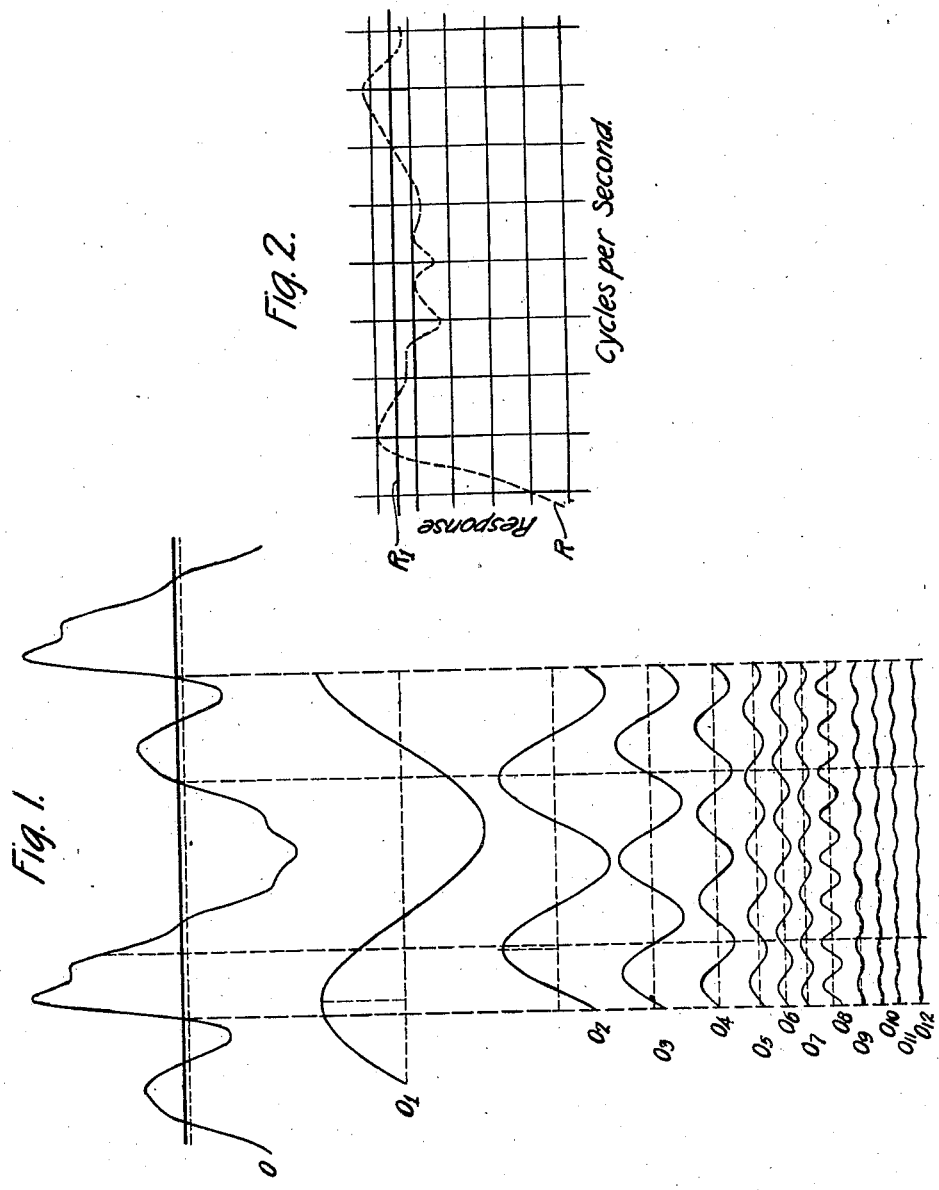
INVENTOR
du Val R. Goldthwaite.
BY
ATTORNEYS July 24, 1934. DU VAL R. GOLDTHWAITE 1,967,238
METHOD OF AND MEANS FOR PRODUCING MUSICAL TONES
Filed Sept. 14, 1928 23 Sheets-Sheet 2

INVENTOR
du Val R. Goldthwaite.
BY
ATTORNEYS

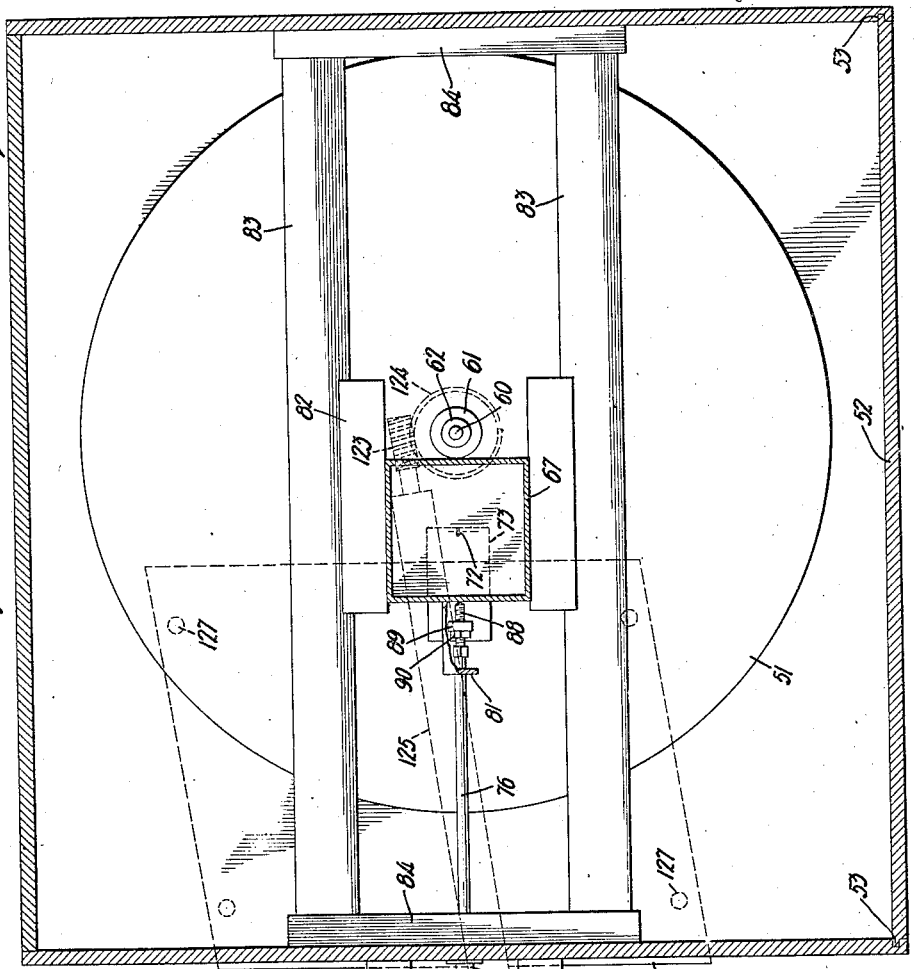

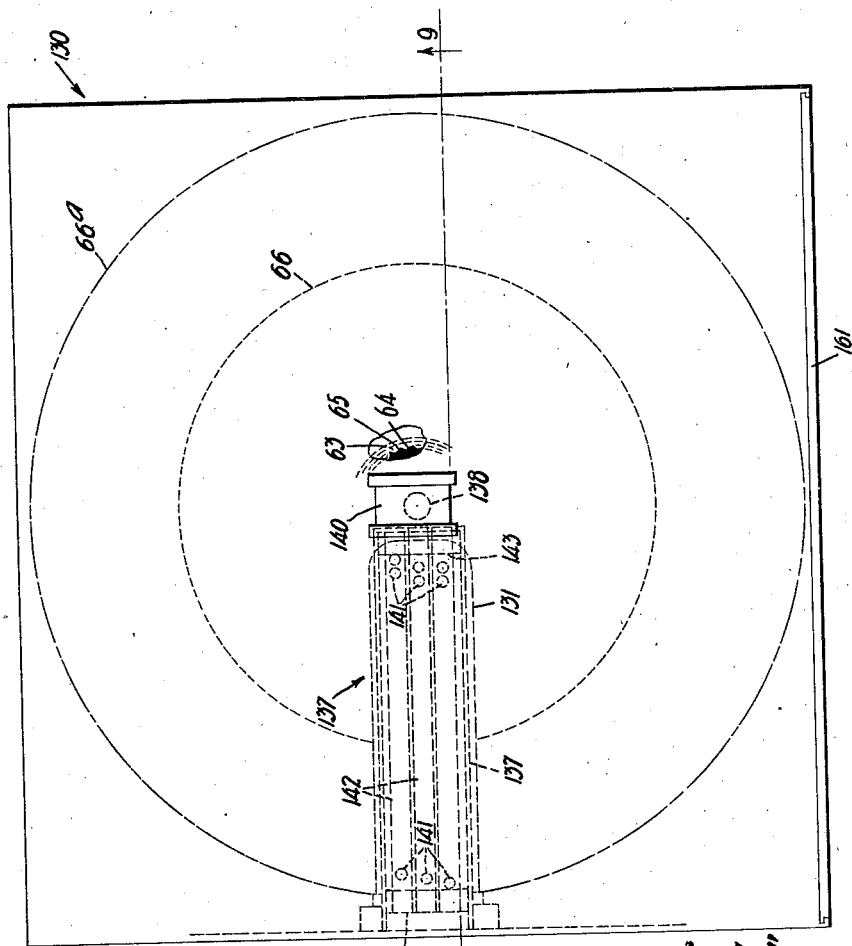
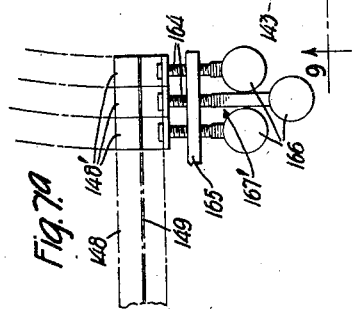
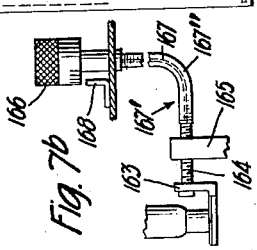

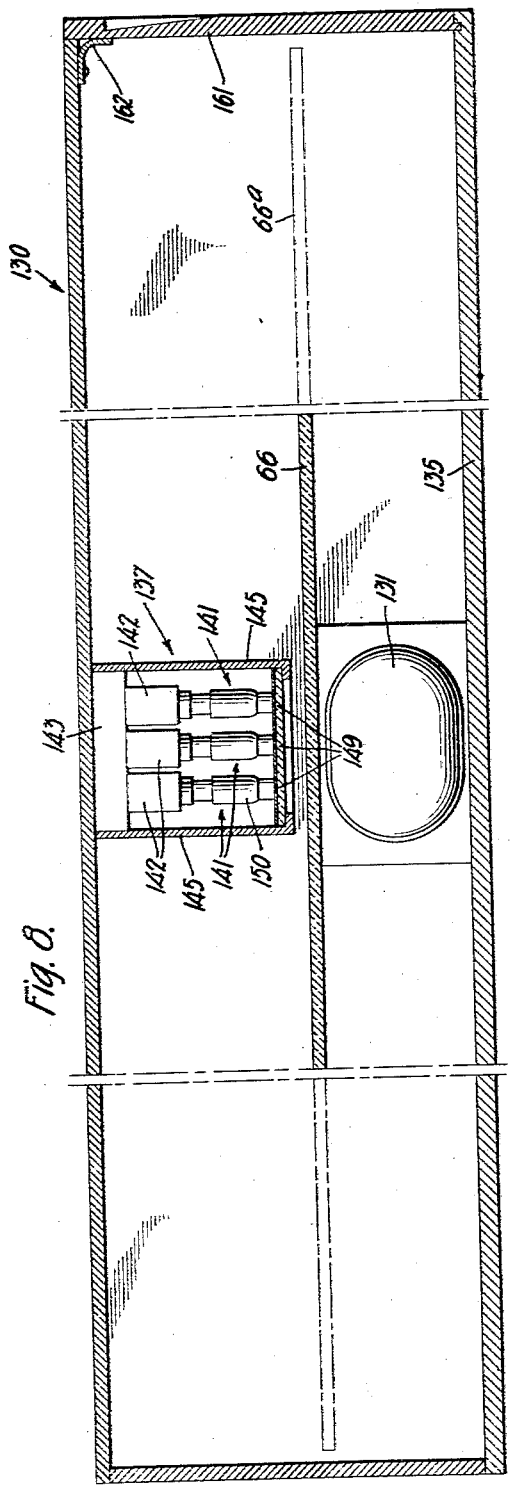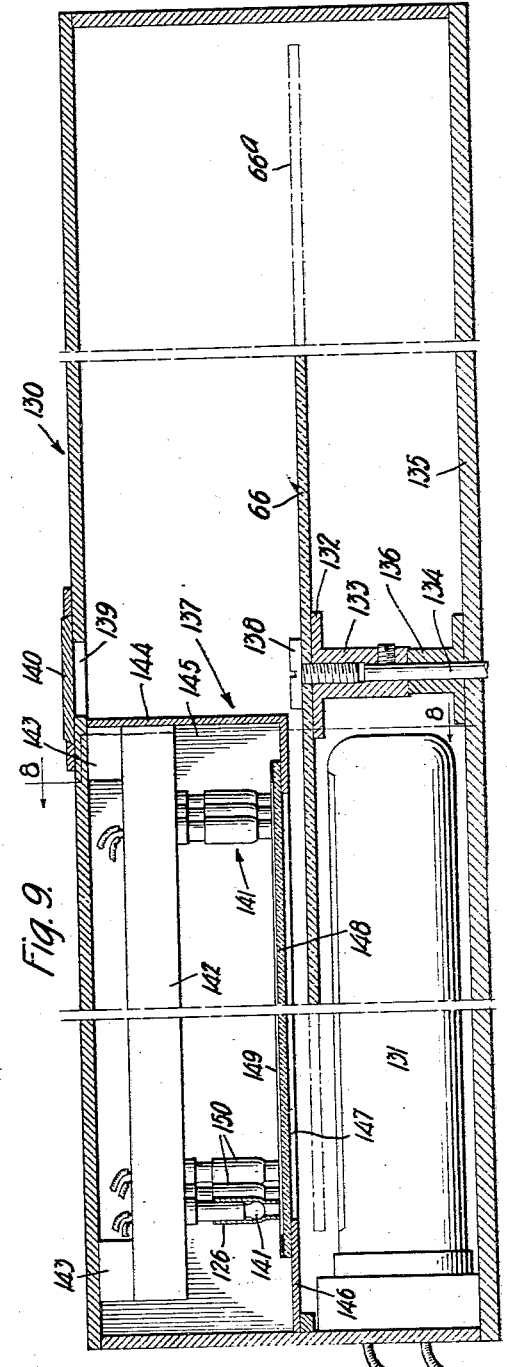

July 24, 1934.  DU VAL R. GOLDTHWAITE  1,967,238
METHOD OF AND MEANS FOR PRODUCING MUSICAL TONES
Filed Sept. 14, 1928  23 Sheets-Sheet 6
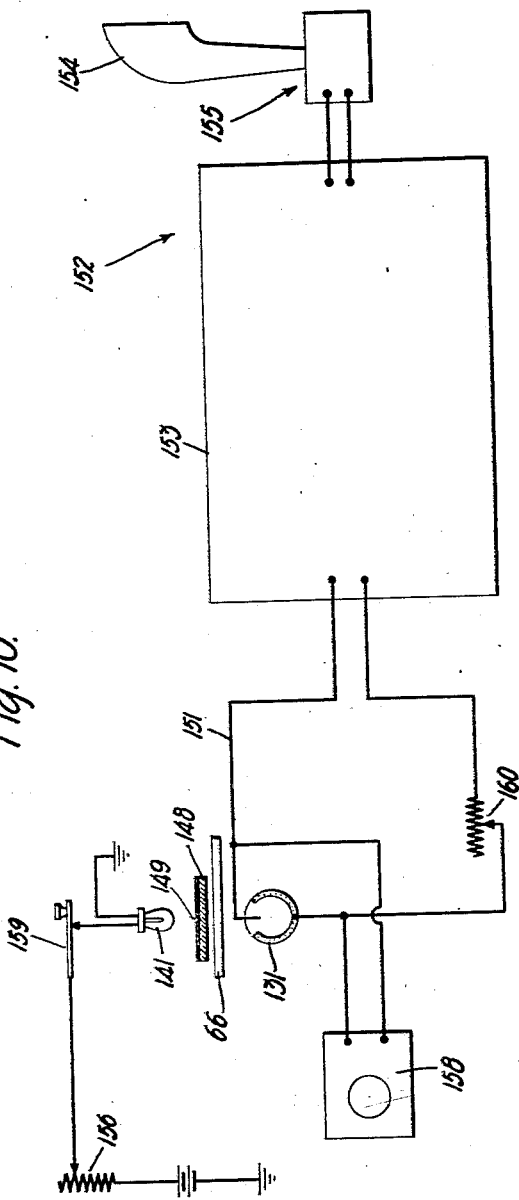
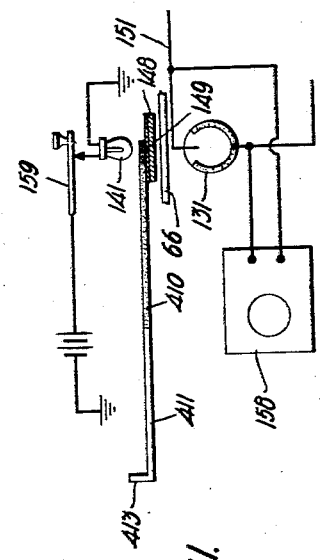
INVENTOR
du Val R. Goldthwaite.
BY
ATTORNEYS

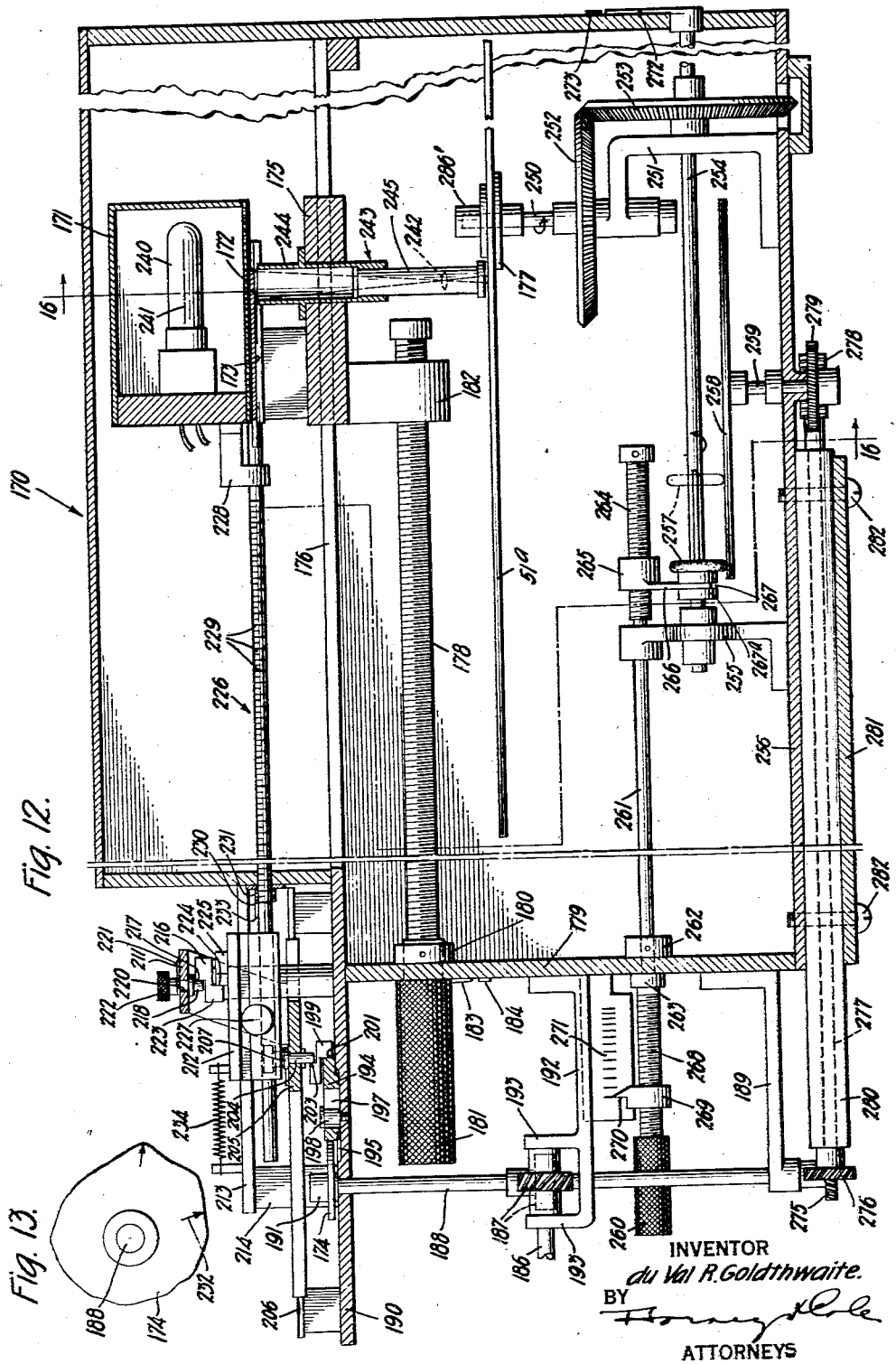

July 24, 1934. DU VAL R. GOLDTHWAITE 1,967,238
METHOD OF AND MEANS FOR PRODUCING MUSICAL TONES
Filed Sept. 14, 1928   23 Sheets-Sheet 8

Fig. 14.

INVENTOR
du Val R. Goldthwaite.
BY
ATTORNEYS

July 24, 1934. DU VAL R. GOLDTHWAITE 1,967,238
METHOD OF AND MEANS FOR PRODUCING MUSICAL TONES
Filed Sept. 14, 1928 23 Sheets-Sheet 11

INVENTOR
du Val R. Goldthwaite.
BY
ATTORNEYS

July 24, 1934. DU VAL R. GOLDTHWAITE 1,967,238
METHOD OF AND MEANS FOR PRODUCING MUSICAL TONES
Filed Sept. 14, 1928 23 Sheets-Sheet 12

INVENTOR
du Val R. Goldthwaite.
BY
ATTORNEYS

July 24, 1934.   DU VAL R. GOLDTHWAITE   1,967,238
METHOD OF AND MEANS FOR PRODUCING MUSICAL TONES
Filed Sept. 14, 1928   23 Sheets-Sheet 13
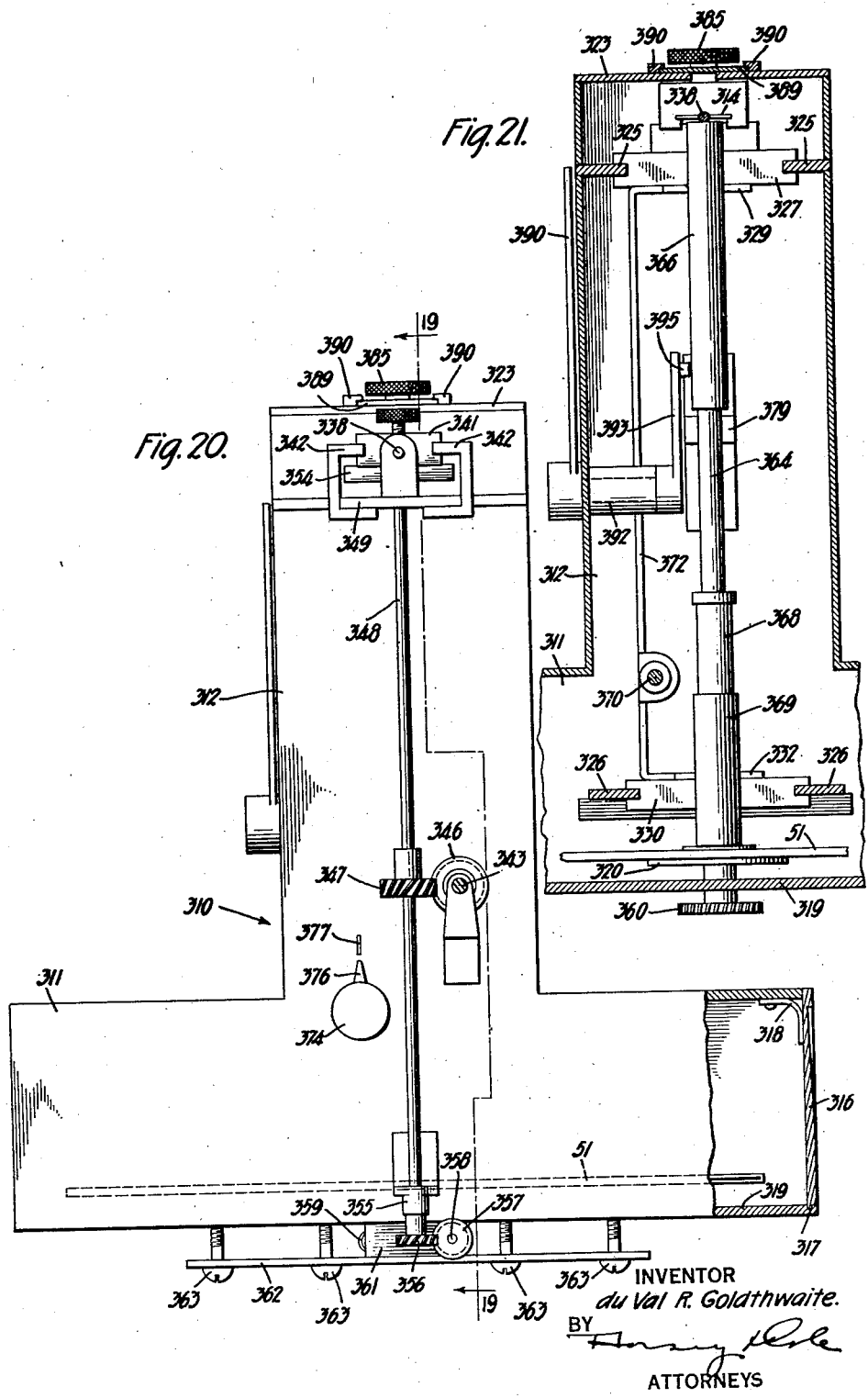
INVENTOR
du Val R. Goldthwaite.
BY
ATTORNEYS

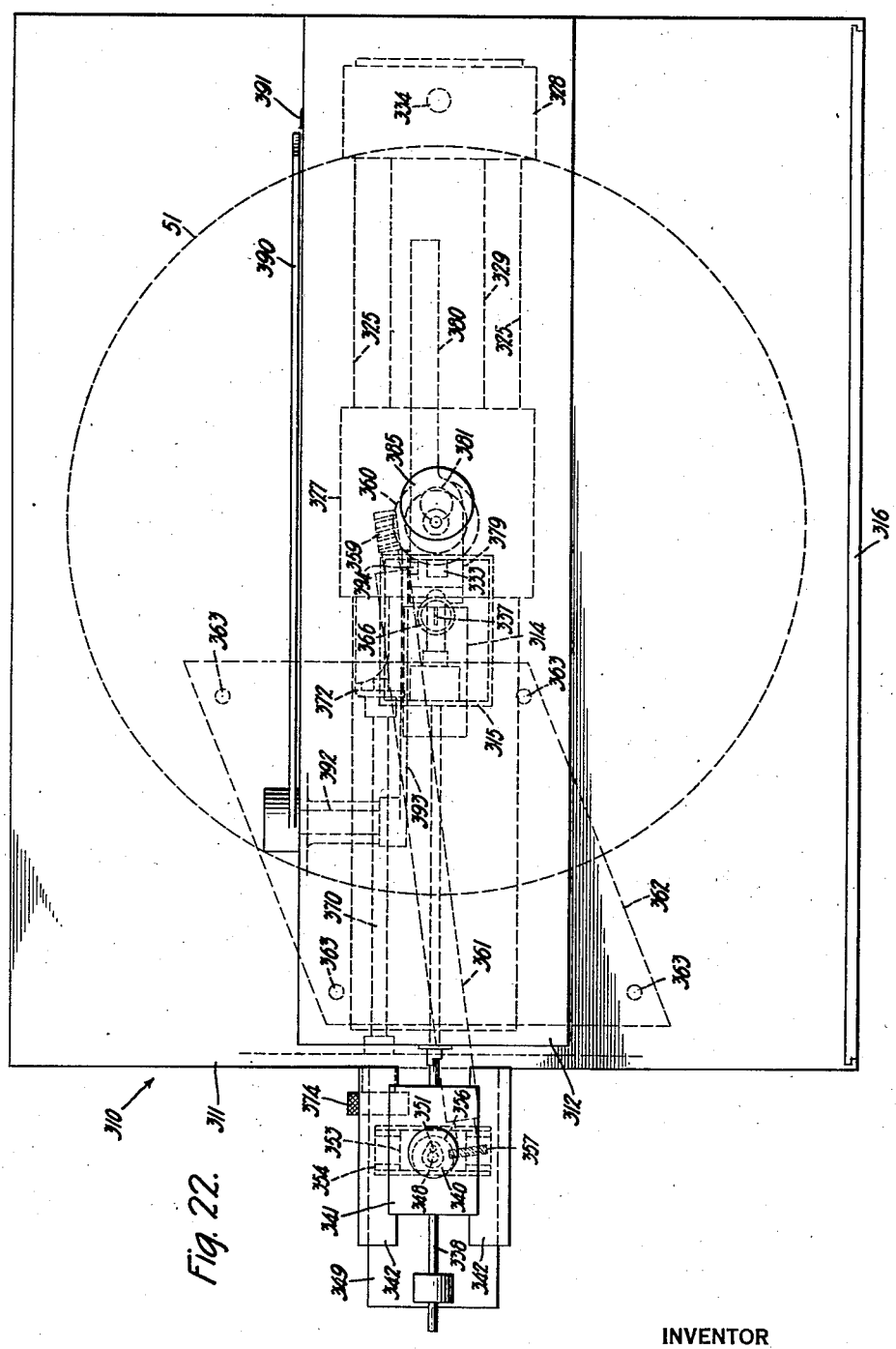

July 24, 1934.  DU VAL R. GOLDTHWAITE  1,967,238
METHOD OF AND MEANS FOR PRODUCING MUSICAL TONES
Filed Sept. 14, 1928  23 Sheets-Sheet 15

INVENTOR
du Val R. Goldthwaite.
BY
ATTORNEYS

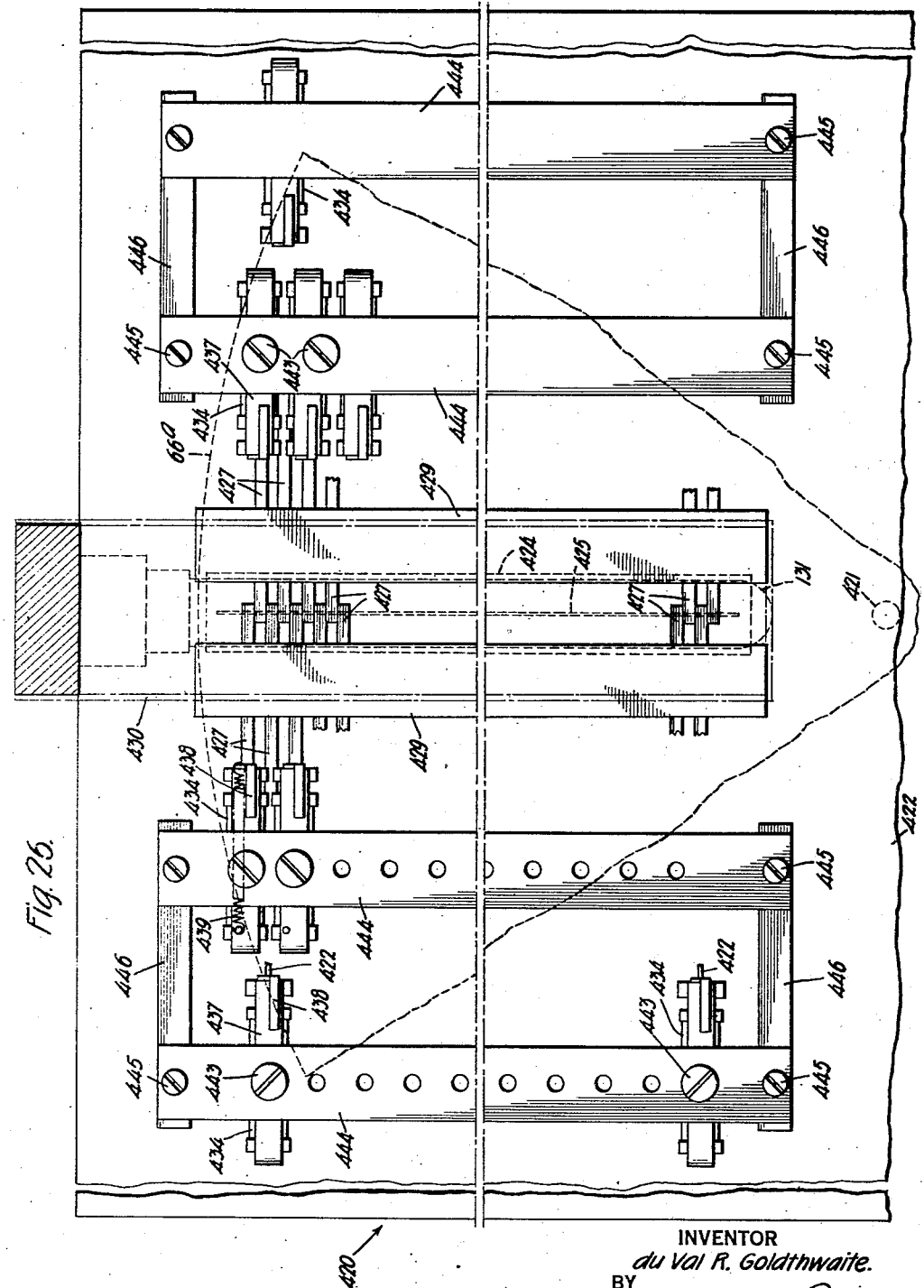

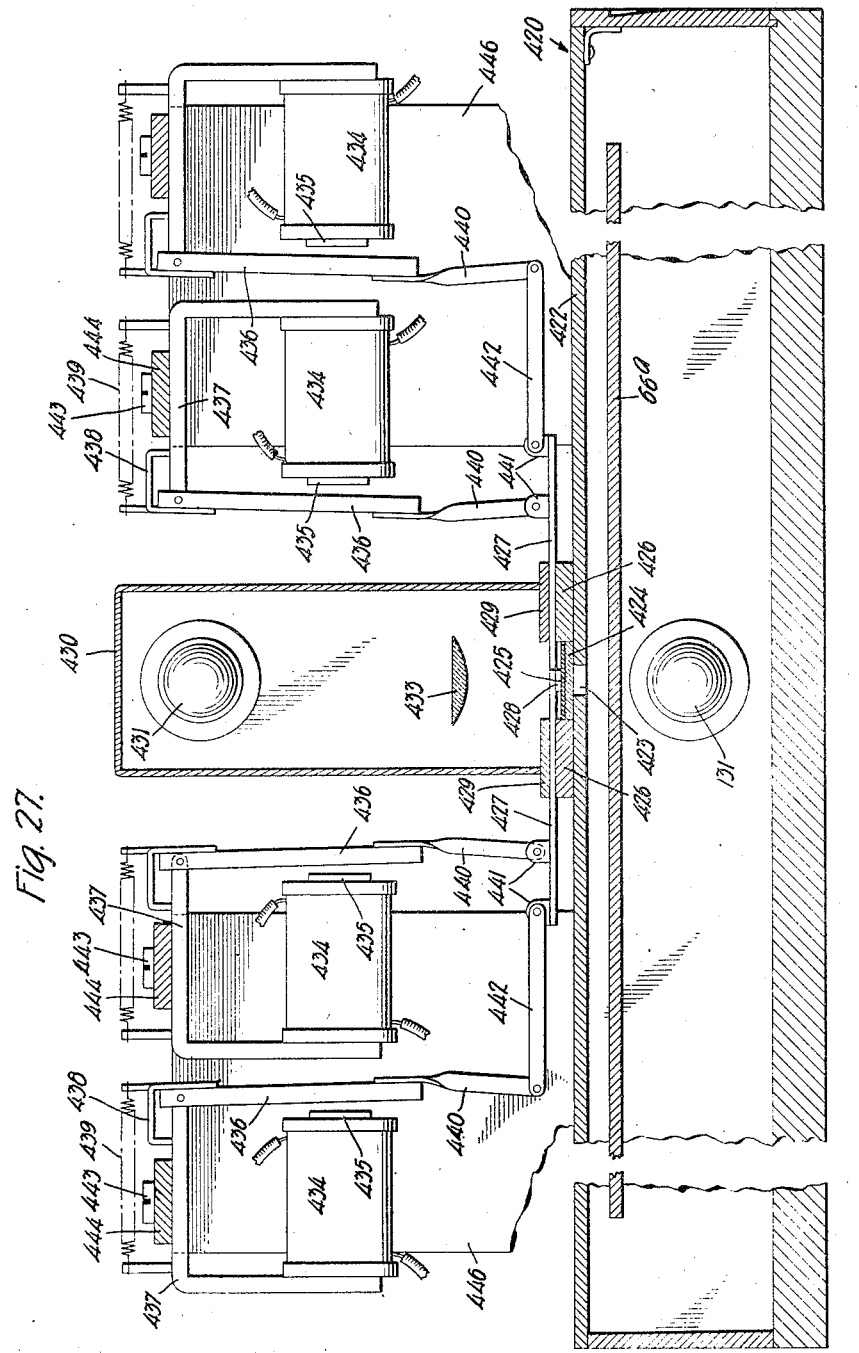

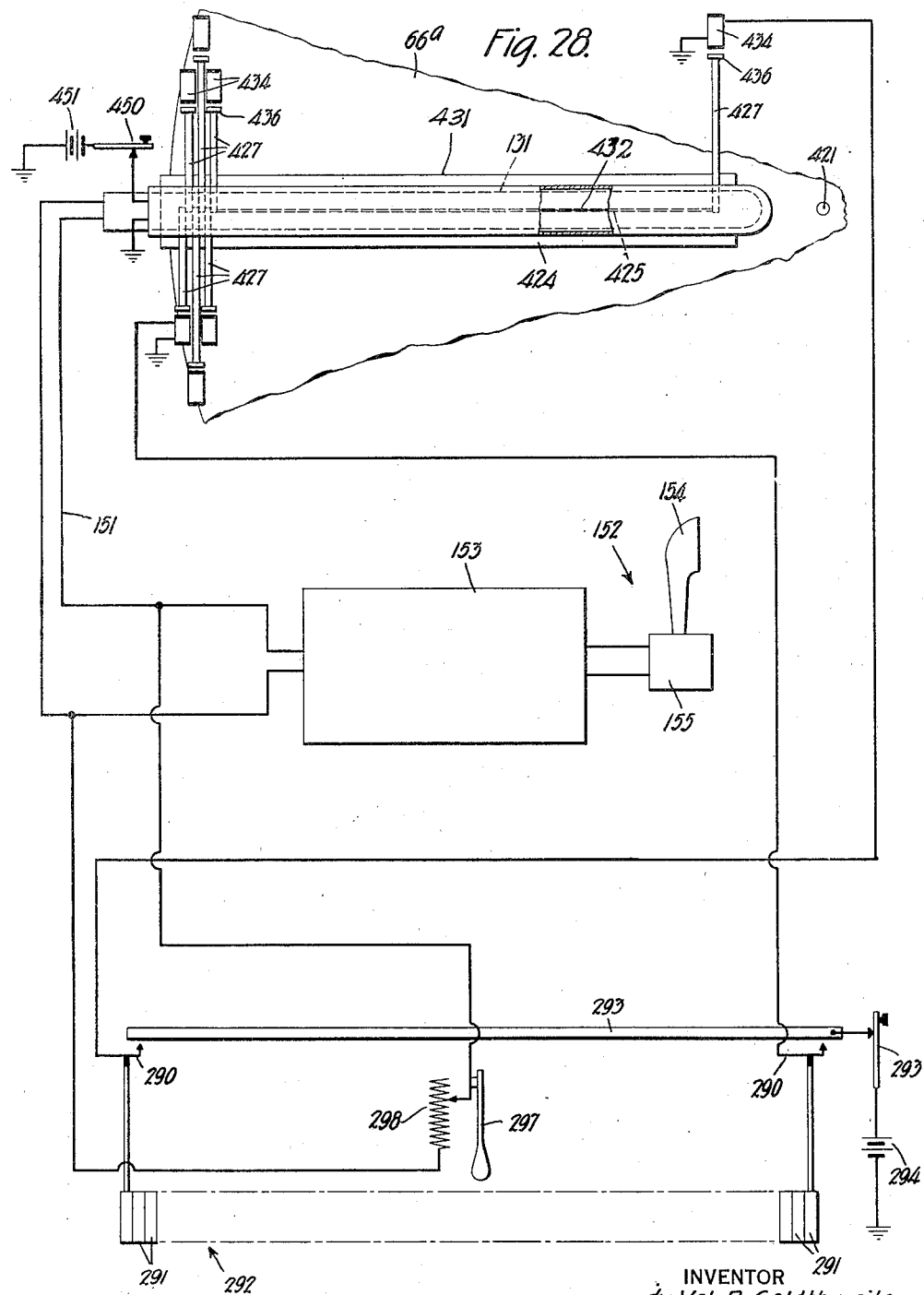

July 24, 1934. DU VAL R. GOLDTHWAITE 1,967,238
METHOD OF AND MEANS FOR PRODUCING MUSICAL TONES
Filed Sept. 14, 1928 23 Sheets-Sheet 19
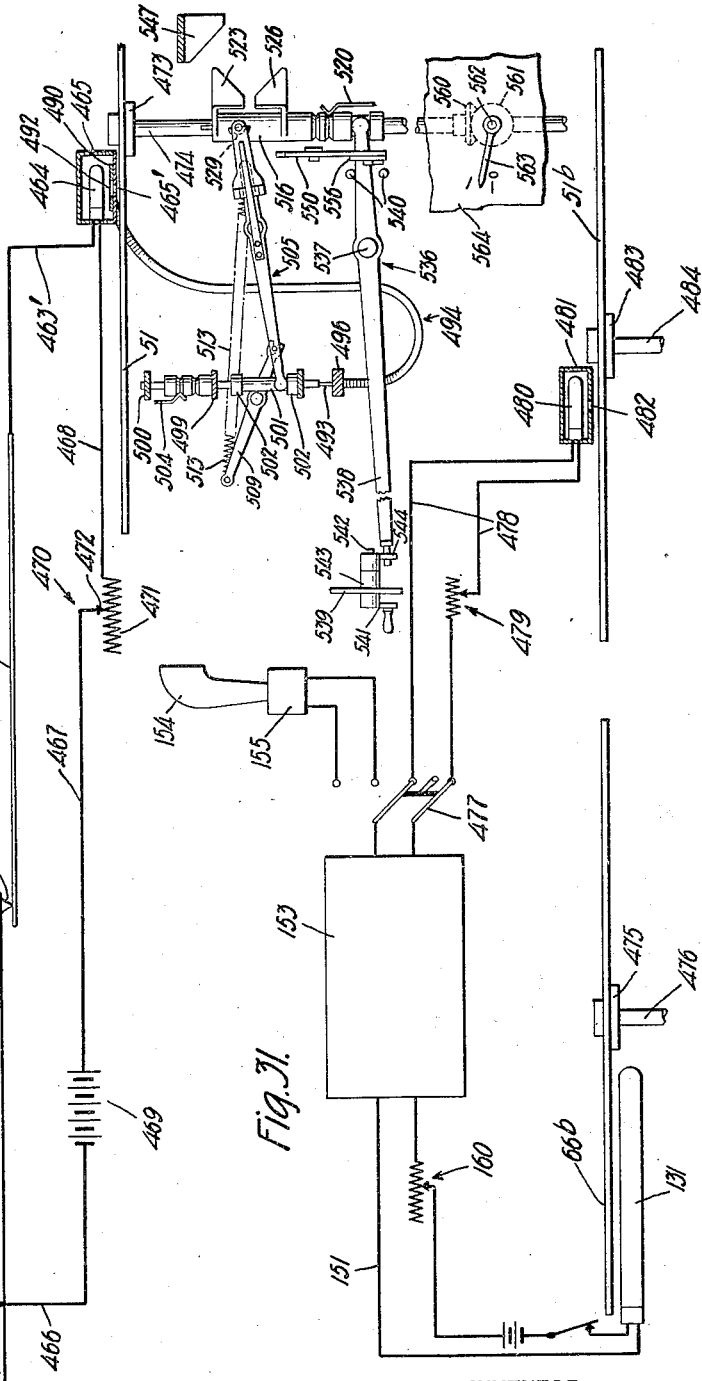
INVENTOR
duVal R. Goldthwaite.
BY
ATTORNEYS

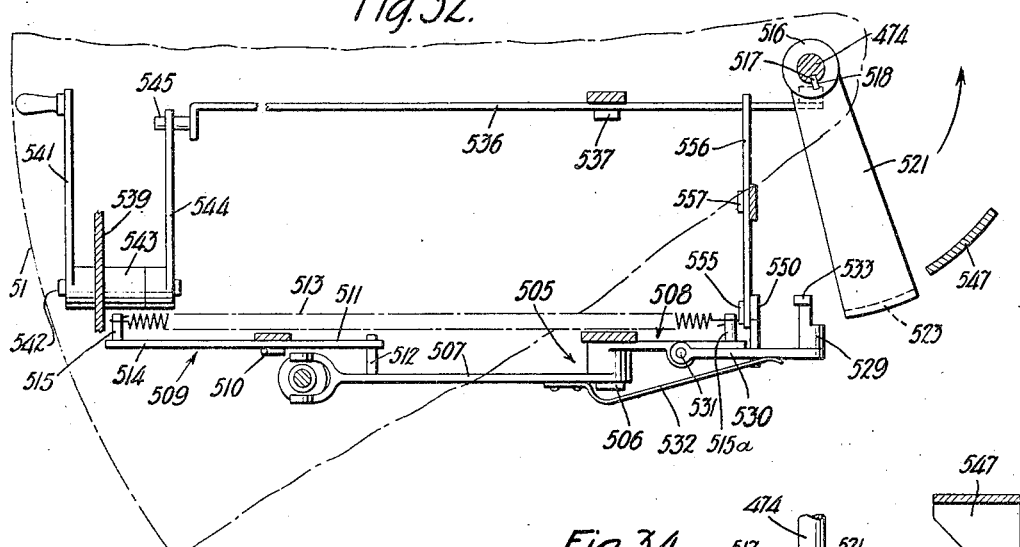
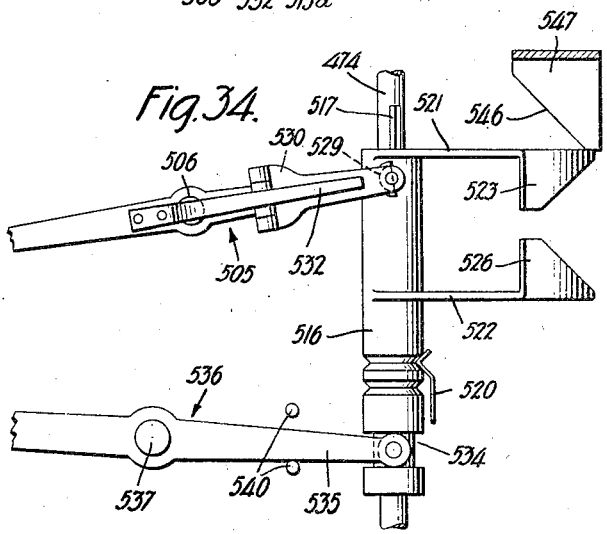
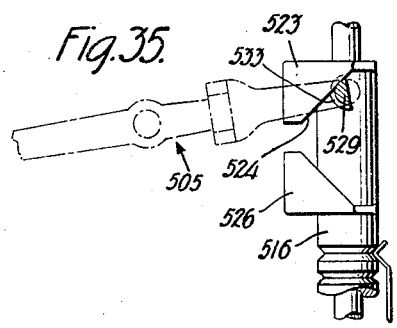

July 24, 1934.   DU VAL R. GOLDTHWAITE   1,967,238
METHOD OF AND MEANS FOR PRODUCING MUSICAL TONES
Filed Sept. 14, 1928   23 Sheets-Sheet 21

INVENTOR
du Val R. Goldthwaite
BY
ATTORNEYS

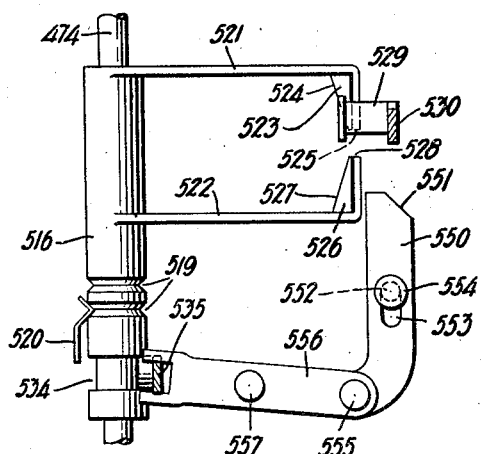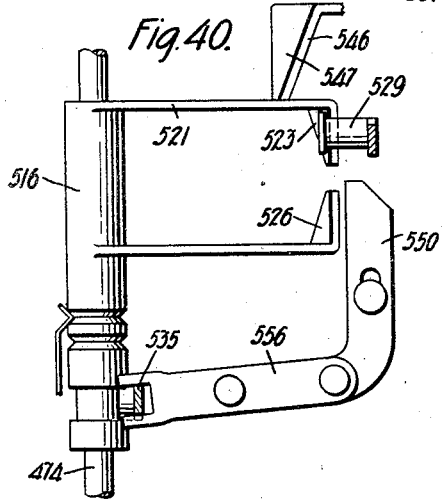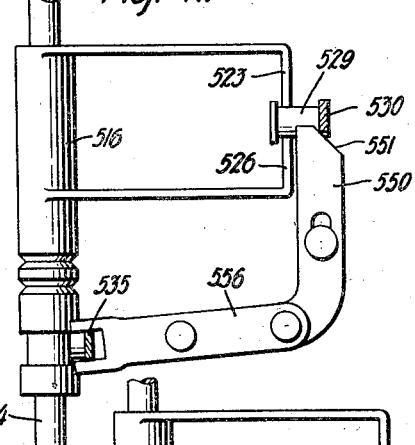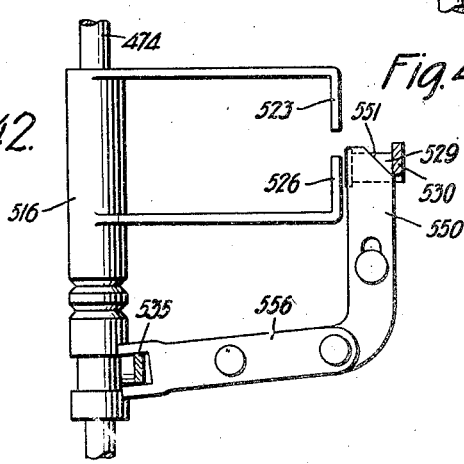

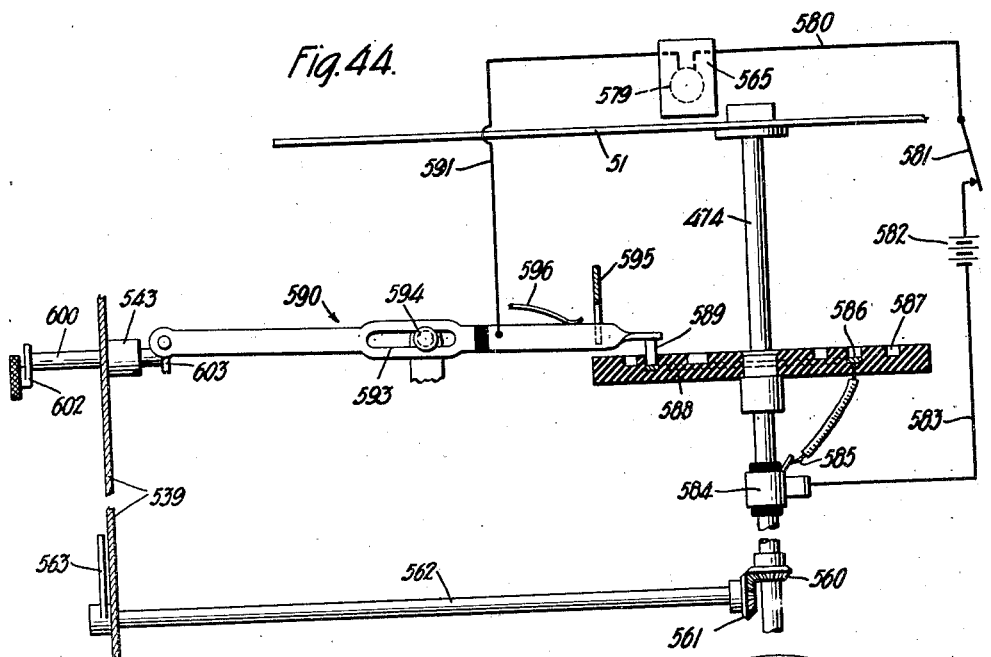
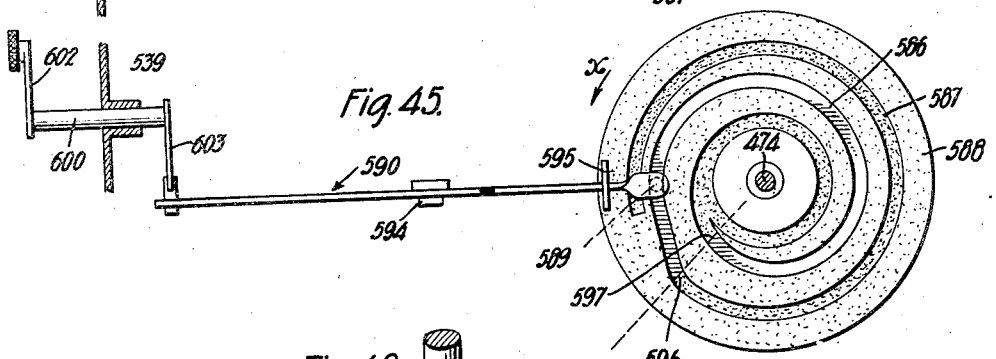
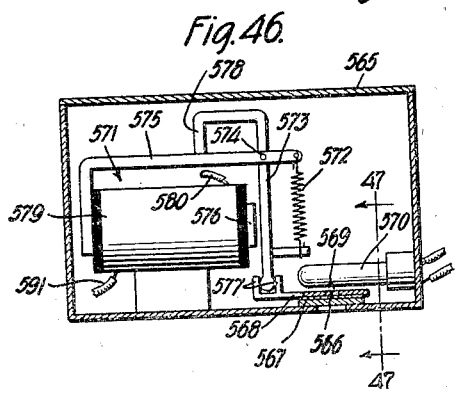

Patented July 24, 1934

1,967,238

UNITED STATES PATENT OFFICE 1,967,238

METHOD OF AND MEANS FOR PRODUCING MUSICAL TONES

Du Val R. Goldthwaite, New York, N. Y.

Application September 14, 1928, Serial No. 305,964

212 Claims. (Cl. 84—1)

This invention relates to methods of and means for producing musical tones. The invention is carried out in part by selectively varying the current in an electrical circuit operatively connected with a sound producer; for example, an electrical amplifier and one or more loudspeakers, by correspondingly varying the amount of light falling upon a light-sensitive device, in the circuit, such for example, as a photo-electric cell, which varies electric constants or the like in such circuit in response to the amount of light to which it is subjected. The object of the invention is the selective production of musical tones of desired quality and pitch combined or singly, at the will of the operator.

Musical instruments fall into two distinct groups:

(1) Those instruments such as the pipe organ, saxaphone, violin, etc., by means of which an artist may—within the pitch, volume and quality limitations of the particular instrument—selectively produce musical sounds at will; (2) those instruments commonly termed phonographs which with more or less distortion reproduce, from suitable records, musical sounds which have first been produced on one of the instruments referred to in the first group. The human vocal cords may be said to fall within the classification of the first group.

The playing instrument described herein, called for convenience the "musigraph", permits the operator selectively to produce musical tones at will; it is therefore properly classified with musical instruments, e. g., the pipe organ, saxaphone, violin, etc., and is distinctly not a phonograph.

In carrying out the present invention, advantage is taken of the following principles of acoustics:

(1) The sounding of notes on a pipe organ, saxaphone or other musical instrument causes, through vibration of the instrument's sounding body, periodic condensations and rarefactions in the air termed sound waves which produce on the human ear tones characteristic of the instrument played.

(2) Every periodic sound wave which corresponds with a complex musical tone or composite sound or summation of a plurality of musical tones, is capable of being analyzed into a plurality of simple pendular vibrations made by the sounding body, and each simple pendular vibration corresponds with a pure simple tone called a partial. Further, each of these simple pendular vibrations may be accurately represented graphically by a sine curve, the width or period of which in a uniform plotting represents the time or frequency factor, indicating the pitch, and the height of which represents the amplitude which for any particular frequency, indicates the intensity.

Conversely, the amplitude and frequency factors of all of the partials of a periodic complex musical tone having been determined, the sound wave which would produce this complex tone can be shown graphically by the addition of the ordinates of the sine curves representing the component partials.

(3) The quality or timbre of a periodic musical tone depends solely on the number and relative intensities of its simple partial tones.

(4) The combination of a fundamental tone, that is, the partial having the lowest frequency of a given tone, and the remaining partials, termed overtones, is harmonic only when the frequencies of the fundamental and its successive overtones bear the same relationship to each other as the whole integral numbers 1:2:3:4, etc.

(5) The intensity of a simple sound is proportional to the square of the amplitude multiplied by the square of the frequency. The loudness of a simple sound is a function of its intensity, and this is equally true of a complex tone.

It is readily understood, in view of the above principles of acoustics, that periodic musical tones of any desired quality can be created by controlling a suitable sounding body in such a way as to cause it to vibrate with a periodic motion which is the sum of a number of simple pendular vibrations, the frequencies and amplitudes of which bear the proper relationship to each other and are variable at will. An important part of the present invention relates to a new and novel method of and means for accomplishing this result.

The building up or synthesizing of a tone of a desired quality is accomplished by means of a combination of apparatus which for convenience may be termed the "harmonizer". As will be more clearly understood subsequently, such tone synthesis on the harmonizer is principally for the purpose of empirically determining the waveform characteristics of a tone of desired quality preparatory to making a primary pattern to be utilized in the production of a musigraph light-controlling sound record.

The harmonizer consists in part of a current varying instrument operatively connected with a suitable amplifying circuit containing one or more loudspeakers. The current varying instrument may, for example, be a light-sensitive device such as a photo-electric cell which varies the current in its circuit in response to and in accordance with varying amounts of light to which the light-sensitive device is subjected.

The harmonizer further consists of means for operating the current varying instrument, and when a photo-electric cell is used, comprises means for varying the amount of light falling upon the photo-electric cell.

When an instrument of the character of a photo-electric cell is employed, the preferred light varying means comprises a narrow line of light or scanning beam, a light-controlling record containing graphical representations of sinusoidal wave patterns, and means for effecting relative movement between a scanning beam and one or more wave forms.

The light-controlling record may be in the form of a photographic plate or disk containing patterns or graphs formed by transparent and opaque parts of the disk separated and defined by sine curves arranged concentrically and corresponding with the desired fundamental of a tone and a suitable number of harmonic overtones, the fundamental being the pattern or graph nearest the center of the disk, and the overtones being arranged in succession between the fundamental and the edge of the disk in accordance with their increasing frequency. It may be advantageous so to relate the amplitudes of the sine curves corresponding with the various partials as to obtain corresponding sounds within suitable range of loudness for easy adjustment for tone synthesis, and preferably of substantially the same loudness. In the event of a disk being employed, it is convenient to rotate the disk.

The harmonizer further comprises means for selecting the patterns or graphs which correspond with the harmonic partials that are to be used to vary or modulate the light falling upon the photo-electric cell, and in each case for governing at the will of the operator the amount of light so modulated.

When a disk such as above referred to is employed the light transmitted to the photo-electric cell preferably passes through the disk in a narrow line arranged radially of the disk. Selectivity of the graphs to be employed may be provided for in various ways. Individual lights, for instance, one for each graph and each under the control of the operator, may be employed with or without individual cooperating movable shutters; or a common source of light with individual shutters may be conveniently used. The amount of light made use of in each case is controlled by varying the illumination on each pattern or graph, as for example, by changing the brightness of the light source, or by employing a shutter of graduated capacity.

By the foregoing means it is possible with the harmonizer to build up empirically a tone of the desired character and quality which, if preferred, may be in exact semblance of the tone of any particular instrument or voice. Light above the sine curve graphs representing the fundamental tone and a selected number of overtones is allowed to pass in a narrow line through the transparent portions of these graphs onto the photo-electric cell. When the disk revolves at constant speed the varying amounts of light passing through these particular graphs will, through action of the photo-electric cell, vary the current in the sound producer circuit in a manner which will cause the sounding body of the loudspeaker or loudspeakers to vibrate with a periodic motion which is the sum of the simple pendular vibrations corresponding with the sine curve graphs representing the selected partials, thereby producing a tone composed of these partials.

Since the quality, i. e., timbre of a periodic musical tone depends on the number and relative intensity of its simple partial tones, it is evident that by proper control not only of the amounts of light passing through the graphs of each of the partials, but also by selection of the partials themselves, a periodic musical tone of the desired quality may be built up.

It is an important fact that by building up tones in this manner the distortion characteristics of the sound producer are compensated for the reason that the operator in listening to the tone sounded by the loudspeaker increases, in order to produce the desired tone quality, the intensity of the light above the partials having frequencies the response from which is lessened by the sound producer, and vice versa. Distortion of this character is commonly referred to as "frequency distortion".

Correcting the distortion characteristics of the sound producer may necessitate nullification of one or more characteristic overtones not desired in the tone sought to be produced. Thus, for example, it may be desired to produce a tone characterized by the fundamental and the 3rd, 5th and 7th harmonic overtones. It may be found in operating as above indicated that the 2nd and 4th harmonic overtones due to distortion in the playing instrument, are present in the tone produced and must be eliminated. This is accomplished by shifting the light transmitting line above the sine graphs or patterns corresponding with the undesired overtones of distortion (in the instance cited above, the 2nd and 4th overtones) to such position that the overtones introduced are in 180 degree phase relationship with the undesired overtones and by regulating the intensity of the light projected upon said sine graphs to the point of neutralization of the undesired overtones. Distortion of this character is commonly referred to as "non-linear distortion".

The neutralization curves must, of course, be included with the fundamental and overtone curves in determining the composite wave-form required for producing the desired tone.

The pitch of the tone produced by the harmonizer is to be determined by convenience of manufacture and manipulation and as above set forth is generally governed by the frequency of the fundamental. Where a disk is employed, the pitch is thus a resultant of the number of waves of the fundamental curve defining the circular pattern or graph on the disk and the speed of relative movement between the disk and the source of light. This will be brought out in further detail in the descriptive part of this specification.

For the purposes of this invention theoretically it may only be necessary to produce a composite tone of a single pitch so far as concerns the harmonizer feature, for once the desired tone is produced it may be considered to have the same quality and character regardless of pitch. Practically, however, because of frequency distortion in the amplifier circuits and loudspeaker or loudspeakers it may be desirable to determine the requisite partials and their individual intensities for tones of different pitch. In fact, the distortion in some playing instruments may be such that it may be desirable to do this for the entire range of pitch ultimately sought to be attained. It is, however, believed that a single harmonized pattern or record will suffice for this purpose as its speed may be changed to accord with the pitch under test.

In connection with the harmonizer, means should be provided for measuring the variation in input current in each case resulting from the final determination of the amount of light employed in respect to each pattern or graph in the building up of the tone sought.

With the data thus obtained, i. e., the frequencies of the individual partials and their relative amplitudes required for the production of the tone of desired character and quality (specifically in the case of a photographic disk the frequency relationship of the graphs utilized and the relative amplitudes of the light variations caused by each of these graphs), the next step in the progress of the invention is to form a composite curve embodying the curves representing the partials with proper relative amplitudes.

This may conveniently be accomplished by means of an instrument known as a mechanical synthesizer which will produce a composite curve which is the algebraic summation of a number of simple sinusoidal curves, the wave lengths of these component curves being integral subdivisions of the wave length of the longest, which is also the wave length of the resultant. Such a synthesizer is referred to on page 113 of "The Science of Musical Sound" by Dayton Clarence Miller (The McMillan Co., 1926). Reference may also be had to the synthesizer described in the Journal of the Franklin Institute, August, 1927. The composite curve (or curves, see discussion of pitch above), thus formed, is employed in the making of a light-controlling sound record for the playing instrument heretofore referred to. When a train comprising a plurality of wave forms is drawn on the synthesizer, the wave forms may be made to vary in amplitude, wave length and shape, as brought out in the foregoing publications.

In the carrying out of the invention, as will be more clearly understood subsequently, it is desirable that the wave-form which is to constitute the primary pattern be drawn on a circular axis line rather than on a horizontal axis line so as to be in convenient form for rotation. This is accomplished preferably by employing a mechanical synthesizer provided with a rotating recording table rather than one which moves horizontally. The wave-form may, however, be initially drawn on a horizontal axis line and later manually transferred to a circular axis line by plotting the ordinates.

This invention contemplates means and methods for the manufacture of the harmonizer record or pattern above indicated, as well as the harmonizer and its use. For the purposes of a general understanding of the invention particular reference will now be made only to that part of the harmonizer which is utilized to modulate and vary the light falling upon the photo-electric cell in accordance with the fundamental and overtone partials, illustrated in the foregoing by a photographic disk having graphs on its surface in the form of sine waves.

Referring, therefore, to a disk of this character, a photographically sensitized disk or plate is mounted for rotation relative to a source of light arranged to be projected upon the disk or plate in a narrow line of controlled length and radial respecting the plate. This may be accomplished in various ways. For example, a single straight filament lamp with a lens for focusing the image of the filament on the plate may conveniently be employed, or an opaque member provided with a narrow light transmitting line may be interposed between the source of light and the disk or plate. An opaque shutter is arranged between the plate and the source of light for controlling the length of the line of light falling on the plate, and means are provided for giving the shutter harmonic motion to-and-fro radially of the plate. Speed changing means are provided for varying the relative speed of the shutter and the speed of the plate; means are provided for preventing access of light to the plate, except at the effective edge of the shutter; means are provided for adjusting the shutter to a number of positions radially of the plate corresponding with the fundamental and desired number of overtones requisite in carrying out the invention; and means are provided whereby, if desired, the extent of the movement of the shutter to-and-fro may be governed in accordance with the law of tone intensity above set forth, so that the amplitudes of the several sine curves bear such relation to one another as to effect between the corresponding simple tones the uniformity of tone loudness above set forth in the discussion of the harmonized pattern or record.

By proper manipulation of the foregoing instrumentalities there results on development of the plate an individual wave-form graph representing the fundamental and each overtone consisting of an opaque portion and a transparent portion, separated and defined by the appropriate sine curve. Although it is generally desirable to record the individual wave-form graphs so that they are adapted to control the production of a fundamental and its harmonic overtones, it may be advantageous for tone building purposes to record graphs representing partial tones which do not have a harmonic relationship; and as will be readily understood such recording is within the scope of this invention and can be made with apparatus disclosed by properly relating the speed of the shutter and the speed of the plate.

The musigraph, like the harmonizer, consists, in part, of a current varying instrument operatively connected with a suitable amplifying circuit containing one or more loudspeakers (such as are commonly used in modern systems of talking motion pictures), for example, a photo-electric cell, which varies the current in its circuit in response to and in accordance with varying amounts of light to which the photo-electric cell is subjected. These portions of the musigraph, in the most efficient carrying out of the invention, should have approximately the same distortion characteristics as the corresponding parts of the harmonizer, should operate to produce musical tones of the same character and quality as those of the harmonizer when the varying amounts of light falling upon the photo-electric cell are the same as falling upon the photo-electric cell of the harmonizer; and, in fact, it is preferred (though not necessary), that these parts be duplicates of the corresponding parts of the harmonizer.

The musigraph also comprises means for controlling the light variations falling on the photo-electric cell which means consists of a narrow line of light or scanning beam, a light controlling sound record containing wave form patterns, and means for effecting relative movement between the wave forms and the scanning beam. The light-controlling record comprises a series of individual patterns or graphs preferably made from and in accordance with the composite curve or curves drawn by the synthesizer, as above set forth, which preferably represent the sound wave built up and produced by the harmonizer, but which may represent a tone of desired quality produced by some other musical instrument the wave-form of which has been analyzed to determine the relative amplitudes of the component partials, and the sinusoidal components of the tone subsequently synthesized with relative amplitudes adjusted to compensate for the frequency distortion characteristics of the playing instrument, or may represent a wave-form arbitrarily formed or arbitrarily synthesized, or even an oscillographic recording or an analysis of a wave-form of a musical tone the component partials of which have been synthesized with no adjustment of relative amplitudes to compensate for distortion. The individual graphs of the series consist of one graph for each note of the scale to be played, and a sufficient number of the individual graphs are provided to include the desired range of pitch. Accordingly the individual patterns or graphs on the record should contain wave forms which are so related as to control the production of tones of the desired relative pitch. Furthermore, the amplitude of the wave forms preferably follows the law respecting tone intensities above enunciated, so that, independent of intentional variation on the part of the operator, hereinafter referred to, the tones produced will be of the same loudness.

To enable the operator to play in any desired key and to provide for accidentals in any key, the preferred construction is to provide an individual graph for each note of the chromatic scale for each octave (or part thereof) desired. Recognition is made of the tempered scale and of the natural or just scale.

The invention is independent of the particular form and construction of the light-controlling sound pattern or record and a disk has been chosen as a convenient means for embodying the principles above outlined. A convenient form of disk is considered to be one made of a sensitized photographic plate. In one satisfactory form of record the disk comprises concentric continuous wave-form graphs, each formed with an opaque and a transparent portion, separated and defined by the desired composite curve or curves determined as above described, and containing wave forms which are so related as to control the production of tones of the desired relative pitch, and each wave form having its amplitude determined in accordance with the law of tone intensity above set forth, to assure corresponding tones of substantially equal loudness.

In the event of a disk being employed as a light-controlling record, it is convenient to rotate the disk and maintain the scanning beam stationary. Since the pitch of the individual notes represented by the individual patterns or graphs, depends upon the speed of relative movement between the wave forms and the scanning beam, it is essential in order to prevent undesirable pitch variations that the speed of rotation of the disk be constant. Any desired pitch may be determined upon, for example, concert pitch. When a single sound-controlling disk comprising graphs representing the tones of the natural scale in a single key is used, the pitch of the key-note may be changed by changing the speed of the disk so as to permit playing in different keys. When, however, the twelve notes of the tempered scale octave, are by means subsequently disclosed, recorded on a single disk and this disk employed on the musigraph, or when twelve separate disks are employed and rotated at the proper relative speeds to produce the twelve tones of the tempered scale, the operator may modulate at will from key to key even though the speed of the disk or disks remains fixed at the speed initially determined upon.

Continuing the illustration with a single rotating disk, there is provided above the disk a source of light controllable by the operator in such manner that a narrow line of light radial of the disk may be formed on each of the concentric wave-form graphs individually and in any desired order or simultaneously in any desired number. On rotating the disk the light passing through the graphs to the photo-electric cell, varies in exact accord with frequency and amplitude of the individual graphs illuminated. This control of the light may readily be effected in numerous ways, for example, for a common source of light, by the interposition of an opaque plate having a narrow light transmitting line between the source of light and the record, said light transmitting line being obscured by opaque shutters individual to each concentric graph on the record and movable individually to uncover and again cover the line at the will of the operator. Lamps individual to each graph may be employed, each having its light restricted to its cooperating graph and illuminating the same through a narrow light transmitting line radial of the record at the will of the operator, in which event the opaque shutters may be desired to be omitted. A lens may be employed in either case, which by concentrating the light into a narrow sharp line radial of the record may, if desired, eliminate the opaque plate having the narrow light transmitting line. By means such as these it is possible for the operator to produce any succession or combination of notes within the scope provided and to render any piece of music commensurate therewith within his capabilities.

The musigraph may be played manually or automatically; that is to say, the control of the source of light in respect to each individual pattern or graph on the record may be by manual means, such as a keyboard similar to that of a piano or an organ, or by automatic means, as for example, a perforated strip or roll similar to that employed on an automatic piano or an organ, or by other equivalent means, in any event with operative connections with the light controlling means.

The musigraph, preferably also comprises means for varying at the will of the operator the loudness of the tones produced so that expression may be given to the piece rendered from pianissimo to fortissimo, as desired. This may, for example, conveniently be accomplished by operatively connecting with the circuits of the amplifying and loudspeaking system a variable resistance automatically or manually controlled, or resistances may be placed in the circuit of the light controlling means and may be designed to vary the resistance according to the key-board pressure, thereby permitting phrasing as with piano action. Light interference means may be placed under the control of the operator between the source of light and the photo-electric cell for governing at will, the amount of light falling thereon.

The invention contemplates not only the rendition of a piece of music by the use of a single record of any particular instrument, but also the combining of two or more such records in the rendition of a piece of music. While this may be accomplished by the operator manually with a proper arrangement of key-board or key-boards, it also may conveniently be done automatically by arranging for simultaneous control by a plurality of rolls or by a single roll having different portions for the control of the records to be combined. Thus orchestral music may be simulated.

This invention also contemplates means for and method of making the light-controlling sound records. In carrying out this feature of the invention means including a primary pattern are provided for translating the desired composite curve developed as above described, to a musigraph pattern or record blank and actuating means are provided for effecting relative movement between said primary pattern and the record blank. Such translation may also be obtained directly from the synthesizer, or by means of a primary pattern in the form of a cam or disk the periphery of whose surface is made to conform with the composite curve, or by means of as many of such cams as are required to compensate for the distortion of the amplifying and loudspeaker system for the different pitches of the tone produced. For purposes of ready understanding of the general principles here involved translation of the wave form onto a light-sensitive blank in the form of a photographic plate or disk using a primary pattern in the form of a cam will be described.

The musigraph record may conveniently be made photographically. The preferred photographic method broadly consists of effecting relative movement between the primary pattern and a narrow line of light, thereby causing light variations, and recording these light variations on a light-sensitive blank as a pattern of wave forms adapted to control the production of a tone of desired pitch and quality.

Means are provided to form on the light-sensitive surface of the disk and radial thereto, a narrow line of light, and means are provided for rotating the disk relative to said line of light. The primary pattern being in the form of a cam, may conveniently be rotated and may actuate a shutter interposed between the source of light and the light-sensitive disk. Movement of the shutter by the rotating cam varies the amount of light falling on the light-sensitive disk in such a manner that the pattern recorded on the disk corresponds with the wave or waves on the periphery of the cam.

Speed changing mechanism is interposed between the cam and the disk so that these members may be rotated at proper relative speeds to provide for the recording of wave forms of the desired number. Means are interposed between the cam and the shutter for regulating the extent of movement thereof, so that the amplitudes of the recorded wave forms will follow the law of tone intensities above set forth to assure tones of substantially equal loudness.

Means are provided for a step-by-step arrangement of the shutter actuating parts, preferably from the position of the curve to be formed nearest the center of the disk outwardly for each successive curve, and in order to effect 100 per cent modulation of the recording light beam which is most desirable when producing a record which will cause a minimum of ground noise when used on the playing instrument, appropriate provisions are also made for rendering the light transmitting line above-mentioned effective only in the region where said line is to be covered and uncovered by the movement of the shutter in each instance.

With the foregoing instrumentalities it is possible to expose the photographic blank to light in concentric paths, which, when the photographic plate is developed, will comprise patterns or graphs of the desired composite wave-form adapted to control the production of tones of desired pitch, as for example the individual tones of the natural scale, or the tempered scale.

The photographic plate or disk thus made is employed as a master negative to print the positive records which are used on the playing instrument.

Obviously a photographic disk having sine or composite curve patterns or graphs on its surface, as outlined above, is not the only satisfactory light varying means. The harmonizer and musigraph records and likewise the graphs thereon may take different forms. Sine or composite wave-form graphs may be reproduced, for example, by adding a coating to a transparent blank or removing it with suitable recording device in proper manner from a transparent blank already opaquely coated. Likewise the record may take the form of a cylinder or be a flexible photographic film such as is used successively in several systems of talking motion pictures. Nor is it necessary that the individual pattern strips or graphs of a record be on the same record blank, for although it is possible by methods and with means subsequently disclosed to record on a single record blank individual graphs adapted to control the production of tones which have a non-integral pitch relationship such as the twelve tones of the tempered scale octave, the twelve tones of the tempered scale octave, as is well known in the art, may likewise be produced by utilizing twelve records comprising individual graphs, each graph consisting of an integral number of identical wave-forms and achieving the required non-integral pitch relationship by rotating the twelve disks at twelve different speeds. Nor is the invention limited to the use of a single current varying instrument in the manufacture or playing of records or patterns.

Further, with particular reference to the use of a photographic record satisfactory results can be obtained with a form of variable density pattern to represent the various partials or composite tones which is currently in use in several systems of talking motion pictures and frequently referred to as of the variable density or ladder type. In this type of pattern or graph its density on the developed photographic plate is uniform across its breadth but varies along in its length. These variable density graphs may be formed by recording photographically the variations in light from a light-varying device which has the property of varying the amount of emitted light directly with variations in current in a circuit in which it is connected.

Specifically, continuing the illustration with a photographic disk and, for further convenience of illustration, employing a neon light as the light-varying device, in case of patterns for the harmonizer record, the disk is rotated at a uniform speed beneath an opaque light chamber containing the lamp and provided with a narrow light transmitting line in its lower part arranged radially of the disk and of a length commensurate with the desired breadth of the individual patterns or graphs. The neon lamp operatively connected in a suitable electric circuit is made to vary its brightness harmonically (e. g. in correspondence with sinusoidal variations) in accordance with the movement of a potential or current varying member operatively associated with the circuit, e. g., by the action of a contact point moving, with harmonic motion, in cooperative relation to a resistance element in the circuit of the lamp, said resistance element having preferably been corrected to compensate for the resistance characteristics of the lamp and its circuit so that the brightness varies directly with the motion of the contact point. Correction may if preferred be made by suitable variation in the motion of the contact point; or a combination of these corrective methods may be employed. By properly regulating the relative speed of the contact point and the rotating disk and by shifting the light chamber radially into a series of positions, individual variable density graphs of wave-forms may be recorded on the disk which when developed serves as a negative to make a positive record the patterns of which will be of variable density type and will correspond with the desired partials.

In producing the variable condensity type of graph the speed of the rotating disk should be constant for each graph so that the only factor varying the exposure of the photographic disk to light from the neon lamp is the motion of the contact point varying the intensity of the light itself.

Control of the relative density of each of the patterns on the developed photographic disk so that they will produce tones of substantially the same loudness is obtained through a variable resistance placed in the circuit of the neon lamp, which resistance also acts as a stabilizing resistance in the circuit.

Suitable provision is also preferably made for exposing the disk to the light from the lamp for exactly one complete rotation for each concentric path in order that the graph of wave-forms recorded therein may, when completed, be uniform and continuous.

It is to be further understood that current of sufficient intensity is to be provided in the circuit of the neon lamp to assure complete illumination thereof throughout the variation of current controlled by the contact point; and further that the neon lamp need not be directly connected in the modulating circuit, but may be indirectly coupled therewith, with amplifying means provided, if desired.

It will also be understood that the narrow line of light may be projected upon the disk by means of a lens.

In a somewhat similar manner the variable density type of pattern or graph may be recorded on the photographic blank which is to become the light-controlling sound record of the musigraph playing instrument. Such production involves in effect the development through use of the harmonizer of a composite tone of desired quality and combining or synthesizing into a unitary pattern the light variations ultimately determined to produce the composite tone. For example, the photographic blank on which the wave-form graphs are to be recorded in each case is rotated at uniform speed beneath an opaque light chamber containing a neon lamp with a narrow light transmitting line of suitable length in the lower part of the chamber arranged radially of the disk. Having developed with a harmonizer, employing either the variable width or the variable density type of record, a tone of desired quality, the neon lamp is inserted in a suitable electric circuit connected with the photoelectric cell of the harmonizer, e. g., a circuit in parallel with the loudspeaker circuit. The loudspeaker may or may not be disconnected. The harmonizer is then operated with the fundamental and overtones of the intensity and phase previously determined. The current in the neon lamp will vary directly with the variations of current effected by the photo-electric cell of the harmonizer with consequent and corresponding variations in the brightness of the neon lamp. By properly regulating the relative speed of rotation of the harmonizer disk and the photographic blank, individual wave-form graphs corresponding with the notes of any desired frequency may be recorded concentrically by moving the lamp chamber radially into position to expose the record blank in circumferences of requisite radii.

Obviously the same care should be taken to expose each of the concentric paths on the record blank for a unit rotation as above described respecting the variable density type of harmonizer record; and the narrow line of light projected onto the blank may be obtained by focusing with a lens as above outlined.

Where, as in the case of the tempered scale, the pitch relationship of the successive notes cannot be expressed in ratios of integral numbers, adjustments are provided to make possible shift of phase along the pattern path to bring into phase the first and last wave forms recorded.

Likewise as in the case of the recording of a variable density type of graph for the harmonizer record the density of the graphs on the developed musigraph disk may be controlled with a variable stabilizing resistance in the circuit of the neon lamp and the density varied so that they will produce tones of equal loudness. Also current of sufficient intensity is to be supplied to properly operate the neon lamp when making the musigraph record as above explained respecting the neon lamp when making a harmonizer record. Furthermore, if required, correction is to be made for the resistance characteristics of the neon lamp and its circuit to assure that its current will vary in the same way as the current through the loudspeaker after determination of the desired tone quality, all as well understood in the electric arts.

Forming musigraph records or patterns of the variable density type by means of a lamp having the property of varying its brightness directly with the variations in its current, eliminates the synthesizing of the curves determined by the harmonizer record into a composite curve by means of a mechanical synthesizer as above outlined. The neon lamp apparatus serves to combine, as it were, into a single light wave of complex character the variations in its current both respecting frequency and intensity which have been predetermined by light variations from the harmonizer. Broadly speaking, this portion of apparatus serves as a means to combine the various light waves predetermined by the harmonizer into a composite light wave available for immediate recording in the musigraph record. Thus much apparatus and many steps are eliminated in the making of the musigraph record comprising graphs of the variable density type. But as stated at the beginning of the discussion of the variable density type graph the neon light method is available only for the production of records of the photographic type, to which my invention broadly is not limited.

It will be readily understood from the above discussion that a light-varying device such as a neon lamp operatively connected with the musigraph may be similarly utilized, when a musical composition is being played on the musigraph, to record on a photographic surface a pattern adapted to reproduce the musical composition on a suitable instrument.

It should further be understood respecting both types of graphs above outlined, that somewhat similar results may be obtained by employing in the manufacture of the musigraph record a primary pattern embodying a wave-form which has been predetermined arbitrarily, theoretically, or empirically. The primary pattern may also take the form of a suitable recording representative of actual sound waves or an enlargement of such a recording. It is preferable, however, to determine the composite primary pattern, one or more for each instrument and for each voice sought to be simulated and for each created tone to be produced, by means of the harmonizer above referred to or by some means of tone analysis and synthesis which will accurately correct or compensate for the distortion in the playing instrument.

Other features and advantages will appear upon consideration of the following description and of the drawings, in which:

Fig. 1 is a view illustrating a characteristic organ tone curve and curves representing partial tones of which the characteristic tone is composed;

Fig. 2 is a view illustrating the variation in response, for different frequencies, of a current model of sound producer to electrical variations adapted to produce sound thereby;

Fig. 5 is a top plan view with the top of the casing removed;

Fig. 6 is a detailed view of the means for varying the amplitude of the shutter movement;

Fig. 7 is a top plan view of a device which may form part of either the harmonizer or the musigraph, the top of the casing being broken away to show one of the graphs on the musigraph record;

Fig. 7a is a fragmentary top plan view illustrating screw means for controlling the phase of harmonic light variations affecting a photoelectric cell;

Fig. 7b is a fragmentary view illustrating means for operating such screw means from the outside of the casing;

Fig. 8 is a section on the line 8—8 of Fig. 9;

Fig. 9 is a sectional elevation taken along the line 9—9 of Fig. 7;

Fig. 10 is a diagrammatic view representing a preferred form of the harmonizer;

Fig. 11 is a diagrammatic view illustrating a modified form of part of the harmonizer illustrated in Fig. 10;

Fig. 12 is a longitudinal vertical section of apparatus for producing the musigraph records;

Fig. 13 is a plan view of a cam or primary pattern embodying one wave length of a characteristic composite wave-form curve;

Fig. 14 is a top plan view illustrating mechanism for controlling a shutter or tracer to record graphs on the harmonizer record;

Fig. 20 is a left hand end view of the apparatus illustrated in Fig. 19;

Fig. 21 is a sectional view taken along the line 21—21 of Fig. 19;

Fig. 22 is a top plan view, certain of the underlying parts being shown in dashed lines;

Fig. 26 is a fragmentary top plan view of a modified form of light varying means forming part of a musigraph;

Fig. 27 is a vertical section of musigraph apparatus involving the features of Fig. 26;

Fig. 28 is a diagrammatic view illustrating a musigraph in which the light falling on the various graphs on the musigraph record is controlled by shutters individual to such graphs;

Fig. 29 is a view on an enlarged scale of an individual variable density graph or pattern;

Fig. 30 is a diagrammatic view illustrating means for effecting the production of a variable density harmonizer pattern;

Fig. 31 is a diagrammatic view illustrating means for effecting the harmonizing of the different partials and direct recording of the musigraph pattern;

Fig. 32 is a diagrammatic top plan view of the shutter controlling means with the parts in the positions shown in Fig. 30;

Fig. 33 is a detail view showing the shutter in open position;

Fig. 34 is a fragmentary view showing certain parts in the positions assumed when the downward shifting of the rotatable cams by the stationary cam is completed;

Fig. 35 illustrates the engagement of the upper cam with the cam-operated lever for closing the shutter upon completion of one rotation of the table after opening of the shutter by the lower cam;

Fig. 39 is a view corresponding to Fig. 30, but on a larger scale, showing the positions of certain parts of means for preventing engagement of the cam-operated lever by the lower cam when the cams are in lowered position;

Fig. 40 is a view corresponding with Figs. 34 and 35, as to the lowered condition of the rotatable cams and the raised adjacent end of the cam-operated lever, but illustrating in addition and in corresponding positions, parts of such engagement-preventing means;

Figure 36:
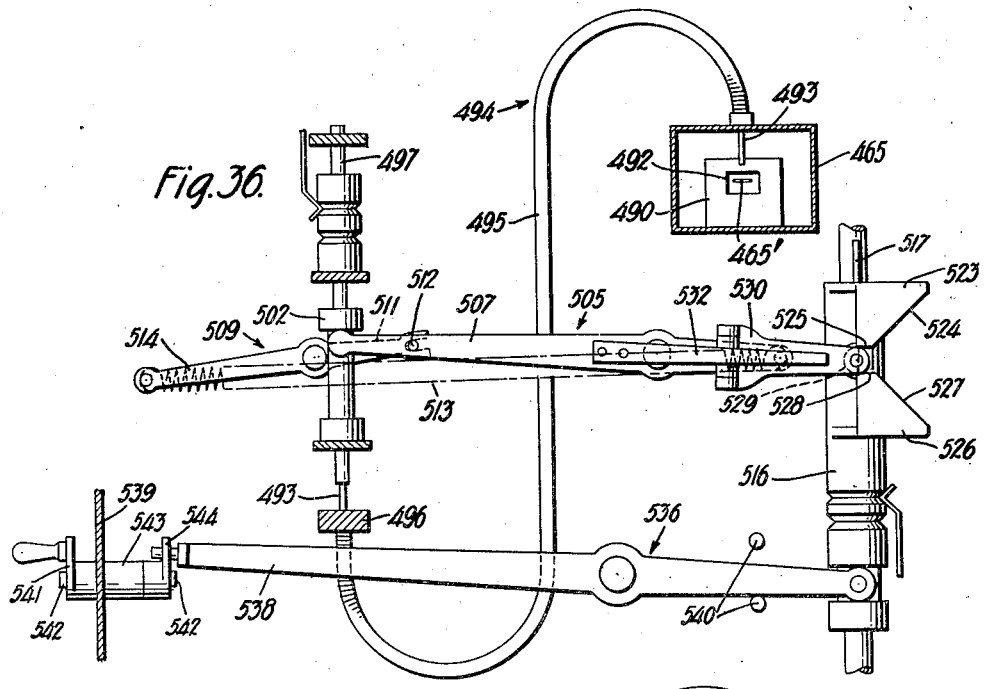
Fig. 36 is a view showing the positions of certain parts when set for rapid shutter closing by the upper cam.
Figure 37:
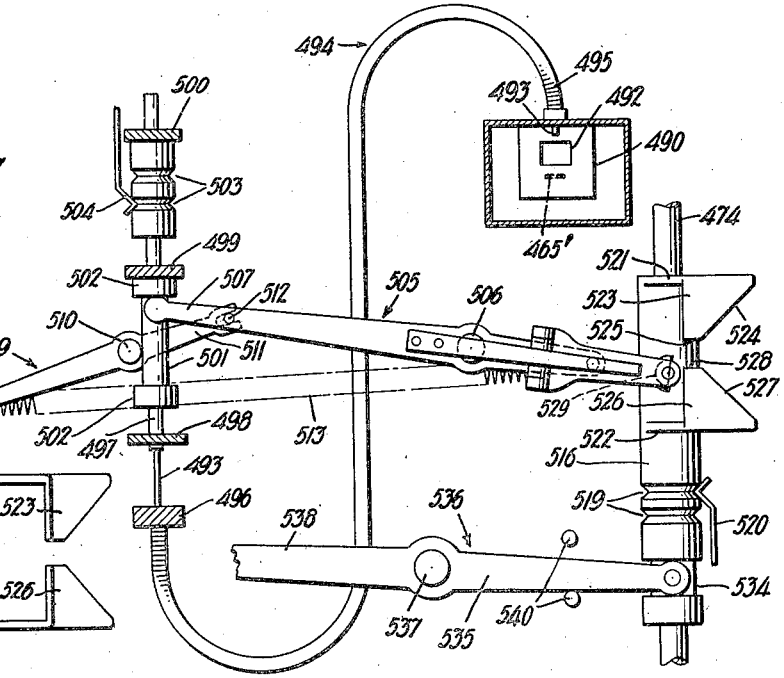
Fig. 37 is a view showing the positions of such parts when the closing of the shutter has been completed.
Figure 38:
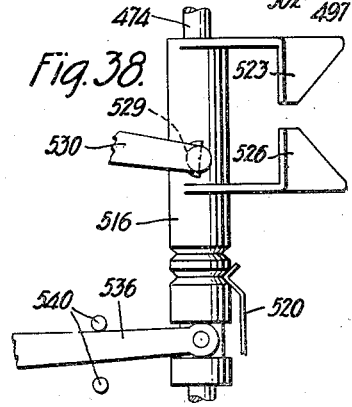
Fig. 38 is a view showing the relative positions of the cams and the cam-operated lever after the cams have been raised manually to cause actuation of such lever by the lower cam to open the shutter.

Fig. 41 corresponds with Fig. 36 and shows the parts in position to shift the adjacent end of the cam-operated lever out of the path of the lower cam;

Fig. 42 corresponds with Fig. 37 and shows the end of the lever shifted from the path of the lower cam;

Fig. 43 corresponds with Fig. 38 and shows the rotating cams raised and the end of the lever restored to a position to be engaged by the lower cam;

Fig. 44 is a diagrammatic view illustrating electrical means for shutting off the light at the completion of one rotation of a photographic disk;

Fig. 45 is a diagrammatic top plan view of the apparatus shown in Fig. 44;

Fig. 46 is a view illustrating an electro-magnetic device mounted in the casing or box for the lamp and adapted to control the shutter at the bottom of said box;

Fig. 47 is a fragmentary sectional view taken along the line 47—47 of Fig. 46; and Fig. 48 is a fragmentary view illustrating a preferred form of contact for engagement with conducting material at the bottom of the groove in the moving contact member.

The method and apparatus of the present invention depend upon the fact, hereinbefore set forth, that all periodic, harmonic musical tones are due to particular combinations of a larger or smaller number of simple tones called partials, the partial in each case which has the lowest frequency being termed the "fundamental" and the other partials the "overtones"; and the combination of fundamental and overtones is harmonic only when the overtones have frequencies which are exact multiples of the frequency of the fundamental. In Fig. 1 is shown an organ-pipe tone curve O and its harmonic components $O_1$, $O_2$, $O_3$, $O_4$, $O_5$, $O_6$, $O_7$, $O_8$, $O_9$, $O_{10}$, $O_{11}$, and $O_{12}$, the curves being substantially the same as those shown on page 125 of "The Science of Musical Sounds", to which reference already has been made. Of these curves, $O_1$ is the one representing the fundamental tone and the curves representing the other harmonic components have frequencies which are multiples of the frequency of curve $O_1$ and such multiples correspond to the subscripts used to identify the curves.

As is well known in the art, all present electrical systems for the production or reproduction of sound possess frequency distortion characteristics. The response curve for all frequencies in the audible range is never a straight line. In Fig. 2, there is shown in a dashed irregularly curved line which represents the response curve R of a loud speaker that is considered to give very satisfactory results. According to the present invention, it is proposed to correct or compensate such deficiencies not only in the loud speaker but in the entire instrument and produce a flat overall response curve as indicated by the full line $R_1$.

The first step in carrying out the invention consists in producing or recording a light-controlling sound record bearing sine curve graphs having frequencies corresponding respectively with the fundamental partial of a musical tone and with as many of the overtone partials as may appear to be necessary. As described hereinafter, the graphs of about forty overtone partials are recorded, inasmuch as such number is considered to give satisfactory results. These records may take various forms. The graphs, for example, may be of either the variable density or variable width type and may be arranged in parallel paths on films, in co-axial circular paths on hollow transparent cylinders, and in various other ways, but preferably in a form which is found to be particularly satisfactory, namely, that in which the sine wave graphs are formed in concentric circular paths on a photographic plate in the form of a disk.

*Harmonizer pattern or light-controlling sound record and production thereof*

One form of apparatus for producing such sine wave variable width type graphs of the fundamental partial of a tone and a suitable number of harmonic overtone partials in concentric circles on a photographic plate disk is illustrated in Figs. 3, 4, 5 and 6. This apparatus includes a casing 50 for protecting the sensitized or photographic plate or disk 51 from the action of outside light during the production of the graphs and has at one side (Fig. 5) a slide 52 which is so guided by ribs 53 in suitable grooves (Fig. 5) as to effect a substantially light-proof seal of the casing 50, especially in connection with a flexible flap 54 (Fig. 3) secured to the top of the casing at the inner face thereof to be in wiping contact with the inner face of the slide 52. When a light-sensitive blank in the form of a photographic disk is to be placed in the casing for the recording of graphs thereon, the compartment or run in which the casing 50 is located and which may be in the nature of a dark room, is closed and light necessary for the insertion or removal of the plate is obtained from a suitable source which will not affect the blank, for instance, from a ruby light.

Upon insertion of the blank 51 in the casing 50, it is placed on a rotatable table 55 secured on a vertical shaft 56 which is journalled in the upper end of a suitable bracket 57 projecting upwardly from the lower wall 58 of the casing, and is also journalled in said lower wall itself. The table 55 is connected with a hub 59 secured to the shaft 56 and serving to support the same by engagement with the upper surface of the bracket 57. The blank may be held on the table 55 by positioning it with a central perforation therein fitting over a pin or projection 60, which may be an extension of the shaft 56, projecting upwardly from the center of the table 55. The blank may further be secured on the table 55 by means of a washer 61 placed over the pin 60, and member 62 which may be threaded on the pin 60 to press the washer against the upper surface of the blank to hold it on the table for rotation therewith. After thus securing the disk 51 in position on the rotating table, the slide 52 is moved to closed position.

This form of apparatus is designed to produce harmonizer light-controlling sound records, each of which is made up of individual graphs or patterns arranged in concentric annular bands and consisting in each case of transparent and opaque portions (63 and 64, respectively) defined and separated by a centrally located simple sine curve 65 (Fig. 7). In forming each of the individual graphs on the corresponding annular band, the disk is rotated and the portion of the band exposed to light in each rotation is bounded and defined by a sine curve. This operation is repeated until all of the bands have been exposed, the wave length and the amplitude of the sine curve being varied as desired for the different bands. The harmonizer record or pattern 66 obtained by developing the exposed blank will be opaque where the exposures were made and transparent in other parts and vice versa on a corresponding positive.

Figure 4:
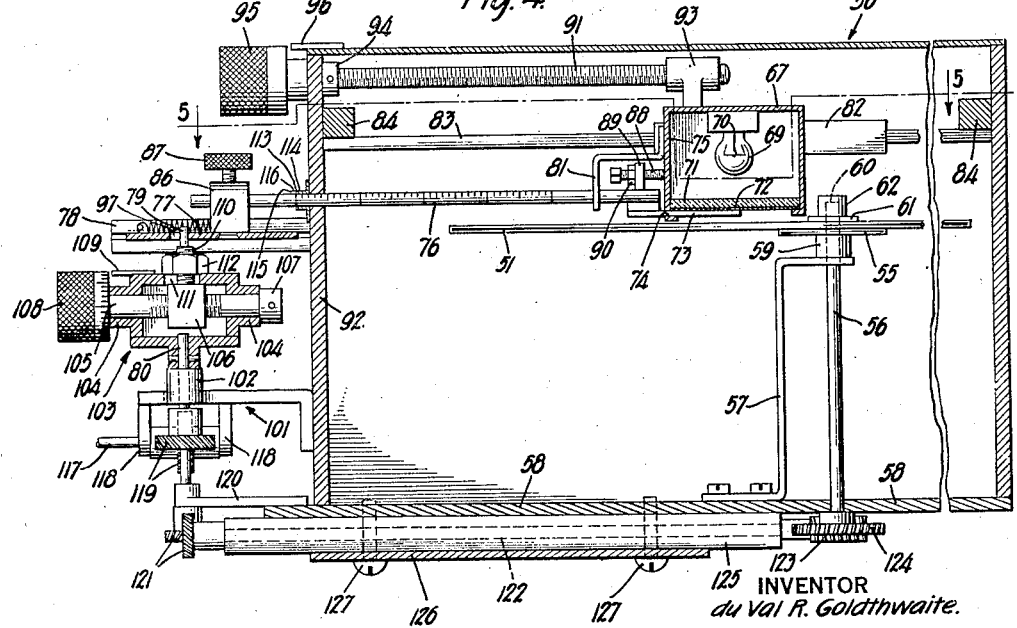
Fig. 4 is a longitudinal vertical section of the structure shown in Fig. 3.

The exposure of the light-sensitive blank 51 to light may be effected by means including a light box or container 67 having therein a source of light, which may be an electric lamp 69, with a substantially straight line filament 70 and having a bottom wall 71 adapted to transmit light along a narrow line or slit 72 of a length substantially equal to the width of a pattern band. Preferably the bottom wall 71 is a glass plate rendered opaque, as by silvering its lower surface, and the narrow light transmitting line or slit 72 is produced by a scratch in the coating at the silvered surface, said line extending radially of the table 55 and being as narrow as practicable. With the photo-electric cells and other means now available the width of said line may be limited to approximately .001 of an inch or less. By locating the line or slit on the bottom of the plate it is brought into close proximity to the record. As is shown in Fig. 4, the line or slit is positioned as close to the record as the construction of apparatus illustrated permits. This tends to sharpness of the light image and prevents diffusion or dispersion of light on the record, which is obviously of considerable importance.

The passage of light through the line or slit 72 is controlled by a shutter 73 sliding longitudinally of the slit 72 along the lower surface of the plate or bottom wall 71 and projecting through a slot 74 in the wall 75 at the side of the light box farthest from the axis of the shaft 56 and below the wall or plate 71. Reciprocation of the shutter 73 in harmonic motion is effected by means of a connection or rod 76 attached at one end to the portion of the shutter projecting from the light box and connected at its other end outside of the casing, through which it passes with a sliding fit, with a slide 77 projecting at opposite edges into grooves in guides 78 projecting from the adjacent wall of the casing, to which slide harmonic motion is imparted by means of a pin 79 eccentrically mounted on a vertical driving shaft 80. To avoid undue stress on the shutter the rod or member 76 is slidably supported adjacent the light box by a bracket 81 attached to the box.

The light box 67 is supported by means of members 82 secured thereto at opposite sides and slidably mounted on guides or bars 83 extending from one side of the casing to the other and connected at their ends with bars 84 secured to such opposite sides or walls. Preferably the connection between the members 82 and the guides 83 is effected by providing the members 82 with grooves 85 to receive the inner edges of the guides 83. The object of mounting the light box to slide along the guides 83 is to make it possible to position the slit 72 directly over the path in which it is desired to record.

This shifting of the light box 67 requires a change in the length of the connection between the harmonically operated slide 77 and the shutter 73, which change is, in the present instance, obtained by having the bar 76 outside of the casing 50 slidable in a member 86 projecting upwardly from the slide or plate 77 and secured in any desired relation with said member by a set screw 87 threaded in said member. Inasmuch as the shutter 73 must bear the same general relation with respect to slit 72 for all positions of the light box 67 it is necessary to provide some means for maintaining this relation during shifting of the light box. As here shown, this is effected by means of a screw 88 threaded through an upright lug 89 on the inner end of the bar 76 and locked in adjusted position by means of a lock nut 90.

The position of the light box 67 may be changed by means of an accurately made screw 91 journalled at one end in the left hand wall 92 (Fig. 4) of the casing 50 and threaded at its other end into a lug 93 projecting upwardly from the light box, the screw 91 being held against longitudinal movement with reference to the casing by means of a collar 94 at the inside of the casing and a head or finger piece 95 at the outside thereof and having an indication thereon not shown adapted for use in connection with a pointer or index 96 on the top of the casing 50. Preferably the pitch of this screw is such that one turn thereof will shift the light box 67 from any one path to the next.

In order to avoid lost motion between the eccentric pin 79 and the shutter 73 the plate or slide 77 is provided with a slot 97 of greater width than the thickness of the pin 79 and the inner edge of the slot 97 is maintained in contact with the pin 79 by means of a spring 98 attached at one end to a pin 99 projecting from the member 86 and at the other end to a pin 100 projecting from one of said guides 78. In order to maintain the same loudness for different frequencies, changes in frequency must be accompanied by appropriate changes in amplitude, and, according to this form of the invention, the throw of the eccentric pin 79 is regulated step-by-step in progressing outwardly on the disk from the graph of the fundamental partial to graphs of the overtone partials, by use of the structure shown most clearly at the left in Fig. 4.

The driving shaft 80 is supported by means including a bracket 101 projecting from the casing 50 and having an upwardly projecting boss 102 on which rests the lower part of a frame or casing 103 secured to the shaft 80 to support the same and to be driven thereby. This frame 103 is provided at opposite sides with aligned bosses or bearings 104 in which are journalled the ends of a member 105 having an intermediate portion threaded into a member or block 106, the member 105 being held against longitudinal movement by a collar 107 secured thereto and engaging the outer end of the adjacent boss 104, and a micrometer head or finger piece 108 secured thereto at the other end, in engagement with the outer end of the corresponding boss or bearing 104 and having graduations thereon for use in connection with a fixed index 109 on the casing or frame 103. The block or member 106 has fixed thereto the threaded lower end 110 of the pin 79, which threaded lower end projects through a slot 111 in the upper part of frame or casing 103 and permits adjustments of the pin 79 to and from the axis of shaft 80, such adjustment of the pin being maintained by means of a lock nut 112.

The light box 67 may be shifted to transfer the slit 72 from one path to the next by loosening the screw 87 and turning the head 95 through one complete turn. Assuming that the graphs are produced in order outwardly from the center of the disk 51, it is generally desirable in connection with each movement of the light box to reduce the eccentricity of the pin 79, that is, by moving it toward the axis of the shaft 80. Such shifting of the pin 79 to the proper position may be effected by loosening the nut 112, turning the micrometer head 108 to bring the proper graduation thereon in alignment with the index or pointer 109, and again tightening the nut. It should be understood that the screw thread on the intermediate portion of the member or shaft 105 is very accurately made and that the graduations on the head 108 are so positioned as to indicate the positions of the block 106 to vary the amplitude as required.

Although the positioning of the indication on the micrometer head 95 opposite the pointer 96 indicates that the light box is in a proper position with reference to one of the pattern paths on the disk 51, such positioning of the micrometer head does not indicate the path over which the slit 72 is positioned. The number of the path beneath the slit 72 may, however, be determined by markings or graduations on the bar 76 arranged to be read in connection with an index 113 formed at the outer edge of a collar 114 projecting outwardly from the casing at the outside of the wall through which the bar 76 projects. These markings include graduations spaced at intervals corresponding to the widths of the record paths or to the length of the slit 72 and which are read with the index 113 when the shutter 73 is completely across the slit 72 as determined by the engagement of the screw 88 with the adjacent wall of the light box. Another index 115 is formed at the outer edge of a projection 116 at the outer side of the collar 114 and at a distance from the first index 113 equal to half the length of the slit 72.

In order to regulate properly the amount of light passing to a given record path, it is desirable to position the middle line of the corresponding sine curve substantially at the middle of said path. To obtain this result, the eccentric pin 79 must be so positioned that the plane determined by its axis and the axis of the shaft 80 is perpendicular to the bar 76, and also the shutter 73 must be positioned with its forward edge at the middle of the slit 72 before tightening the screw 87 to maintain the proper relation between the eccentric pin 79 and the forward edge of the shutter 73. Such positioning of the shutter with its forward edge at the middle point of the slit 72 may be effected by shifting the bar 76 to the left from its right hand position (Fig. 4) to bring that graduation on the bar 76 indicating, by coincidence with the index 113, the position of the slit with respect to said paths, into alignment with index 115. After tightening the screw 87, the shaft 80 may be operated and the record path exposed as determined by the movement of the shutter 73.

Power for actuating the eccentric pin 79 and for rotating the disk supporting table 55 is supplied through a shaft 117, controllable manually or by power from a suitable source, journalled in lugs 118 on bracket 101, and operatively connected with the shaft 80 by suitable means such as spiral gears 119. Below these gears, shaft 80 is journalled in a bracket 120 and adjacent to said bracket is connected by means of spiral gears 121 with a shaft 122. Fixed on the other end of the shaft 122 is a worm 123 meshing with a worm gear 124 fixed on the lower end of the shaft 56 which drives the disk 51.

If the light box were moved outwardly to form successive graphs without changing the driving connection between the shaft 80 and the shaft 56, all of the graphs would have the same number of waves in the corresponding complete circular paths and there would be no difference as to frequency when the disk was revolved. It is desirable, however, that the frequencies of the successive overtone partial graphs be respectively 2, 3, 4, 5 etc., times the frequency of the fundamental partial graph and the proper number of waves in these overtone partial graphs may be obtained by changing the gear ratio, as by substituting different worms 123 and worm gears 124 for those used to produce the graph of the fundamental partial tone. In making these changes, the diameters of the worm gears will be smaller for the graphs of higher frequencies and the shaft 122 will to a certain extent be swung about the end thereof carrying one of the spiral gears 121.

To enable the shaft 122 to be adjusted to the various positions required, it is journalled in an element 125, such as a block, and secured against longitudinal movement with respect thereto. This element or member is then clamped in position against the lower wall 58 of the casing 50 by means of a plate 126 engaging the member 125 at the lower face thereof and pressed thereagainst by screws 127 extending through the plate and threaded into said wall 58. Forty overtone graphs appear to be sufficient, thus necessitating forty changes of speed. All of these changes may be made by changing the gears at the lower end of the shaft 56 and the worms which mesh therewith, but it may be convenient to substitute other gears for the spiral gears 121 at the lower end of shaft 80 and the outer end of shaft 122, thereby varying the driving ratio as required.

After the plate has been exposed along the paths of all of the graphs, the disk or blank 51 is in condition to be developed, and may be removed by general reversal of the steps for insertion and with the same precautions, that is the room in which the apparatus is housed is darkened and use is made of a suitable light, such as a ruby light, to enable the work to be done without affecting the exposed blank, the slide 52 is moved to open position and the devices 61 and 62 for holding the disk 51 to the table 55 are removed. At this time the light box 67 is at a considerable distance from the axis of the table thus rendering it easy to remove the exposed disk 51 and substitute an unexposed or fresh disk. Upon developing the exposed plate or disk, the exposed parts will be rendered opaque and the unexposed parts transparent, thus producing a negative which may serve as a master record for the making of positives, as shown in Fig. 7 illustrating the innermost pattern, to be used as harmonizer records 66. In such positives it will be apparent that the maximum height of the transparent portions equals the maximum double amplitude of the sine curve.

In this connection it should be noted that any driving ratio between the shafts 80 and 56 may be used for the fundamental curve, provided the shutter traces on the record blank an integral number of identical wave-forms in each revolution of the table 55. Then all that is necessary is to multiply the number of waves by 2, 3, 4, etc. in order to produce the harmonic overtone graphs. Then, by rotating the table at the requisite rate, the desired frequencies may be obtained irrespective of the number of waves in the graph of the fundamental partial.

*The harmonizer*

This part of the apparatus is designed to determine the requisite relative intensities of the fundamental and overtone partials of a musical tone, to produce the desired tone quality which may be characteristic of a selected musical instrument or of the human voice; and may include a light-sensitive device, such as a photo-electric cell of proper size and suitable characteristics, a source of light above said cell, means for moving said source of light and said cell a light-controlling sound record comprising individual graphs representing the fundamental partial of a tone and the required number of overtone partials which may have been produced as hereinbefore described, means for directing light to narrow light transmitting lines or line sections extending radially across the individual graphs, means for varying the amount of the light passing through such lines, and a sound producing instrument controlled by the action of the light-sensitive device which varies the current in the photo-electric cell circuit in accordance with the variations in light.

When the harmonizer record is moved at the speed requisite to produce the proper frequencies, the amount of light passing through the partial tone graphs and consequently the intensity of the partial tones produced by the sound producing instrument are varied until the sound has substantially the desired tone quality, such as that of an instrument used as a standard of comparison. Obviously, substantially all of these parts, except the sound producing instrumentality, should be enclosed in a light proof casing.

In Figs. 7, 8 and 9 there is indicated an arrangement which may be part of such a harmonizer and, as brought out more definitely hereinafter, may also be used as part of an apparatus for playing music by use of a light-varying sound record comprising individual graphs or patterns representing all of the tones, especially for a key-controlled instrument, within the range of the instrument.

The harmonizer as here shown, includes a light proof casing 130; a photo-electric cell 131 located in the lower part of and at one side of the casing 130; and a disk supporting table 132 having a depending sleeve 133 secured to a vertical shaft 134 passing through the lower wall 135 of the casing. The sleeve 133 is supported by engagement with the upper end of a sleeve 136 resting on said lower wall 135 of the casing and serves as a bearing for the shaft 134. The harmonizer also includes a source of light 137 arranged above the photo-electric cell 131 and spaced therefrom to permit rotation therebetween of a harmonizer record 66 on the table 132 and secured in place thereon by suitable means such as a screw 138, to which access for use of a screw driver thereon may be had through an opening 139 in the top of the casing and normally closed by a slide 140.

The source of light, or light unit 137, is made up of a plurality of individual electric lights 141 and may readily be removed, inserted, or replaced by a similar or somewhat different unit according to the requirements of the service required. If this part of the apparatus were to be used in one form of the musigraph it would be required ordinarily to have eighty-eight individual electric lamps 141. In any event, the small width of the graph records and their closeness to each other make it difficult to accommodate the necessary number of lamps, but this difficulty may be met by arranging the lamps in staggered relation as indicated in Figs. 7 and 9.

As illustrated, the lamps 141 are arranged in three lines or groups supported by three members 142 connected at their ends with cross bars 143 which hold them together in the unit 137. This unit also includes an inner end wall 144, side walls 145 and a bottom wall 146 having an opening 147 over which is placed a glass plate 148 rendered opaque at one surface, as by silvering, and having narrow transparent lines or slits 149 over the positions of the various graphs and formed, as by scratching the silvered surface. In order to confine the light from each lamp 141 to the small area assigned thereto, there are provided generally cylindrical shields 150 fitting over the lamps and extending substantially to the surface of the plate 148.

When this part of the apparatus is to be used in connection with a harmonizer record or disk 66 having thereon graphs representing approximately 40 partial tones of a musical note and intended for use in the harmonizing operation in which the desired intensities of different partial tones are determined, only a limited number of the lamps 141 shown in the present arrangement may be used or the unit 137 may be replaced by a unit having only the necessary limited number of lamps suitably arranged and spaced for use with the harmonizer record.

Although the harmonizer patterns or records 66 are not affected by light it is necessary to maintain the casing 130 sealed against light during the playing of the various partials of a tone by the harmonizer. At the same time it is necessary to provide for the insertion and removal of harmonizer records. To meet these requirements, the casing 130 is provided at its right hand side (Fig. 8) with a slide 161 which, as shown in this figure and in Fig. 7, has rib and slot engagement with the bottom and sides of the casing so as to maintain an effective light seal while permitting an upward movement of the slide. Of course, no such seal exists at the upper edge of the slide, but a tight seal may be effected at this location by means of a flexible flap 162 secured to the top of the casing 130 and engaging the inner face of the slide 161.

When the lamps are arranged for the harmonizing operation and a harmonizer record 66 containing the fundamental sine graph and the desired number of overtone sine graphs, is rotatably mounted between the lamps and the photo-electric cell, the record is rotated at the desired speed and the lamps lighted. There will then be produced in the photo-electric cell circuit 151 changes of current which will be translated in suitable sound producing means 152 to a sound made up of all such partial tones. The sound producing means or device may be of the public address type and may include an element 153 containing vacuum tube amplifying means and a suitable source of electric current, and a loud speaker 155.

The intensities of the various partials may, however, be varied individually by adjusting variable resistance devices 156, one of which is included in the circuit of each lamp 141, thereby varying the intensities of the light from the lamps and consequently the intensity of the corresponding partials.

When the sound issuing from the horn 154 has the desired tone quality, for example, as tested by comparison with the tone of a selected musical instrument, such intensities are measured in any suitable manner, as, for example, by properly calibrated indications at the variable resistance devices 156. Preferably, however, this measurement is effected by providing a suitable measuring instrument 158 in shunt across the photoelectric cell circuit and reading said measuring instrument for each lamp after breaking all the other lamp circuits by opening switches 159 therein. In this operation the disk is allowed to move very slowly and the variation in current between maximum and minimum is noted. There may also be a variable resistance 160 in the photo-electric cell circuit 151 to vary the intensity of the sound produced at the horn 154.

Correction of the non-linear distortion characteristics of the sound producer may necessitate nullification of one or more characteristic overtones such, for example, as the 2nd and 4th harmonic overtones when it is desired to produce a tone characterized by the fundamental and the 3rd, 5th and 7th harmonic overtones. Such elimination of overtones may be accomplished by introducing overtones corresponding with those undesired but of opposite phase and equal intensity so as to exactly counterbalance the same. Such overtones are introduced by exposing corresponding overtone patterns to light through a light transmitting line, adjusting the light transmitting line along the pattern to such a position that the crests of the overtones introduced coincide with the troughs of the undesired overtones, and suitably regulating the intensity of the light supplied at the light transmitting line.

One way of effecting such shifting of the light transmitting line for any overtone pattern is to arrange the members 142 in suitably spaced arrangement around the axis of the shaft 134 and provide corresponding light transmitting lines 149 on members 148, formed with sections 148' mounted to move in annular paths over the overtone patterns of which the phase is to be changed, and provided with projections 163 in which are rotatably mounted, but held against longitudinal movement with respect thereto, the ends of screws 164 threaded into a support 165. Actuation of these screws by heads 166 at the outside of the casing (Fig. 7b) may be effected, through the cores 167 of flexible devices 167' having outer casings 167" which are held against turning. Each head 166 is provided with suitably calibrated markings to be read in connection with a pointer 168 and indicate the change in phase so as to enable the overtones whose phases have been so shifted to be correspondingly combined as to phase with the other partials in a synthesizer.

After thus combining the various partials, measuring their relative intensity factors, and if necessary, determining the required phase relations, a composite wave-form of the component partials may be synthesized in accordance with such relative amplitude and phase determinations by any suitable means, such as a mechanical synthesizer, of which satisfactory forms are referred to on page 113 of the book "Science of Musical Sound" and in the article "A mechanical synthesizer" in the August 1927 issue of the Journal of the Franklin Institute, to which reference has already been made. If no particular phase relationship of the component partials is required, it is generally desirable for compactness, to so phase the partials, in the synthesis operation, that the resultant composite wave-form will have a minimum double amplitude. After producing a composite wave-form pattern representing a desired tone of a certain pitch, patterns representing tone of similar quality but of different pitch may be developed by regulating the speed of the disk 66 to produce a fundamental tone of the desired pitch and proceeding by the method set forth in the previous example.

As illustrated in Fig. 2 the response of the sound producing means may vary for different frequencies, due to its frequency distortion characteristics. It may therefore be desirable to develop a composite wave-form pattern for each graph to be recorded on the musigraph record since these graphs generally represent tones of different pitch. As pointed out, this would not necessarily require a new harmonizer disk for each tone, inasmuch as the required frequencies for the partials of other tones may be obtained by varying the speed of rotation of table 132 as required. It would be necessary, however, to give suitable consideration to the bearing of amplitude and frequency on the loudness, as above pointed out.

*The musigraph record and production thereof*

One convenient way of producing on a suitable record blank a graph embodying a composite wave-form thus developed by using the harmonizer, is to form a cam or primary pattern in accordance with such composite wave-form and to utilize this cam to control the recording of corresponding wave-forms on the blank, the number of wave-forms recorded in any path being determined by the relative speed of rotation of the cam and the blank. It should be understood that there is recorded an individual graph for each tone to be played on the musigraph, for example a graph representing each note of a musical scale throughout the pitch range desired.

Light-controlling sound records having thereon individual graphs representing all of the selected tones within the desired range may be produced on photographic disks or the like by suitable apparatus, a satisfactory form of which is shown in Figs. 12, 13, 14, 15 and 16. In this form of apparatus a photographic blank 51a of suitable dimensions is rotated in a light proof casing 170 near a light box 171 having in the side towards the disk a light transmitting line or slit 172 arranged radially with respect to the disk and across which a shutter 173 is moved by means including a cam or primary pattern 174 driven by the same means as the disk 51a and embodying the desired wave-form which, for example, may have been obtained by synthesizing partial tone sine curves in accordance with the intensity factors determined in the harmonizing apparatus. It will be noted that the wave-form embodied in the cam or primary pattern 174 has been drawn on a circular axis line and is therefore in such form that it may be conveniently rotated. The wave-form selected may have some rather steep portions, as shown for the organ curve in Fig. 1, and it is therefore desirable to have the curve in lengthened form on the cam so as to obtain an easy action in operating the shutter. The cam 174 may, therefore, be formed with but a single complete wave therearound.

The cam 174 comprises a primary pattern for determining the character of the sound-controlling graphs on the musigraph record. The controlling periphery or face of the cam is subject to varied formation in accordance with the wave form or wave forms drawn by the synthesizer or otherwise determined. The periphery may obviously be formed with a plurality of wave forms as well as with a single wave form and that plurality may be of identical or differing wave forms sought to be repeated in the graphs of the playing record. Accordingly, the term "primary pattern" in the claims hereof should be accorded a wide scope of meaning and not limited to the precise showing of the form chosen for illustration purposes.

In this form of apparatus the light box is supported on a carriage 175 slidably supported at its edges by guides 176, the connection being made, for example, by providing grooves at opposite edges of the carriage to receive the edges of said guides 176. The carriage 175 may be adjusted to different positions radially of a disk 51a on a rotary table 177 in the apparatus by means of an accurately constructed screw 178 journalled in the left hand wall 179 (Fig. 12) of the casing and held against longitudinal movement by means of a collar 180 secured thereon at the inner side of the wall and a finger piece 181 secured thereon at the outside of the wall, the shank of the screw being threaded into a bracket 182 extending downwardly from the carriage 175.

Figure 15:
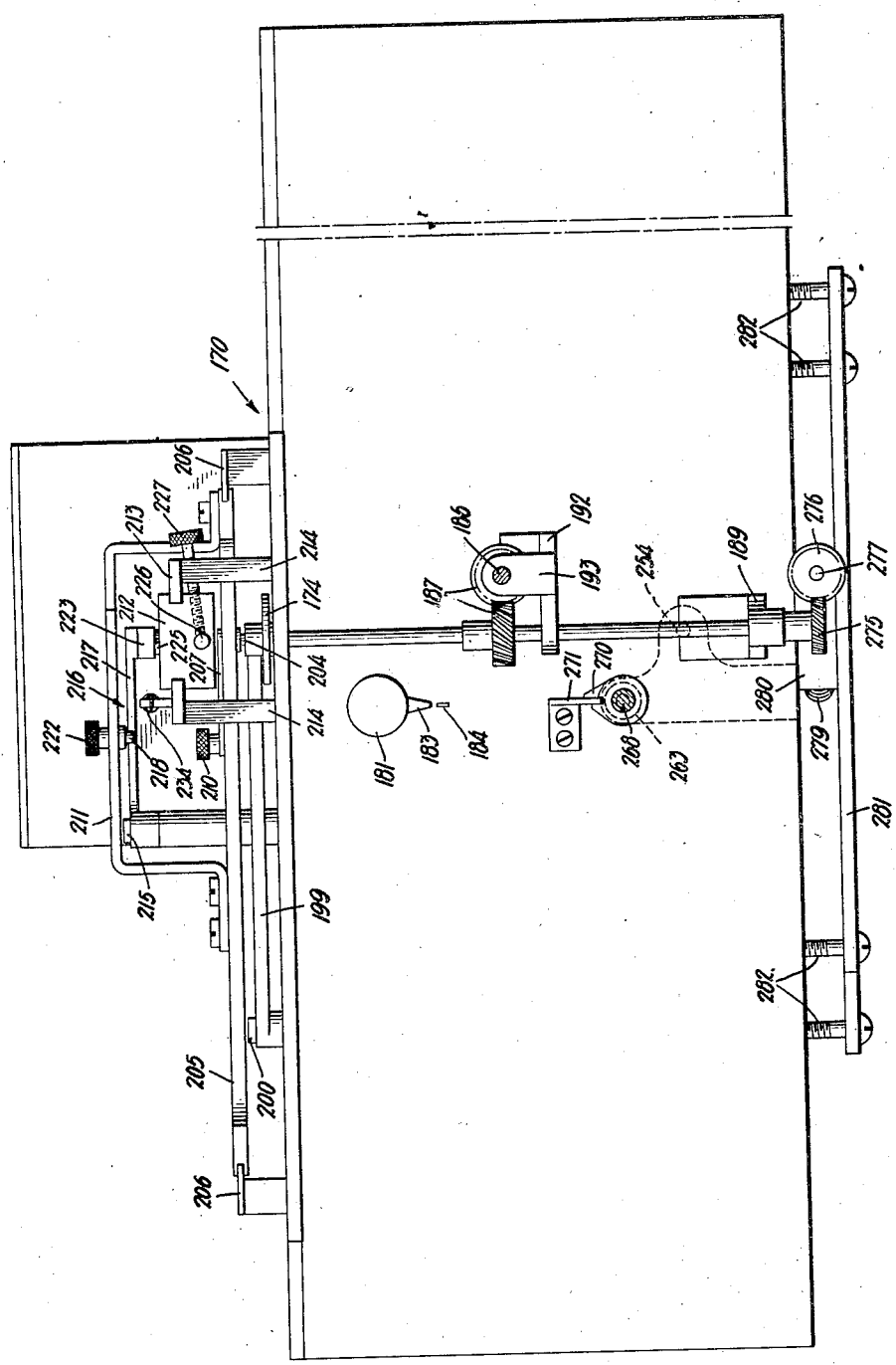
Fig. 15 is a view in elevation of the left end of the structure shown in Fig. 12.
Figure 16:
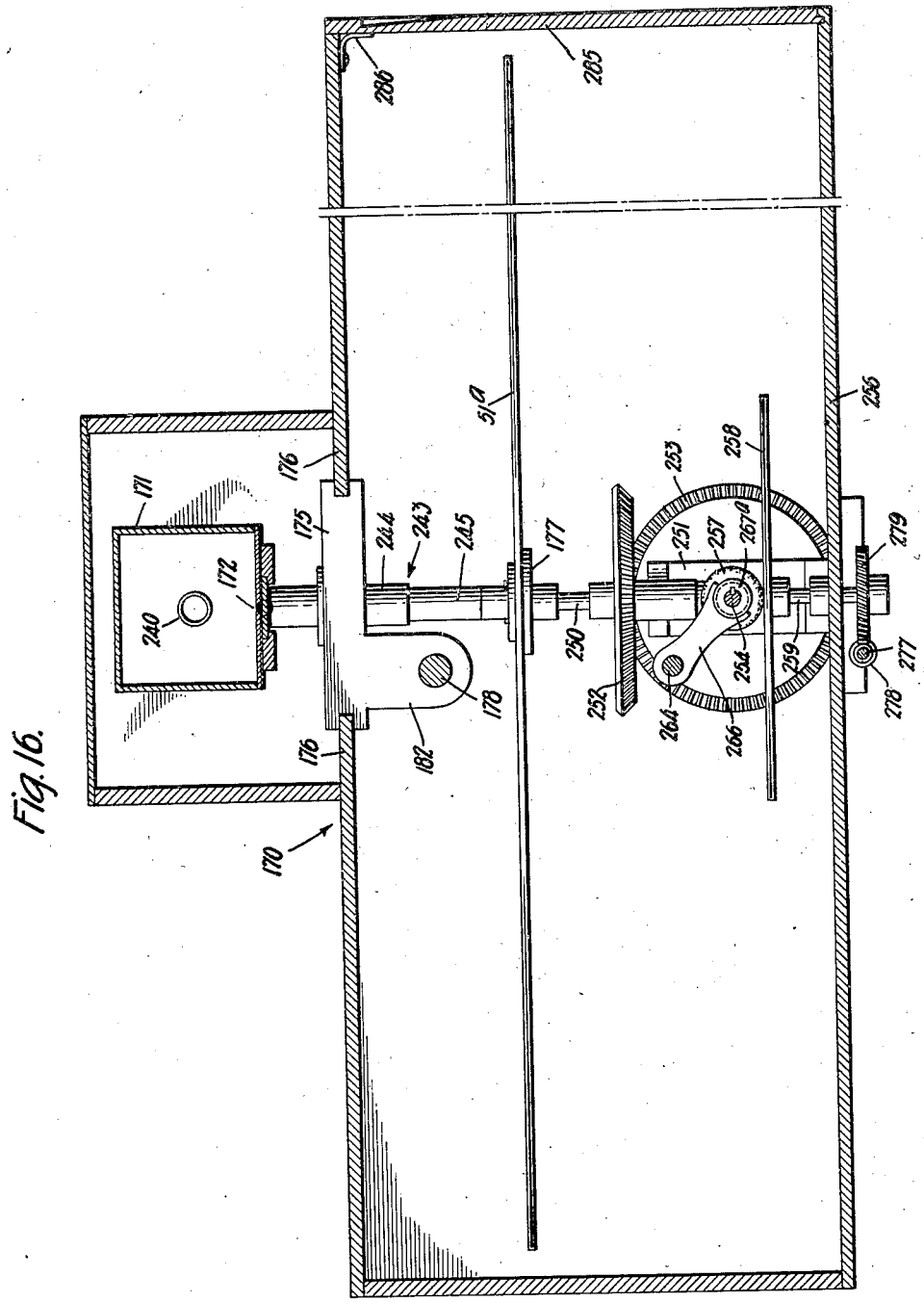
Fig. 16 is a view in section along the line 16—16 of Fig. 12.

The thread of the screw 178 may have such a pitch that one turn of the finger piece or head 181 will shift the light box to provide the desired spacing for successive curves or graphs. As best seen in Fig. 15, the head 181 is supplied with an index or pointer 183 adapted to cooperate with an indication 184 on the front wall of the casing to indicate when a complete turn of the screw has been made.

Both the shutter 173 and the table 177, by which a disk 51 may be rotated, are actuated by means of a shaft 186 operable either by hand or by power and operatively connected by means of spiral gears 187 with a vertical shaft 188 journalled near its lower end in a bracket 189 projecting from the casing at its upper end in a member 190 which also serves to support the shaft 188 by engagement with the lower side of the hub or collar 191 which carries the cam 174 and is secured on the shaft, and at an intermediate point in a bracket 192 having arms 193 in which the shaft 186 is journalled.

In view of the aforesaid relation between the intensity, frequency and amplitude, the amplitudes of the graphs should be regulated to compensate for the variations in frequency to assure tone production of substantially equal loudness. In this apparatus, this result is obtained in the following manner. The cam engages the vertical central edge of the forward end of a follower 194, of which a portion having parallel sides is guided in a groove 195 in the member 190 in which the upper end of the cam shaft is journalled. The slidable follower is also provided with a longitudinal slot 197 through which passes the larger upper portion of a shouldered screw 198 of which the lower end is threaded into the grooved member or support 190. The head of the screw maintains the slidable member or follower in the groove while permitting it to slide longitudinally thereof. At its inner end the follower has a corresponding vertical central edge which serves to actuate a lever 199 about a pivot 200 by engagement with a vertical plane surface 201 on the lever at its outer end and lower side and arranged so that an extension of the plane 201 contains the vertical axis of the pivot.

Above the part having the plane surface 201, the lever 199 is provided with a shoulder having a plane surface 203 facing inwardly to engage a pin 204 projecting downwardly from a slide 205 having grooved outer edges engaging guides 206 which fit therein. The plane surface of the shoulder, which coincides with the surface of the inner edge of the lever along a substantial part of its length, is not immediately over the plane surface engaged by the rear end of the follower but is offset therefrom, just enough so that the axis of the pin 204, when the pin is in engagement with the shoulder, moves in the plane of the surface 201 and therefore moves radially with respect to the pivot of the lever. The pin projects downwardly from a member 207 guided in a slot 208 in the slide 205 and extending transversely thereof. At its other end the member 207 is provided with an index 209 to cooperate with graduations of a scale arranged transversely of the slide so that, for example, in passing from one octave to another, the movement of the slide may be reduced to one half, one fourth, and so forth, of the movement produced when the parts are positioned as in Fig. 14, by reducing the work arm of the lever in such ratios.

The member 207 carrying the pin and the pointer may be secured in adjusted position by means of a clamping screw device 210 at the index end of said member. The slide 205 is also provided with a bracket 211 secured to the slide at both ends and extending over a carriage or block 212 slidable on guides 213 supported at their ends on posts 214 projecting upwardly from member 190. Mounted on a fixed pivot 215, below the bracket, is a lever 216 provided with an outer edge 217 in a vertical plane and engaged by a pin 218 extending downwardly from a member 219 slidable in a slot 220 in the central portion of said bracket 211 and extending transversely of the path of the main slide.

The outer edge 217 of said lever 216 is offset from a parallel plane through the axis of the pivot 215 a distance equal to the radius of the pin so that the axis of the pin will move along said lever 216 radially with respect to the pivot. The member 219 carrying the pin also carries a pointer or index 221 cooperating with a suitable scale on the bracket and may be adjustably secured at any point along the slot 220 by a screw clamping device controlled by a head 222. The lever 216 is also provided with a downwardly extending lug or portion 223 having its inner face 224 in a plane containing the axis of the pivot and engaging the vertical central edge at the outer end of a member 225 connected with said carriage 212. The scale cooperating with pointer 221 is suitably laid out for changes from tone to tone in the same octave.

The block or carriage 212 receives therethrough a member or rod 226 which may be clamped thereto in any desired relation by means of a set screw 227. This member 226 is slidably mounted in the adjacent wall of the upper part of the casing and in a bracket 228 on the light box 171, and is connected with the shutter 173 slidably supported at the lower side of the light box. The movement of the rod 226 to the right (Fig. 12) may be limited by engagement of its end with the adjacent wall of the light box and the connection between the rod and the shutter is such that by such engagement of the end of the rod with the light box the shutter is positioned with its edge at the inner end of the slit 172.

In making the musigraph record, as in making the harmonizer record, it is convenient to record the first graph in a path near the center of the disk and then work outwardly. The light box is accurately positioned for the different paths in which graphs are to be recorded by adjusting the finger piece 181 with its index 183 in register with the indication 184. To indicate the path over which the light box is positioned, graduations 229 are placed at suitable intervals and with certain graduations spaced at intervals corresponding to the length of slit 172 and marked for easy indentification.

Then, with the shutter 173 in its right hand position (Fig. 12), the position of the light box may be read by observing which of said graduations is in alignment with an index 230 at the outer end of a sleeve 231 fastened to the casing 170. After positioning the cam 174 with its zero or mid point 232 against the adjacent end of the follower 194, the member 226 is moved to bring the graduation coinciding with the index 230 into coincidence with an index 233 on a projection at the outer end of the sleeve 231 and at a distance from index 230 equal to half the length of the slit 172, thus positioning the effective edge of the shutter at the middle of the slit. Upon tightening the set screw 227 the shutter actuating means will be ready for operation.

It should be understood that the parts interposed between the cam 174 and the block or carriage 212 are constantly maintained in operative relation by suitable means such as a spring 234 connected (Fig. 12) at its right hand end with carriage 212 and at its left hand end with one of the fixed guides 213.

In order to facilitate the reduction of the throw of the shutter 173 to regulate the amplitude of the graphs in succession outwardly from the center of the disk, it is desirable to make the slit 172 of considerably greater length than the width of the record paths or graphs on the disks or plates 51. On the other hand, the widths of the paths for the graphs or patterns on each plate 51 must be rather small in order to permit curves representing different tones to be obtained on a disk of feasible size.

In this form of the apparatus the slit 172 is made of substantial length and the light in the light box is supplied by an electric lamp 240 with a substantially straight line filament 241 arranged above the slit. The necessary reduction of amplitude may be obtained by use of a lens 242 so positioned between the slit 172 and the disk 51 to be exposed that it will produce on the disk an image of so much of the filament 241 as is available, in view of the length of the slit 172, and with said image sufficiently reduced in length to fall within the permissble graph amplitudes. Obviously, if the slit is sufficiently narrow, satisfactory results may be obtained by forming on the disk a reduced image by suitable optical means.

Preferably, there should be provided means for preventing any light from the slit 172, from falling on the plate 51 except at the image. In the present case, such undesirable light effects are prevented by use of a telescopic casing 243 of which an upper portion 244 is supported by the carriage 175 and a lower portion 245 carrying the lens 242 is suspended from the upper portion. Obviously, the length of the slit and the throw of the shutter may be decreased or the width of the graphs may be increased sufficiently to render the use of a condensing lens unnecessary.

In order to obtain a circular graph or record having a plurality of waves, it will be necessary to revolve the table 177 at a slower rate than the cam 174. Even for the graph nearest the center of the disk it is desirable to have a plurality of waves and, inasmuch as in the tempered scale, for example, twelve notes or graphs are necessary for each octave and in instruments such as the piano and organ a range of at least seven octaves is required, it will be evident that the driving connection between the cam and the table on which the disks are supported must be capable of a very wide range of adjustment.

One way of providing for such a wide range of adjustment of the driving ratio is to provide one means of adjustment to take care of the changes in frequency involved in each octave and another means for adjustment for different octaves to enable the speed of rotation or frequency of the graphs to be varied in that octave by means of the first adjustment. As here disclosed the table 177 is mounted on a vertical shaft 250 journalled in a bracket 251 and having a bevel gear 252 engaging the upper side of the portion of the bracket 251 in which the shaft 250 is journalled, and meshing with a similar bevel gear 253 fixed on a shaft 254 journalled in an upright portion of the bracket 251 and also in a bracket 255 which, together with the bracket 251, is supported by the floor 256 of the casing 170.

Keyed on the shaft 254 to slide therealong and to actuate the same, is a friction wheel 257 having its periphery so shaped, as by rounding the same, to have substantially line contact with the upper surface of a friction disk 258 mounted on a vertical shaft 259 passing downwardly through and journalled in the floor 256 of the casing. Movement of the friction wheel 257 radially of the disk 258 to adjust the driving ratio therebetween, may be effected by means including a finger piece 260 at the outer surface of the wall 179 of the casing and secured on the outer end of a shaft or rod 261 journalled in the wall 179 and also in the bracket 255 above the shaft 254.

The shaft 261 is held from outward movement through the wall 179 by a collar 262 fixed thereon and engaging the inner face of the wall 179, and against inward movement by a collar 263 fixed thereon and engaging the outer face of the wall. At the side of the bracket 255 over the friction disk 258 the shaft 261 is provided with an accurately made screw portion 264 threaded into a collar 265 from which projects a fork 266 projecting into a groove 267 in a collar 267a secured to the friction wheel 257 and loosely mounted on the shaft 254.

Obviously by turning the finger piece 260 the friction wheel 257 may be shifted from its outer position corresponding to the lowest note in an octave, inwardly toward the centre of rotation of disk 258 to positions corresponding to the other notes of the octave. Within the octave the frequencies of the consecutive notes bear respectively fixed ratios to the frequency of the lowest note. In providing the proper speed of rotation of the record plate or blank 51a to assure these ratios, the ratios of the corresponding effective radii on the driving wheel or disk 258 are adjusted to be in inverse proportion to the frequency ratios of the notes. In the tempered scale, the frequencies are multiplied by approximately 1.059 from tone to tone and consequently the effective radius on the disk 258 will have to be divided by the same number in determining the various positions for the friction wheel 257 with reference to the radius at its outside position.

As the radius decreases, the intervals between successive values will become smaller. To indicate at all times the position of the friction wheel, the rod or shaft 261 is provided, just outside the collar 263, with a screw threaded portion 268 having the same pitch as screw portion 264. Mounted on the screw portion 268 is a collar 269 held against rotation and having an index 270 to cooperate with a fixed scale 271 having graduations indicating the positions to which friction wheel 257 is to be set. To enable the operator to avoid overlapping portions of the graphs the shaft 254 is extended through the casing and provided with an index 272 adapted to cooperate with a fixed indication 273.

The shaft 259 carrying the friction disk 258 is actuated from the shaft 188 by means such as a spiral gear 275 at the lower end of shaft 188, a second spiral gear 276 meshing with the spiral gear 275, an adjustably supported horizontal shaft 277 having the spiral gear 276 secured to one end thereof, a worm 278 secured to the other end of said shaft 277, and a worm gear 279 meshing with the worm 278 and fixed on the shaft 259. The shaft 277 is journalled in a frame or member 280, preferably of rectangular cross section, and is secured in position at the lower side of the floor of the casing by means of a clamping plate 281 engaging the lower side of the frame 280 and pressed against the same by screws 282 threaded, for example, into the floor 256 of the casing.

Assuming that the graphs for the lowest octave have been prepared, the friction wheel 257 is again moved to its outside position by means of finger piece 260, and the worm 278 and gear 279 are replaced by corresponding elements which will double the rate of speed transmission from the shaft 277 to the shaft 259. The speed ratio may be changed for the various notes in the new octave by again turning the finger piece 260, after the reproduction of each graph, to move the index 270 into register with the next inner indication on the scale 271.

The illustrated construction of frictional drive with its control by the finger piece 260 offers a ready means for making the corrective adjustment to assure that the first wave recorded accords with and merges into the last wave recorded in each respective circumferential exposure in connection with the making of a musical record for playing in the tempered scale. When the position of the friction wheel 257 has been adjusted to the correct radius on the friction disk 258 to produce the correct relation in number of wave-forms recorded, if an adjustment were not made that is if the relative speed of the blank and the primary pattern were not varied during the recording of certain graphs, the first and last wave-forms recorded would be out of phase to such an extent that the particular graph in question would fail to produce in tone production a continuity of uniform tone quality, the continuity being interrupted by a thumping sound upon each rotation of the disk. By turning the piece 260 one or more inconsequential errors may be introduced during the recording of such a graph so as to bring the first and last wave-forms recorded substantially into phase without affecting to any consequential extent the phase relationship of the other successively recorded wave-forms and thus to assure continuity of tone production at the desired pitch. Thus it is possible by shifting the phase of the wave-forms being recorded on a single blank individual graphs with all of the successive wave-forms substantially in phase and adapted to control with continuity of tone quality the production of the twelve tones comprised within the tempered scale octave.

Obviously the driving ratio between shafts 188 and 259 may be varied over a wide range, for example, by effecting such gear changes at the lower end of shaft 259 and the corresponding end of shaft 277 until the practicable limit is reached, and then changing gears at the lower end of shaft 188, as by substituting suitable worms and worm gears for spiral gears 275 and 276 respectively.

After exposures for all of the graphs have been effected, the blank or disk 51a may be removed under dark room conditions and developed to form a light controlling sound record 66a. In such removal the slide 285 (Fig. 16), which is sealed against light by rib and groove connections at three sides and flap 286 at the top, is raised and the lower portion 245 of the telescopic casing 243, is lifted sufficiently to permit removal of the disk 51a from the table 177 after the fastening device 286' at the upper end of the shaft 250 is removed. The record 66a thus obtained, might be used in playing the hereinafter-described musigraph of the present invention, but ordinarily would be used, at least at first, for producing a record in which the transparent and opaque portions would be reversed and which could be used for printing other records like the first, thus acting as a master record. A showing of a short length of the pattern nearest the center of the record 66a appears on Fig. 17. It should be understood that this showing is merely illustrative and that due to the small scale thereof, the characteristic shape of the curve separating the transparent and opaque portions of the pattern is difficult to show. Actually such curves are decidedly irregular, an example of such curve being found in the organ curve shown in Fig. 2.

As illustrated the exposure of the record blank for each graph extends across each individual path, from which it follows that the resultant positive playing record will comprise a graph containing wave-forms in which the maximum amplitude of the transparent portion is approximately equal to the maximum double amplitude of the wave-form. In other words the paths in which the graphs are recorded are completely modulated by the recorded wave-forms. Thus when the graph is scanned by a properly positioned line of light, the light variations will fluctuate between a value of approximately zero and a value determined by the maximum double amplitude of the wave-form and the intensity of the scanning beam. As explained above, the light-controlling sound record may comprise individual graphs adapted to control the production of tones which have an integral pitch relationship such as the tones of the natural scale, or may comprise graphs adapted to control the production of tones having a non-integral pitch relationship such as the twelve notes of the tempered scale octave. Obviously either a positive or a negative may be employed as a musigraph record.

The musigraph

Figure 17:
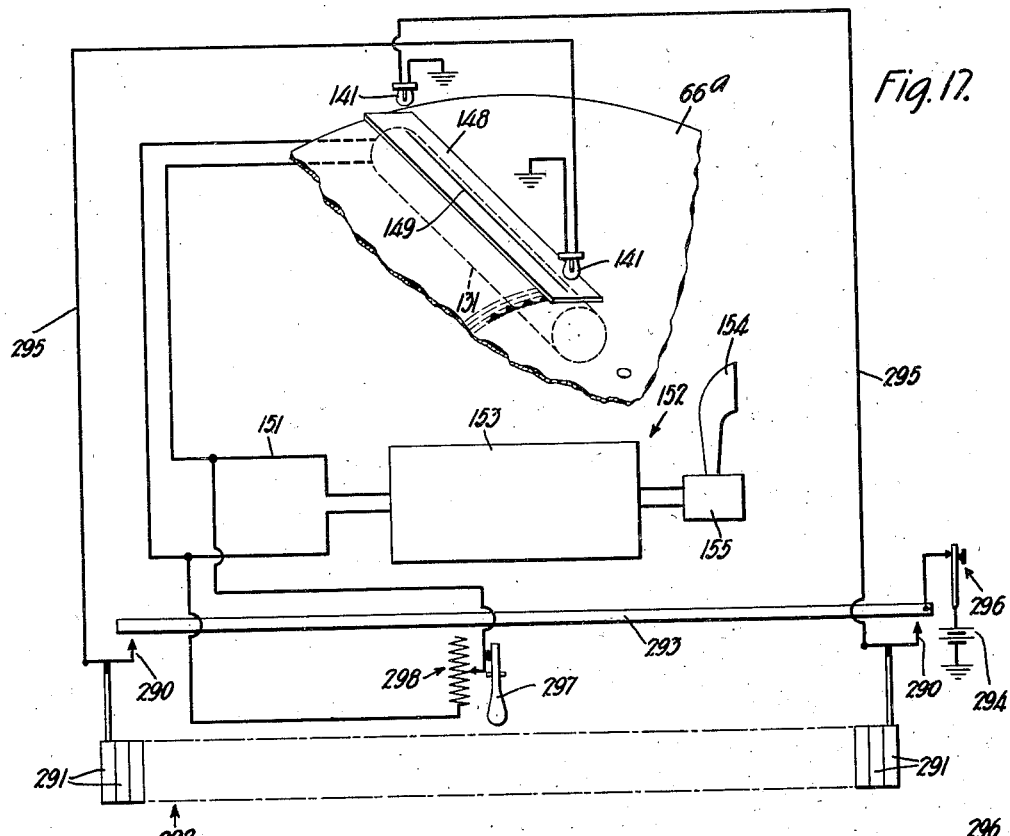
Fig. 17 is a diagrammatic view illustrating a preferred form of musigraph utilizing a single sound-controlling record.

The musigraph is the instrument for playing musigraph records of the character described and includes apparatus such as shown in Figs. 7, 8 and 9, and described as part of the harmonizer. When used as a part of the musigraph, the unit 137 must have therein as many lights as there are notes to be played and, as indicated in Fig. 17 which presents a diagrammatic showing of a complete key-controlled musigraph, each one of these lights or lamps 141 must be controlled by a separate switch member 290, preferably controlled by a key 291 of a keyboard 292. The key controlled switch members 290 cooperate with a common switch member or contact 293 connected with a battery 294.

Upon operation of any one of the keys 291, of which the ones at the extreme left and right are shown as connected with such switch members 290, the corresponding switch member is moved into engagement with the common switch member 293 and the current from the battery 294 passes through the corresponding lamp circuit 295, lamp 141, and a ground back to the battery. When the instrument is not in use the battery may be disconnected from the member 293 by opening the switch 296 between the battery 294 and the member 293. The light from this lamp passes through a pattern or graph on a rotating record disk 66a to the photo-electric cell 131 and the resultant light variations cause corresponding current variations. These current variations are amplified and converted into sound by means of a sound producer 152 including a loudspeaker 155. Variation in the volume of sound coming from the sound producer 152 may be effected by means of a foot pedal 297 arranged to operate or control a variable resistance 298 connected in shunt across the photo-electric cell circuit 151.

Figure 18:
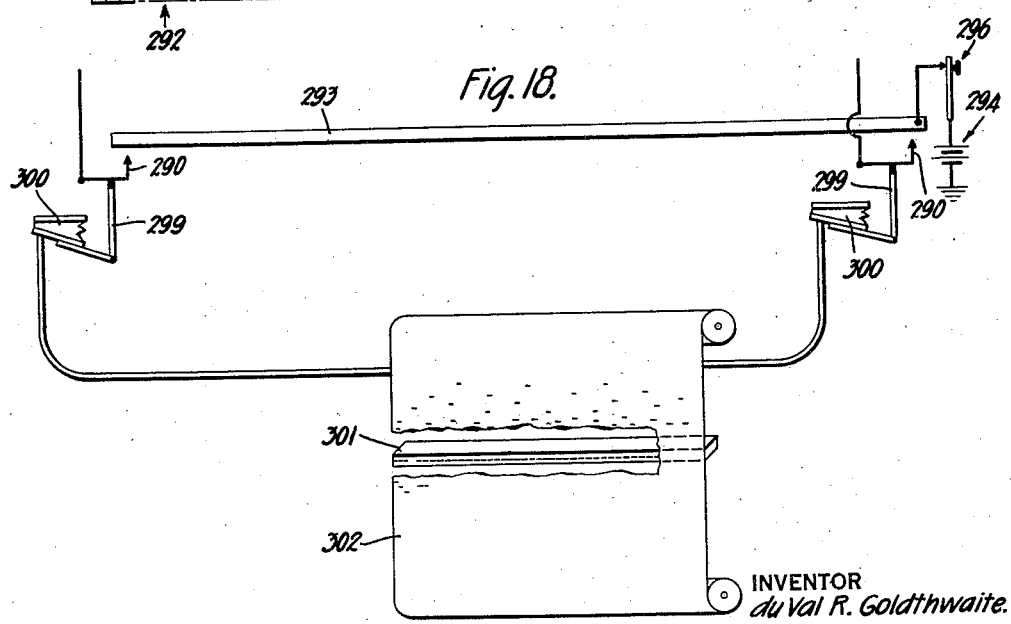
Fig. 18 is a view illustrating means for controlling the musigraph automatically.

The musigraph may also be played automatically as, for example, by apparatus of the type used in player pianos. One form of playing apparatus is indicated diagrammatically in Fig. 18 and includes links 299 connecting movable contacts or switch members 293 with bellows 300 of a pneumatic system, which may be of a usual type, a tracker bar 301 and a perforated sheet or music roll 302 in accordance with which the bellows are operated.

It should be understood that a plurality of musigraph records comprising graphs is adapted to control the production of a wide variety of tone quality by utilizing a plurality of manuals and controlling and combining the tones much in the same manner as a large pipe organ. Automatic means may be arranged for such control, as by a plurality of perforated patterns or rolls or a single pattern or roll having different portions for the control of the musigraph pattern or records to be played in combination.

*Modified apparatus for producing harmonizer graphs*

One form of apparatus for producing light-controlling sound records comprising individual sine wave graphs and which are suitable for use on the harmonizer has been shown and described as a preferred form. It should be understood, however, that various changes may be made in that form of apparatus and that other forms of apparatus may be used. For example, instead of varying the eccentricity of the pin producing the harmonic motion of the shutter, to vary the amplitude of the various sine curve graphs, such changes in amplitude may be produced without changing the throw of the shutter, as by using a lens between the shutter-controlled slit in the light box and by properly varying the relative distances between the lens, light box, and record blank.

A form of apparatus in which the change in amplitude is effected by shifting the lens is shown in Figs. 19, 20, 21 and 22 and has various features in common with the apparatus for the same purpose shown in Figs. 3, 4, 5 and 6, and with the apparatus for producing the playing or musigraph records, illustrated in Figs. 12, 13, 14, 15 and 16. As much of the apparatus as can be conveniently, is enclosed in a light proof casing 310 having a relatively broad base portion 311, in which the photographic plate disks 51 are rotated, and a central upright portion 312 to provide for a sufficient range of adjustment of a lens 313. In this connection it may be said that to obtain the proper range of adjustment while imparting a considerable throw to the shutter 314 of the light box 315, it is necessary to have the light box at a considerable height above the plane of rotation of the disk 51. As shown most clearly in Fig. 20 the casing 310 is in the form of an inverted T and the base portion is provided at one side with a slide 316 which, around all of its edges except at the side where it is withdrawn, is provided with a suitable rib 317 engaging in a corresponding groove in the walls of the lower casing portion 311, these connections along two side edges of the slide or door serving as guiding means and also along the whole length thereof as means to prevent the passage of light. Along the top of the slide, such sealing is obtained by a flexible flap 318 (Fig. 20). This arrangement provides for insertion of sensitized plates and withdrawal thereof after exposure.

Near the bottom wall 319 of the casing and substantially at the center thereof is a rotary table 320 adapted to support photographic disks 51. The table 320 is secured to a vertical shaft 321 extending downwardly through the lower wall 319 of the casing and upwardly above the table 320 to position disks 51 by insertion into central openings thereof and to enable fastening devices 322 to be secured thereon, as by screw threads, to hold the disks 51 firmly against the table 320. The light box 315 is located near the top wall 323 of the central upright portion of the casing and for reasons to be brought out more fully hereinafter is supported on a frame 324 slidable on opposed guides 325 in the upper part of the casing and opposed slides 326 in the lower portion of the casing, as shown with greatest clearness in Fig. 21.

The frame 324, in the satisfactory form here disclosed, comprises a member 327 adjacent the light box and having grooved edges to receive the guides 325, a second block or member 328 engaging the guides 325 in the same manner and spaced from the block 327 by a suitable connector such as 329, corresponding slide members 330 and 331 mounted on the guides 326 at the bottom of the casing and held in fixed relation with respect to each other by a connector 332, an upright 333 connecting the blocks or slides 327 and 330, and an upright 334 connecting the blocks or slides 328 and 331.

The light box 315 is mounted on the slide 327 by means of an interposed support 335 and is constructed with a bottom wall 336, having a slit 337 extending radially with respect to the table 320, the shutter 314 being slidably supported in suitable guiding means immediately beneath said lower wall 336 and being limited in movement in one direction by engagement with the side of the light box, of the end of a member or bar 338 connected with the shutter to operate the same and extending in the opposite direction through a wall 339 of a part of the casing to the outside thereof where it is adjustably secured by means of a set screw 340 in a carriage 341 slidably mounted on opposed upper edges of stationary guides 342.

Actuation of the carriage 341 and rotation of the shaft 321 connected with the table 320 is effected through suitable connections by means of a shaft 343 which may be turned manually or by other suitable actuating means. At the end of said shaft 343 nearest the adjacent wall 344 of the casing 310, it is journalled in a bracket 345 connected with said wall 344 and is provided at said bracket with a spiral gear 346 meshing with a spiral gear 347 on a vertical shaft 348. Near its top the shaft 348 is journalled in a bracket 349 which also serves to support the guides 342. The shaft 348 is operatively connected with the carriage 341 by means of an eccentric pin 351 on an arm 352 secured to the upper end of the shaft 348, which pin projects into a carriage or slide 353 slidable transversely of the guides 342 in guiding means 354 secured to the carriage 341 at its lower side.

At its lower end the shaft 348 is journalled in a bracket 355 and adjacent said bracket is provided with a spiral gear 356 meshing with a spiral gear 357 on a shaft 358 having at its other end a worm 359 meshing with a worm gear 360 fixed on the lower end of the shaft 321. In order that the shaft 358 may be shiftable to permit the use of different gears or driving connections, it is mounted in a frame or member 361, preferably of rectangular cross section, which is clamped in the desired position against the lower face of the bottom wall 319 by a plate 362 beneath said frame 361 and attached to said lower wall 319 by screws 363. This arrangement for adjustment is similar to that shown in Figs. 3 and 4 and also to that shown in Figs. 12 and 15.

It may be assumed that the lens 313 is properly positioned with respect to slit 337 at the bottom wall of the light box to form on a disk 51 on the table 320 a radially positioned image of said slit and of substantially the extreme amplitude for the fundamental sine wave which is to be produced nearer the center of the disk than the sine waves of the overtones. It will be evident that this position of the lens 313 is the highest position which it assumes and that to reduce the amplitude of the different sine waves outside of the fundamental sound wave, the lens 313 must be lowered through suitable corresponding distances. It should also be understood that it is desirable to direct the light at the slit to the proper part of a disk on the table and to prevent spreading of such light and consequent exposure to some extent of other parts of the sensitized disk 51. It should be understood that in case the lamp in the lamp box or chamber is formed with a straight line filament of suitable length, there will be no necessity of having the light pass through a slot and the image of the straight line filament may be produced on the disk and the length of the image may be varied as required by properly regulating the relative distances between the lens, light box, and record blank.

According to one way of meeting these requirements, the lens 313 is mounted in the lower end of a tube 364 which is slidable in an annular bearing 365 in the lower end of a tube 366 supported on the block 327 with its upper end immediately beneath the path of the shutter 314. At its upper end, the tube 364 is provided with an annular projecting portion 367 fitting the interior of the tube 366 and by engagement with the bearing 365 preventing separation of these tubes by downward movement of the tube 364. At its lower end the tube 364 fits into a tube 368 and is connected therewith in such manner that the tube 364 cannot be pulled upwardly out of the tube 368 but may be moved downwardly into the same, and a similar connection exists between the tube 368 and a tube 369 supported by the lower block or member 330 with its lower end adjacent the upper surface of a disk 51 on the table 320.

Figure 19:
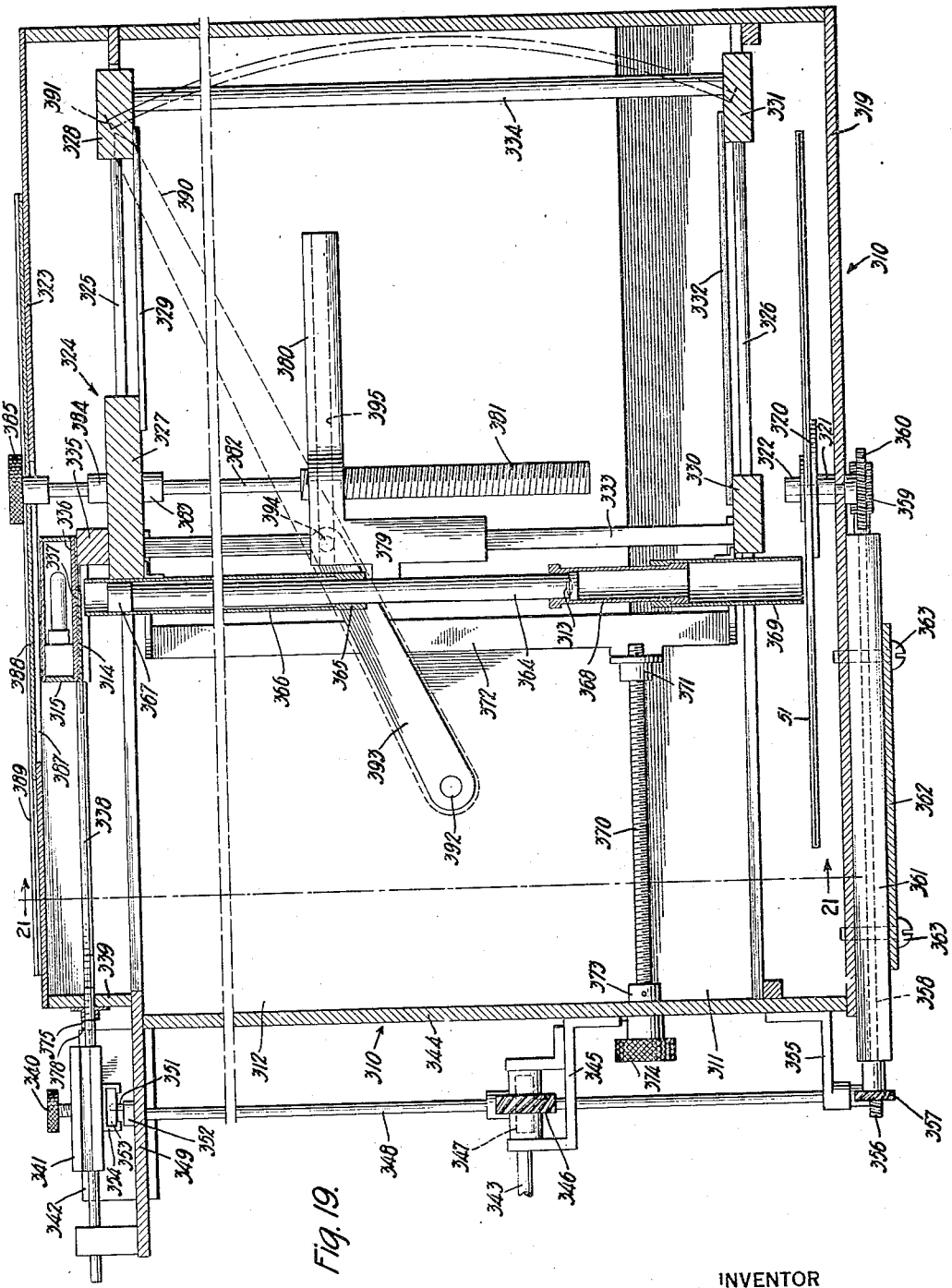
Fig. 19 is a view, in section along the line 19—19 of Fig. 20, of another form of apparatus for producing harmonizer records or patterns.
Figure 23:
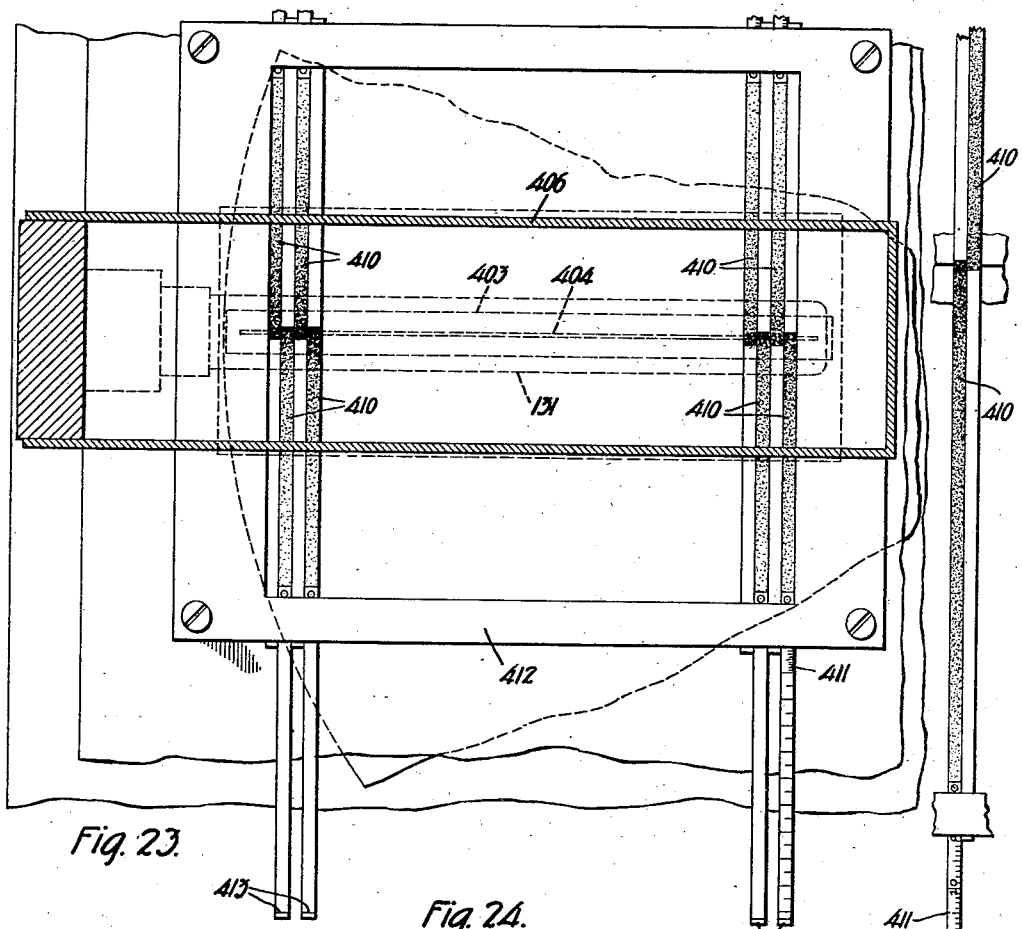
Fig. 23 is a fragmentary view illustrating another means for varying the light falling upon the harmonizer record.
Figures 24, 25:
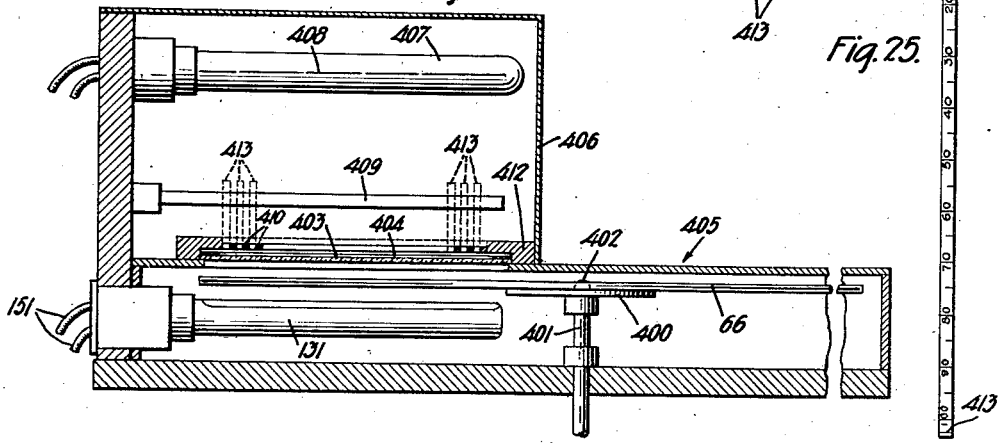
Fig. 24 is a vertical sectional view of harmonizer structure involving the features of Fig. 23.
Fig. 25 is a view on a larger scale of the light wedges and scale strips of Fig. 23.

It will be evident that, by virtue of this arrangement, the tube 364 carrying the lens 313 may be moved up and down without disturbing the substantially light proof connection between the various parts just described. If the tube 364 be moved downwardly from its uppermost position (Fig. 19), the tube 368 will move downwardly therewith and pass into the tube 369 until an external shoulder at the upper end thereof engages the top of the tube 369, whereupon the tube 368 will remain stationary and the tube 364 will move downwardly with respect thereto. During the return movement of the tube 364 it will pick up the tube 368 and raise it until the extreme upper position thereof is reached as indicated in Fig. 19.

As will be readily understood each adjustment of the distance between lens 313 and the lamp box 315 requires an adjustment in the distance between lens 313 and the record blank 51 in order that the image of light slit 337 be sharply focussed on the blank. Suitable means may be readily provided whereby record blank 51 may be raised or lowered to its correct position with respect to lens 313. For sake of simplicity such means are not indicated on the drawings.

In exposing the sensitized disk or plate 51 to produce sine curve graphs in concentric annular areas, it is necessary to move the carriage 324 so as to shift the light box and accompanying parts radially with respect to the table 320; and in forming the graphs of the overtones with frequencies which are multiples of the frequency of the fundamental graph, it is necessary to regulate the amplitudes in order to obtain equal loudness in the tone production.

The first of these requirements may be met by providing a screw 370 threaded into a boss 371 on a member 372 connected at its lower end with the member 330 and its upper end with the member 327, both of which are parts of the frame 324 slidable along the upper guides 325 and lower guides 326. The shank of the screw 370 extends through the wall 344 and is held against longitudinal movement therethrough in any suitable manner, as by means of a collar 373 fixed on the shank and engaging the inner face of said wall 344 and a roughened head 374 at the outside of the wall and provided with a hub engaging the outer face of said wall.

Before operating the head 374 the pin 351 should be brought to its extreme right hand position (Fig. 19) and the set screw 340 then loosened. Then by turning the head 374 the carriage 324 may be moved to the next position in which a sine graph is to be produced. The screw 370 may be provided with a screw thread of such pitch that one turn of the head will produce the required amount of movement, the particular overtone graph to be produced at any time being indicated by a scale on the bar 338 when referred to an index 375 at the outer edge of a sleeve projecting from the wall 339 and the exact position of the carriage for each graph being determined by bringing a pointer 376 associated with the head 374 (Fig. 20) into alignment with an indication 377 on the wall 344. Preferably the shaft 348 should be turned through an angle of ninety degrees from its Fig. 19 position and the shutter should be set at its mid position before tightening the screw 340 so as to position the graph along the medial line of the record path. The central position of the shutter 314 is obtained by shifting the bar 338, the set screw 340 being loose, to move the graduation in alignment with the index 375 to a position in which it registers with an index 378 at a distance from index 375 of half the length of the slit 337 and at the outer edge of a lug projecting beyond the end of the sleeve.

Control of the position of the tube 364 carrying the lens 313 is obtained by a member 379 mounted to slide on the upright 333 of the frame 324 and connected with the tube 364 by means of a laterally projecting lug. Preferably the upright 333 is rectangular in cross section. Projecting laterally from the member 379 and parallel to the tracks or guides 325 and 326 is an arm 380 having adjacent to the member 333, an internally threaded boss receiving a vertical screw 381 with a threadless shank 382 projecting upwardly through the member 327 and held against vertical movement therethrough by a collar 383 at the lower side thereof and a collar 384 at the upper side thereof.

The turning of the screw may be effected by a handle or finger piece 385 on the shank at the upper side of the wall or top 323. This handle must, however, move with the carriage 324. It is therefore necessary to provide in the upper wall or top of the casing a slit 387 of sufficient length to permit adjustment of the carriage or frame as desired, this slit being sealed against entrance of light from the outside by a slide 388 of substantially twice the length of the slit and moving between guides 389 on the upper side of said wall 323 of the casing.

The position of the lens 313 may be indicated at the outside of the casing by the tip of a long pointer 390 in connection with a suitable scale 391, the pointer or arm being secured on the outer end of the shaft 392 passing through the casing and having at its inner end an arm 393 with a pin or follower 394 slidable in a slit 395 at one side of the arm 380.

*Modified form of harmonizer*

Another form of harmonizer or apparatus for synthesizing the various partials is illustrated in Figs. 11, 23, 24 and 25 and includes a photoelectric cell 131 of proper size and suitable characteristics operatively connected with an electrical circuit 151, which may be connected as shown in Fig. 10 with a sound reproducer 152 including an amplifier 153 and a loud speaker 155, both shown in Fig. 10. Adjacent to the photo-electric cell 131 is a table 400 carried on the upper end of a rotatable shaft 401 and adapted to support and rotate a disk 66 having developed thereon the graphs of the fundamental partial of a tone and a suitable number of overtone partials as already described.

When on the table 400 in proper position as determined by the central projection 402, the disk 66 is so positioned as to extend across the window of the photo-electric cell. Immediately above the plane in which the disk is rotated there is a glass plate 403 rendered opaque, as by silvering its upper surface and provided with a narrow transparent line 404 as by scratching the silvered surface. The photo-electric cell and the turntable 400 are located in a casing 405 which is light proof except at the part where the glass plate 403 is located above the photo-electric cell and this portion of the casing 405 is covered by a light proof box 406 in which is located a lamp 407 having a substantially straight line filament 408 in a vertical plane above the transparent line in the plate 403, the light from the filament being passed through a lens 409 which produces an image of the filament at said transparent line.

When the shaft 401 is rotated at such a speed as to give a proper frequency for the fundamental tone graph the light from the filament 408 in passing through the developed disk 51 will vary the flow of current through the circuit 151 of the photo-electric cell 131 and will cause sound to be produced at the horn 154 of the loud speaker 155. By varying the intensities of the various partials the tone quality produced may be modified at will, with the result that a tone of any desired quality may be built up.

Adjustment of the intensities of the various partial tones may be effected by the use of narrow strips 410 of suitable material such as photographic film arranged to have varying degrees of transparency as illustrated in a diagrammatic showing in Fig. 11. The strips 410 are so exposed that the degree of transparency changes uniformly from zero transparency to perfect transparency and the amount of the light shining through any one of these strips may be determined by a scale 411 which indicates at any time the position of the strip or light wedge and therefore both the degree of intensity of the light shining on any one of the various graphs and the degree of intensity of the corresponding partial tone at the loud speaker.

Inasmuch as the strips or shutters 410 are very narrow and also the scales cannot readily be read if too close together, such strips or light wedges are arranged alternately to extend in opposite directions. Also in view of the difficulty in putting suitable scales on the strips 410, the scales 411 are formed on separate strips, preferably of metal, and attached at their ends to the strips or light wedges 410.

By making the light wedges of considerable length, it is possible to make scales of considerable length indicating varying degrees of transparency from zero to one hundred and enabling very exact adjustment of the intensity of light on any individual graph. The strips 410 and the scales 411 are held in place by a frame 412 engaging the outer sides of the outer strips or shutters at opposite sides of the group, the intermediate strips being guided by engagement with the strips on opposite sides thereof and all of the strips being held down by said frame.

The shutters may be shifted by handles 413 at the outer ends thereof and the reading of the scale for each strip may be done with reference to the outer edges of the frame 412 beneath which the scale strips 411 are moved. When all of the light shutters are in the positions required to produce the proper tone qualities at the horn of the loud speaker, the readings giving the intensity factors of the various tones may be read from scales 411 and the graphs synthesized in accordance with such intensity factors.

The intensity factors of the various partial tones may also be measured by means of an instrument 158 (Fig. 10), such as a vacuum tube volt meter or micro-ammeter connected in shunt across the photo-electric cell circuit. For this purpose, the scales connected with the light wedges might be merely position-determining scales and not scales from which measures of intensity factors can be read. The measurement of the intensity factor for any partial tone, after the adjustment of all the light wedges to produce the proper tone quality, would be effected by shutting off the light from all other graphs as, for example, by moving all of the other shutters or light wedges to zero positions or to bring opaque portions thereof over the light transmitting line or scratch 404. To measure the intensity factors of other partial tones it would be necessary to restore each of the other light wedges to its adjusted position in accordance with its scale reading and all of the others to light-obstructing position.

It will be seen that by properly adjusting the light wedges, a tone produced at the loud speaker can be given the timbre or quality of a desired musical instrument by comparison of the tone thereof with the tone from the loud speaker.

Modified form of musigraph

The musigraph may take other forms than that disclosed in Figs. 7, 8, 9, 17 and 18, and one of these other forms, namely, a form in which the playing of the different graphs is controlled by a series of opaque shutters, will now be described. As shown more or less diagrammatically in Figs. 26, 27, and 28, a disk 66a with a complete series of characteristic graphs corresponding to the notes in the range of the instrument of which the playing is to be simulated, is placed in a light proof casing 420 and rotated about an axis 421 by any suitable means for effecting a uniform rate of rotation. The plate 66a is positioned immediately beneath the upper wall or top 422 of the casing 420 and between a photo-electric cell 131 immediately beneath the plane of rotation and extending radially of the disk, and a slit 423 in said upper wall 422 also arranged radially with respect to the disk 66a and as close thereto as practicable.

The slit 423 is covered by a glass plate 424 rendered opaque as by silvering its upper surface and having a light transmitting line 425 extending radially with respect to the disk and produced by a scratch extending through the silvering on the upper surface of the glass plate. At each side of the plate 424 are bars 426 which serve to hold the plate in position and to support opaque shutters or slides 427 arranged with alternate shutters coming in from opposite sides and extending completely across the light transmitting line 425, preferably being spaced from the surface of the plate 424 by means of a thin transparent strip 428. The shutters 427 are held in position on the bars 426 by bars 429, the construction being such in general that the openings between the shutters at each side are closed so as to prevent the admission of light and also to provide suitable guiding means for said shutters. Resting on the bars 429 is a light proof box or casing 430 in which are located a lamp 431 having a long bulb and a substantially straight line filament 432, of which the image is produced at the light transmitting line 425 by means of a suitable lens 433 which may be in the general form of a bar.

The photo-electric cell 131 is in a circuit 151 connected with sound producing means 152 including amplifying means 153 and a horn 154 forming part of a loudspeaker 155. Upon removing or withdrawing any of the shutters 427 sufficiently to expose the line 425 at that point, the corresponding sound will be translated and produced by the sound producing instrument 152. Preferably each of the slides or shutters 427 is operated by an electro-magnet 434 which has a core 435 acting when energized to swing an armature 436 against the core and withdraw the corresponding shutter 427. As here shown, each of the armatures 436 is pivoted at its upper end to a frame 437 which extends down to the other end of the magnet where it is connected with the core 435 so as not only to support the magnet but also to short circuit effectively the magnetic lines of the core, the forward swing of each armature being limited by the arm 438 connected with the armature at its upper end and adapted to strike the upper side of the member or frame 437 when the shutter reaches its closed position to which it is urged by a spring 439. At its lower end each armature has a downward extending arm 440 by which the corresponding shutter is operated.

As a result of the narrowness of the strips or shutters 427, it is necessary to arrange the magnets in staggered relation and in at least two rows at each side, the arms 440 of the magnets of the inner rows being connected directly by loose pivotal connections with lugs 441 on the shutters and the magnets to the rear on each side being connected with the slides by means including intermediate links 442. The shutters 427 connected with the inner set of magnets may be shorter than those connected with the magnets of the outer rows.

As indicated in Figs. 26 and 27 the frames 437 are connected at their tops by screws 443 to bars 444 extending across above the four sets of magnets and the bars of each pair at opposite sides of the central casing 430 are secured by screws 445 to uprights 446.

In this form of musigraph the electro-magnets 434 are thrown into and out of action in the same way as the lamps 141 are thrown into and out of action in the form of musigraph shown in Fig. 17. When it is desired to play the musigraph a switch or key 450 is closed to supply current from a suitable source of supply such as a battery 451 and a switch 293 is closed to supply current, as from a battery 294 to the common contact or switch member 293 such as is used in the musigraph shown in Fig. 17. With the exception of the source of light and the shutter control of the light falling on the musigraph record 66a the apparatus shown in Fig. 28 is substantially the same as that shown in Fig. 17.

Upon depressing any one of the keys 291 a corresponding switch member or contact 290 is moved into contact with the common contact or switch member 293 and current passed from the source of supply 294 through the common contact 293, the individual contact 290, a corresponding conductor 295 and the coil of the corresponding magnet and is then grounded for return to the battery.

The corresponding magnet is thus energized and withdraws the shutter 427 with which it is connected, thereby opening the light transmitting line 425 to permit light from the lamp 431 to fall on the corresponding record path on the musigraph record and, in case the musigraph record is revolving at the requisite speed, the selected tone will be played. Upon release of the key 291 which has been depressed the current will be broken and the shutter restored to its original position.

By playing the keys 291 of the keyboard 292 light may be admitted to the various record paths on the musigraph records 66a thus causing changes of resistance in the photo-electric cell 131 and varying the current through the photoelectric cell circuit 151 in such a manner that when translated into sound by the sound producer 152 the desired musical sounds will be produced at the horn 154 of the loud speaker 155. The intensity of the sounds produced through the loud speaker may be varied by means of the foot pedal 297 which controls a variable resistance 298 arranged in shunt across the photo-electric cell circuit 151. Obviously, this form of musigraph can also be played by automatic means such, for example, as that illustrated in Fig. 18.

*Modified forms of harmonizer and musigraph patterns and modified apparatus and process for making and using such patterns*

An enlarged view of a type of light-controlling pattern or graph 460, commonly referred to as the variable density type, which may be used in connection with both harmonizer and musigraph, is shown in Fig. 29. The density of this type of graph is uniform across its breath but varies along its length. Patterns of this character are formed in general by converting electric current variations into corresponding light variations, and recording such light variations, for example, on a moving photographic surface through or along a narrow line, between the source of light and the photographic surface, which line may be termed a light-transmitting line.

Figure 3:
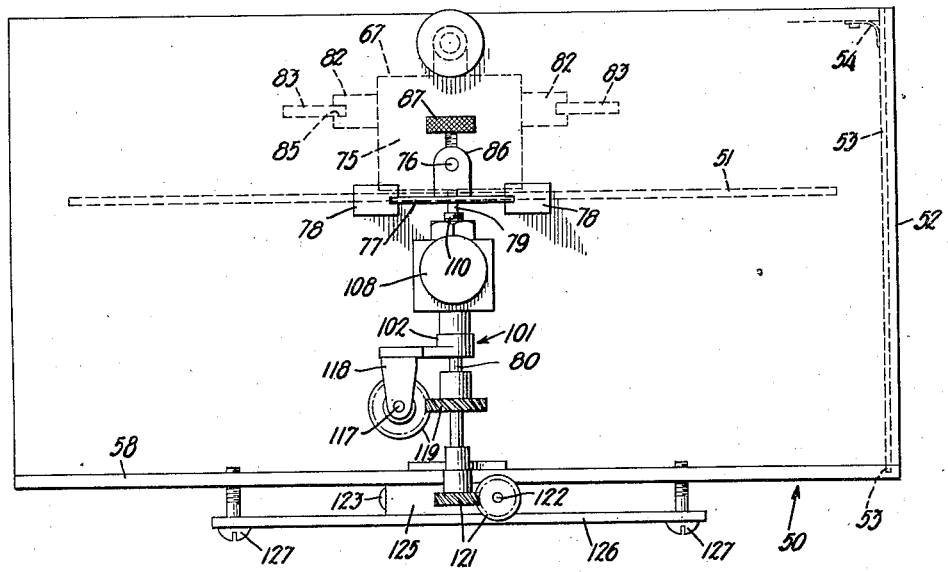
Fig. 3 is an end elevation of one form of apparatus for producing patterns or records for use in the harmonizer.

It will readily be understood that graphs of the variable density type referred to above may be produced in a form suitable for use in connection with the harmonizer, reference being had to Fig. 30 which shows diagrammatically one way of making such patterns. Rod 461, properly actuated by suitable means, such as shown in Figs. 3, 4 and 5 or in Figs. 19, 20, 21 and 22, causes a contact point 462 to move with harmonic motion along a resistance member, such as a wire 463 which is here shown at straight. Methods and means for producing or obtaining harmonic motion have already been described in connection with the figures just referred to.

The contact point 462 and the resistance wire 463 are included in an electric circuit connected with a neon lamp 464, or other light varying device enclosed in a light chamber or box 465 with a short, narrow light-transmitting line 465' in the lower side of said chamber. The circuit may be completed by wires 466, 467, 468 and 463', a suitable battery 469, and a variable resistance device 470 including a resistance 471 and a sliding contact 472. The light chamber 465 is supported in close proximity to a photographic plate or harmonizer blank 51 mounted for rotation on a table 473 at the top of a shaft 474, the light transmitting line extending radially of the table.

It will readily be understood that, inasmuch as the neon lamp 464 has the property of varying its intensity in correspondence with the variations of current in the circuit in which it is connected, by imparting harmonic motion to contact point 462 and thereby varying the resistance and consequently the current through the lamp 464, corresponding variations in the intensity of the neon lamp will be produced and may be recorded as variable density type graphs or patterns by exposing photographic plates or blanks and developing them in the same general manner as described for the sine curve variable width graphs or patterns. In its final form the harmonizer pattern or record 66b will include a plurality of variable density type graphs concentrically arranged and adapted to control the production of the partials of a musical tone.

In order that the harmonic motion of contact point 462 may be the only factor affecting the opacity of the patterns, it is important that while the light variations from the neon lamp are being recorded, the photographic member or plate be moved or rotated at a uniform rate of speed. Patterns adapted to produce partials of the desired frequency may be formed by varying the relation between the speed of the harmonic motion of contact point 462 and the speed of rotation of the photographic plate 51. Satisfactory means for varying the relative speeds have been described in connection with the production of sine curve harmonizer patterns. If desired the average density of each of the patterns may be varied through use of the variable resistance 470 in the neon lamp circuit. This resistance 470 may also have a stabilizing influence.

In order that no part of an annular or other graph be exposed more than once, it is also necessary to admit the light quickly and then shut it off substantially instantaneously at the end of a complete rotation. This result may be obtained by means to be described hereinafter.

The developed harmonizer pattern 66b having individual variable density type graphs for a selected fundamental and corresponding overtones, is placed on a revolving table 475 carried by a shaft 476 and forming part of a harmonizer such as is illustrated in Figs. 9 and 10, and is then played by supplying light to some or all of the variable density type graphs for transmission to a photo-electric cell 131 connected by conductors 151 to an amplifier 153 and a loud speaker 155. The intensities of the light at the various graphs or individual patterns may be varied as by means of variable resistances such as 156 (Fig. 10) until the desired tone quality is obtained at horn 154 of the loud speaker 155. The same adjustments might also be produced by light wedges 410 such as shown in Fig. 11. There may also be a variable resistance 160 (Figs. 10 and 31) in the photo-electric cell circuit to vary the intensity of the sound at the horn 154.

Upon obtaining the desired tone quality as just described, the connection between the amplifying element 153 and the loud speaker 155 may be broken by shifting a suitable switch 477 which is so arranged as to establish a connection through connectors 478 with a neon lamp 480 forming part of apparatus for exposing a musigraph blank 51b. The lamp 480 is enclosed in a box or chamber 481 having at its bottom a slit 482 arranged radially of a table 483 adapted to carry the disk or blank 51b and which is mounted on a shaft 484. It should be understood that the box 481 is to be moved to different positions radially to expose different annular paths to the light transmitted through the slit 482, that the positioning of the box may be obtained by any suitable means such, for example, as disclosed in Figs. 3, 4 and 5 for controlling the position of the light box 67, and likewise that the relative speeds of the shafts 476 and 484 may be regulated as desired.

The current produced in the conductors 478 is in accordance with the adjustment to produce the desired tone quality and may be considered as the synthesis of the currents which would be produced by the individual graphs taken one at a time. Also the changes in the intensity of the light from the neon tube 480 correspond to the synthesis of the changes which would be caused by the individual graphs and produces a corresponding exposure which after development results in such individual patterns that when played in the musigraph, tones of the desired quality may be produced at will. According to this manner of carrying out the invention there is no necessity for measuring the intensities of the individual tones and effecting a separate synthesis in accordance with such measurements. It should be understood that although this manner of carrying out the invention has been described in connection with variable density type graphs, the same general effect may be produced in other ways, as, for example, by forming the harmonizer patterns with individual variable width type graphs and the musigraph pattern with individual variable density type graphs.

In view of the fact that the accuracy of the variable density type graphs depends so completely upon varying the light, passing through the light transmitting line or slit, in close correspondence with changes in current in the lamp circuit, it is not practicable to turn on the current in the neon lamp circuit of Fig. 30 and then turn it off at the completion of one revolution of the table 473.

Mechanical control of the shutter

The desired sharpness or speed of admission of light at the beginning of the exposure and of exclusion at the end of a unit rotation may be effected for the neon lamp 464 by means of a shutter 490 movable across the slit 465' and guided at its side edges by guides 491. Obviously different forms of shutters may be used, but, as here shown, the shutter consists of a flat member or plate having therein a window 492 of such length in the direction of shutter movement that, when the slit is exposed (Fig. 36), the shutter may get up speed before covering the slit (Fig. 27).

The shutter 490 is connected with one end of the flexible core 493 of a flexible connection or Bowden wire 494 and comprising a flexible but substantially inextensible casing 495 attached at one end to the light box 465 and at the other end to a fixed member 496 having a vertical opening through which the other end of the core passes. It will be evident that moving the core longitudinally of the casing 495 at the end adjacent the member 496 will effect a corresponding relative movement at the other end of the casing 495 and therefore movement of the shutter 490.

A portion of the core 493 extending above the member 496 is attached to a member 497 slidable in guides 498, 499 and 500 which maintain it in alignment with the vertical opening through the fixed member 496. Between the guide members 498 and 499, the slide member 497 is provided with a central portion 501 of somewhat greater diameter than the parts passing through the guides 498, 499 and 500 and having annular flanges 502 at its ends.

The distance between the outer faces of the flanges 502 is less than the distance between the adjacent faces of the guides 498 and 499 so as to permit sufficient movement for shifting the shutter from open to closed position and vice versa. Between the guides 499 and 500, the member 497 is made of considerable diameter and is provided with circumferential grooves 503 adapted to cooperate with a detent spring 504 to hold the member 497 either in its Fig. 36 position with the slit 465' uncovered or in its Fig. 37 position with the slit covered.

Movement of the member 497 is effected by means of a lever 505 pivoted at 506 with one arm 507 projecting between the flanges 502 and movable with a substantial amount of lost motion to engage first one and then the other, and a second arm 508 by which movement of the lever in one direction or the other is started. To effect a rapid final movement of the lever in each direction to hit the corresponding flange 502 and effect a rapid opening and closing of the shutter 490, use is made of a lever 509 pivoted at 510 at the same level as pivot 506 and having an arm 511 with a slotted or forked end embracing a pin 512 projecting laterally from the arm 507 of the lever 505; and a spring 513 connected with the arm 514 (Fig. 32) of lever 509, as by a pin 515, and with the arm 508, as by a pin 515a. Obviously, when the lever 505 is shifted in either direction to carry the spring 513 past the line between the pivots 506 and 510, the spring 513 will tend to contract and throw the levers farther in the same direction.

The mechanism just described tends to effect a rapid opening and closing of the slit 465', but it is necessary after opening the slit, to close the same at the end of one revolution to avoid double exposure of any part of an annular path on which a graph or pattern is to be developed. To this end, provision is made of a sleeve 516 slidable longitudinally of the shaft 474 but held against turning relative thereto by means of a key 517 projecting from the shaft and having a sliding fit in a slot or groove 518 at the inner surface of the sleeve. The sleeve 516 is also provided with two circumferential grooves 519 adapted to be engaged by a detent spring 520, which, when in engagement with the lower groove, holds the sleeve in raised position and, when in engagement with the upper groove, holds the sleeve in lowered position.

Projecting perpendicularly from the sleeve 516 are two arms 521 and 522 spaced apart along the sleeve but with the lower arm 522 straight below the upper arm 521. At the outer end of the upper arm 521 is a cam plate or cam 523 having a downwardly acting cam edge 524 and a dwell or lower edge 525; and at the outer end of the arm 522 is a cam plate or cam 526 beneath the cam plate 523 and having an upwardly acting cam edge 527 and a dwell or upper edge 528. As indicated on Fig. 32, the cams or cam plates 523 and 526 are shaped to form in substance parts of cylindrical surfaces extending around the axis of the shaft 474.

These cams 523 and 526 act on a lug or pin 529 which at the part where engaged by the cams is substantially semi-circular in cross section with the curved surface facing in a direction to be engaged by the cam edges 524 or 527. Furthermore the diameter of the part with semicircular cross section is of such diameter as to substantially extend across the gap between the dwell edges 525 and 528 so as to hold the pin or lug 529 against either upward or downward movement with reference to the cams. At the same time the plane rear surface of the pin or lug at the contact portion enables the pin or lug to drop away quickly from the dwells in either direction in which it may be urged by, for example, the spring 513.

The pin 529 is connected with the forward arm 508 of the lever 505 so as not to yield upwardly or downwardly with respect thereto, but, for reasons to be brought out hereinafter, is connected therewith so as to be shiftable in a direction away from the shaft 474 to withdraw it from the path of the cams. To this end the pin or lug 529 is mounted on a lever or arm 530 pivoted at 531 to the arm 508 of the lever 505 to turn about a vertical axis but yieldably held against the outer end of said arm 508 by suitable means such as a leaf spring 532 (Fig. 32). Upon inspection of Fig. 32 it will be evident that, when the lug 529 is struck by one of the cams moving in the direction indicated by the arrow, there will be a component force tending to swing the arm 530 away from the arm 508. Such tendency may be overcome by the spring 532 but assurance against any such action may be effected by providing at the free end of the lug 529 a flange 533 adapted to engage the inner face of either of the cam plates.

The sleeve 516 is also provided with a peripheral groove 534 into which projects one arm, the work arm 535, of a level 536 mounted on a pivot 537 and having a power arm 538 extending to a location adjacent to a wall 539 of a casing (not otherwise shown) which encloses the apparatus and excludes light therefrom. The work arm 535 of this lever swings back and forth between two stops 540 which permit movement just sufficient to bring one or the other of the grooves 519 into position to receive the cooperative portion of the detent spring 520.

The power arm must be operated from the outside of the casing without admitting light thereto and, as here illustrated, it may be done by means of a crank handle 541 at the outside of the casing and having a hub mounted on a shaft 542 passing through the wall 539 and journalled in a sleeve 543 projecting inwardly from the inner surface of said wall. Mounted on the inner end of said shaft 542 and in engagement with the inner end of the sleeve 543 is the hub of a crank arm 544 extending substantially horizontally and engaging at its outer end a pin 545 extending from the end of the lever arm 538 and longitudinally thereof.

The part of the shutter-controlling mechanism just described is sufficient to bring out the main features of operation and the description of the rest of this mechanism will be deferred until some of said main features have been made clear. In Fig. 30, the parts of the shutter-controlling mechanism are shown in the positions assumed just after the righthand end of the lever 505 has been shifted upwardly by the lower cam 526 and the movement has been completed by the spring 513. The shutter 490 is then in open position as shown in Fig. 36.

As the shaft 474 continues to rotate in the direction indicated in Fig. 32 the upper arm 521 on the sleeve 516 engages the downwardly acting cam edge 546 of a fixed cam 547 and the sleeve 526 is depressed to its lower position (Fig. 34). Consequently at the completion of a rotation of the shaft 474 from a position at which the shutter was opened, the lug 529 will be engaged by the cam 523 and forced to the Fig. 36 position in which the spring 513 has been carried below the line through the pivots 506 and 510 and the left end of the lever 505 has just been brought up adjacent to the flange 502.

As the plane face of the lug 529 reaches the rear ends of the dwell edges 525 and 526, the lug will be abruptly released and the spring 513 will act to throw the parts to their Fig. 37 position, thus effecting a sharp closing of the slot 465'.

During the final movement of lever 505 under the influence of the spring 513 the arm or lever 530 is swung outwardly to withdraw the lug 529 from the path of the cam 526 and therefore avoid idle actuation of the lever by this cam at each rotation of the shaft while the sleeve 516 is in its depressed position. That such movement would be idle is obvious upon inspection of Fig. 37, for the cam 526 would raise the righthand end of the lever 505 only a short distance and the corresponding depression of the left end would not be sufficient to cause it to engage and depress the lower flange 502. This idle movement would, however, be objectionable in various respects, for example, each time the lever was released from the cam 526, the spring 513 would act to throw the left end (Fig. 37) of the lever 505 up against the flange 502 which at this time is in engagement with the fixed guide 499.

Such outward swinging of the arm or lever 530 may be effected by any suitable means, the action of one form of which is illustrated in Figs. 30 and 32 and Figs. 39 to 43, inclusive. The device used for this purpose is very simple and consists of an upright link 550 just outside of the path of the cams and having at its upper end an outwardly acting cam edge 551 to engage the lower edge of the arm 530 and swing it to a position in which the lug 529 is out of the path of the lower cam 526.

The link 550 is guided for upward and downward movement by suitable means such as a fixed member having a shank 552 passing through a slot 553 in the link, and having a head 554 to hold the link on said shank. At its lower end the link 550 is pivoted at 555 to the outer end of a lever 556 mounted on a fixed pivot 557 and having at its inner end a fork embracing the lever 536 at the side of the pivot toward the sleeve 516.

Fig. 39 corresponds with Fig. 30 and at this stage in the operation the link 550 is depressed due to the elevated position of the sleeve 516. In Fig. 40 which corresponds with Figs. 34 and 35, the sleeve 516 has been depressed due to the action of the stationary cam 547, the upper cam 523 is in position to strike the lug 529 and cam it down, and the link is in raised position to render its cam edge 551 effective.

In Fig. 41, which corresponds with Fig. 36, the lug 529 is between the dwell surfaces 525 and 528 and the arm 530 is in position to be forced out by the cam edge 551. In Fig. 42, which corresponds with Fig. 37, the movement of the lever 505 under the influence of the spring 513 has been completed and the arm 530 has been forced down along the cam edge 551 of the link 550 and consequently has been forced back against the action of the spring 532 so as to withdraw the lug 529 from the path of the lower cam 526.

The shutter 490 is now in closed position and the shaft 474 may rotate an indefinite number of times without any effect on the shutter. When, however, it is desired to open the shutter, the crank handle 541 is operated in the proper direction to shift the lever 536 to lift the sleeve 516 and lower the link 550 to their Fig. 43 positions. The lug 529 is now in effective position to be engaged by the lower cam and moved to cause the shutter to be opened.

Obviously the shifting of the lever 536 to lift the sleeve 516 must, in order to obtain exposure during a complete rotation of a blank, be effected after the cams 523 and 528 have in any revolution thereof passed the fixed cam 547 and before the lower cam 526 reaches the part of its path in which it acts to raise the lug 529 to start the shutter-opening operation.

To enable the operator to know when to operate the crank arm or handle 541 to raise the cams 523 and 526, there must be some indication at the outside of the casing. For this purpose the shaft 474 is provided with a bevel gear 560 which meshes with a bevel gear 561 of the same size mounted on a shaft 562 extending through the casing and provided outside thereof with an index or pointer 563 adapted to cooperate with a dial 564 having proper indications thereon.

*Electrical control for the shutter*

The control of the shutter may also be effected by suitable electrical means one form of which is illustrated in Figs. 44 to 47 inclusive and will now be described. The light box 565 has at its bottom wall a slit or light transmitting line 566 formed preferably as a scratch in an opaque coating on a glass plate 567. Above and adjacent to the line 566 is a shutter 568 movable along suitable guides and having a window 569 movable to and from a position (Fig. 46) to shield the slit 566 from the light of the neon lamp 570.

Movement of the shutter 568 is effected by means of an electro-magnet 571 mounted in the light box and adapted to actuate, against the action of a spring 572, a lever 573 pivoted at 574 on a frame 575 connected with the core 576 of the electro-magnet 571. The lower end of the lever 573 is operatively connected with the shutter, for example, by engagement between two lugs 577 projecting upwardly from the shutter. The movement of the lever 573 under the influence of the spring 572 is limited by suitable means such as a stop 578 extending from the top of lever 573 and adapted to engage the frame 575 and determine the closed position of the shutter.

The coil or winding 579 is in a circuit including a conductor 580, a switch 581, a battery 582, a conductor 583, a slip connection with a ring or sleeve 584 carried by the shaft 474 but insulated therefrom, a conductor 585 connecting the ring 584 with a conducting strip 586 at the bottom of a groove 587 in a disk 588 of insulating material mounted on the shaft 474 to rotate therewith, a contact point 589 for contact with said strip 586 and carried by a member 590 which serves both as a lever and a link, and a conductor 591 connecting the adjacent arm of the member 590 with the coil or winding 579, said adjacent arm preferably being insulated from the rest of the member 590.

The member 590 carrying the contact point 589 is provided with a slot 593 to receive the horizontal shank of a pivot 594 having a head to hold the member 590 on said shank. This pivot and slot connection enables the contact point 590 to be raised from and lowered into the groove 587 and also, due to the radial arrangement of the member 590 with respect to the disk 588 (Fig. 45), enables the contact point to be moved radially of the disk. To prevent sidewise movement of the contact-point-supporting end of member 590 during rotation of the disk 588, there is provided a fixed guide 595 having a vertical slot in which such end of member 590 may ride up and down. The contact point 589 may be urged toward the bottom of the groove 587 by suitable means such as a spring 596 (Fig. 44) engaging the lever or member 590.

The groove 587 is made up of an incomplete circular portion in which the contact-point 589 may be placed, a spiral portion into which the point will pass upon rotation of the disk in the direction of the arrow $x$ (Fig. 45), and a central circular portion into which the contact-point will finally enter and will remain until raised and shifted to the outer circular portion of the groove 587. The conducting strip 586 extends from the point 596 inwardly along the spiral portion of the groove and ends at the point 597 on the same radial line and three hundred and sixty degrees therefrom. This assures an open condition of the slit 566 during one complete revolution of the blank 51 actuated by the shaft 474. The chisel edge of the contact-point is arranged radially of the disk so as to assure a sharp make and break with the strip 586.

To start the exposure of an annular path on the harmonizer blank the lever 590 is tilted and slid along its pivot 594 until the contact-point 589 is over the outer circular portion of the groove and then released to permit the contact-point to enter the groove. Then upon rotation of the disk 588, the contact-point will pass through the spiral portion of the groove to contact with the conducting strip 586 to open the shutter for the desired interval, and then into the inner circular portion of the groove where it will remain until again moved outwardly by use of the lever 590.

Obviously the lever 590 must be actuated from the outside of the casing without admitting light thereto. This result may be attained by means of a shaft 600 extending through the wall 539 and journalled in a sleeve 543 projecting inwardly from said wall. A crank handle 602 is secured to the shaft 600 at the outer side of the wall, and at the inner side of the wall a crank arm 603 is secured to the shaft, the handle and arm being spaced apart to permit endwise sliding of the shaft 600 through a distance corresponding to the radial movement of the contact point 589. The crank arm 603 is so connected with the outer end or arm of the lever 590 as to enable tilting and longitudinal shifting of the lever by correspondingly moving the shaft 600 by means of the crank handle 602 at the outside of the casing.

It will also be evident that, in order to assure proper positioning of the contact-point 589 in the outer circular part of the groove 587, it is necessary to know the angular position of the disk 588. This result may be obtained as in the structure disclosed in Fig. 30 and other figures, namely, by a suitably marked dial 564 cooperating with an index or pointer 563 on a shaft 562 driven from the shaft 474 by means of bevel gears 560.

It should be understood that, in exposing the musigraph blank by use of the apparatus illustrated in Fig. 31, it is also necessary to limit the exposure in each case to one complete rotation. This may of course be done by the same apparatus as that disclosed in connection with the exposure of the harmonizer blank in Fig. 30 and related figures.

As hereinbefore stated, a piece or composition played on the musigraph may be recorded on a photographic surface. It will be evident that this result may readily be effected by apparatus including the general arrangement illustrated in Fig. 31. For example, if the disk 66b on the table 475 be replaced by a musigraph pattern having the proper individual tone patterns and the light to which the individual patterns are subjected, be selectively controlled by suitable musigraph control apparatus, there will be produced in the circuit of the photo-electric cell variations of current adapted to produce the selected musical composition at the horn 154, or the desired variation in the intensity of the neon lamp 480 to expose a photographic blank progressively along a suitable path so as to produce, when the blank is developed, a variable density type pattern.

It will be apparent that it will be impossible to record a musical composition of any substantial length on a circular path on a disk of feasible size. A path of suitable length may, however, be obtained in any suitable manner as, for example, by shifting the light box 481 continuously in a radial direction at a suitable rate to expose the blank or disk in a spiral path. Such shifting of the light box may be effected by devices similar to those used in certain talking machines to produce a positive feed of a stylus. For example, the light box 481 might be shifted by means of a screw of suitable pitch not shown arranged parallel to the path of the light box, a short vertical shaft operatively connected with the outer end of the screw by bevel gears and extending below the disk, and a horizontal shaft below the disk and connected at its outer end by bevel gears with said short vertical shaft and at its inner end, by bevel gears, with shaft 484.

Obviously in playing such a spiral pattern record by rotating the same between a photo-electric cell and a source of light, the light will fall on the record in a line extending substantially radially of the disk and of a length substantially equal to the width of the pattern which extends in a spiral, and such line of light must be moved radially of the disk to keep it over the pattern by suitable means such, for example, as that just described for moving the light box in producing the patterns.

In view of the production of variable density type harmonizer patterns by harmonically varying the intensity of a neon lamp, it is evident that variable density musigraph patterns may be produced by controlling a suitable resistance device in a circuit operatively connected with the neon lamp, through an operative connection with a synthesizer during synthesis of the results of a harmonizer test, or an operative connection with a cam formed in accordance with the result of the synthesis.

Although the production of variable density patterns has been discussed in connection with the use of an electric lamp, such as the neon lamp, of which the intensity of illumination varies directly with variations in current in its circuit, suitable variation in exposure may be obtained otherwise as, for example, by use of light wedges between a source of unvarying light and a sensitized blank, the light wedges being actuated so as to vary the light harmonically in producing harmonizer records and being controlled, in producing musigraph records, by operative connections between the same and a synthesizer during the synthesis of the results of harmonizer tests or by operative connection with a cam shaped in accordance with the result of such synthesis.

In some forms of apparatus for producing variable density type patterns according to the present invention, light from a suitable source may pass through a slit and then through a lens which to form a narrow straight line image on the blank. In this case the width of the slit may be varied by shifting one or more shutters, thus varying the amount of light concentrated at the line and consequently the intensity of the light at said line.

It should be distinctly understood that the term "light-transmitting line", wherever used in the specification and claims, is intended to be broad enough to cover a line of light formed at a slit or at a transparent line between two opaque parts, or a line of light produced by focussing light at a line.

The term "sound-controlling record" where used in this specification is intended to be broad enough to include any graphical representation of wave-forms which is adapted, when moved relative to a suitable electrically operated sound producer, to control light and/or electrical variations for the production of musical tones.

The term "continuous" where used to describe a graph of wave-forms is intended to mean "endless".

The foregoing detailed description has been given for clearness of understanding and no undue limitation should be deduced therefrom, but the appended claims should be construed as broadly as possible in view of the prior art.

Having thus described my invention, I claim:

1. The method of producing musical tones which includes producing simultaneously selected partials by converting light variations into sound and empirically varying the relative intensities of the partials to produce a composite tone of desired quality.

2. The method of producing musical tones which includes controlling the production of partial tones by supplying light to a light-sensitive sound producing means at a plurality of points and empirically varying the intensity of the light at said points thereby varying the relative intensities of the partial tones in order to develop a tone of desired quality.

3. The method of producing musical tones which includes converting light variations into electric current variations adapted to control the vibrations of a sounding body, and empirically varying the light to produce through said conversions a fundamental tone and selected harmonic overtones and the proper relative intensities of such partials to develop a tone of desired quality.

4. The method of producing musical sounds which includes producing a plurality of light-controlling sine wave patterns adapted to control the production of partial tones by relative movement between the patterns and musical apparatus adapted to utilize said patterns and producing such relative movements as to obtain, respectively, the proper frequencies for a fundamental tone and selected harmonic overtones.

5. The method of producing musical tones which includes supplying light to a light-sensitive sound producing means simultaneously at a plurality of points, and independently varying the light at each of said points in producing simultaneously selected simple partial tones and the necessary relative intensities of said partials to develop a tone of desired quality.

6. The method of producing musical sounds, which includes supplying light simultaneously at a plurality of points, and producing a corresponding plurality of musical tones of different pitch by uniformly varying the light at each of said points and differently for different points in producing different simple tones, and by otherwise independently varying the light at said points to regulate the relative intensities of said simple tones.

7. The method of producing musical tones which includes forming with suitable optical means an image of a straight line of light on a light-controlling pattern containing paths each comprising a continuous graph of sine waves of uniform amplitude and wave length and representing a selected partial tone, effecting a relative movement between said pattern and said image to control the production of selected partial tones, and varying the illumination at said image thereby varying the relative intensities of the partials to develop a tone of desired quality.

8. The method of producing musical tones which includes varying light at a plurality of points with a light-controlling record containing a plurality of individual sinusoidal wave-form graphs adapted to produce light variations corresponding with a fundamental tone and selected overtones, converting said light variations into corresponding electric current variations, converting said current variations into corresponding vibrations of a sounding body, and further varying the relative intensities of such partials by independently varying the intensities of the light at said points to produce a tone of desired quality.

9. The method of producing musical tones of a desired quality which includes varying the relative intensities of partials and varying the phase of at least one partial.

10. The method of producing musical tones which includes varying the relative intensities of partials to develop a composite tone of desired quality which includes the step of neutralizing undesired partials.

11. The method of producing musical tones by means of an electrical sound producing system having a distortion characteristic which introduces the sound of an undesired partial, which includes introducing into the input circuit of said system a frequency identical with that of the undesired partial and of the same amplitude but in opposite phase thereto so as to nullify the sound of said undesired partial.

12. The method of producing musical sounds, which includes supplying light simultaneously at a plurality of points, controlling the production of a corresponding plurality of simple tones of different pitch by varying the light uniformly at each of said points but differently for different points, and changing the phase relations between the uniform light variations.

13. The method of producing musical tones in a sound producing instrument having a distortion characteristic tending to introduce the sound of an overtone, which includes producing simultaneously pure simple tones corresponding respectively with a fundamental tone and selected overtones including said overtone introduced by the instrument, and adjusting the intensities of such partials and the phase of said overtone introduced by the instrument, to produce the desired tone quality.

14. The method of producing musical tones which includes the empirical determination of a pattern for controlling the production of musical tones by a relative movement between said pattern and a suitable sound producer, effecting such relative movement, and selectively producing said tones singly and in combination.

15. The method of producing musical tones, which includes the empirical determination of a light-controlling pattern for controlling the production of musical tones by a relative movement between said pattern and a source of light, effecting such movement, and selectively producing said tones singly and in combination.

16. The method of producing composite musical tones of different pitch and desired quality, which includes the empirical determination of patterns adapted to control the production of said musical tones by a sound-producing device having distortion characteristics, permanently embodying said patterns in a record for reproducing said tones, and actuating a sound-producing device having distortion characteristics similar to those of the first mentioned sound-producing device under the control of said record by selectively employing the said patterns comprising the said record, singly and in combination at will and in any desired sequence.

17. The method of producing music, which includes empirically determining patterns adapted to control the production of composite tones of desired quality in a sound-producer having distortion characteristics, permanently embodying said patterns in a light-controlling record for reproducing said tones, illuminating said patterns singly and in combination at will and in any desired sequence to produce light variations, translating the light variations into electric current variations, and controlling by said electric current variations a sound-producer having distortion characteristics similar to those of the first mentoned sound-producer.

18. The method of producing musical tones of desired quality with minimum distortion, which includes effecting a relative movement between a light-controlling pattern comprising a graph of synthesized wave forms and a straight narrow line of light imaged thereon, selectively interrupting and varying the light at said image to cause light variations, and converting said light variations into corresponding sound waves.

19. The method of producing musical tones of desired quality with minimum distortion, which includes forming with suitable optical means the reduced image of a straight, narrow line of light on a pattern containing graphs representing notes in a musical scale, effecting a relative movement between said pattern and said image, and producing musical tones by selecting the points on the pattern at which the image is to be formed, and otherwise controlling the volume of sound by varying the illumination at said image.

20. The method of producing musical tones, which includes effecting a relative movement between an electrically-operated sound producer and a pattern containing paths comprising graphs of wave forms which control the correction of the distortion of said sound producer, and selectively producing the desired tones singly and in combination.

21. The method of producing musical sounds which includes producing separately and simultaneously selective partial tones in a sound-producer having distortion characteristics, varying the relative intensities of the said partial tones to develop a composite tone of desired quality, reducing to a composite wave-form the said selected partials with their relative intensities thus determined, transferring said wave-forms to a record blank, and playing the record so made with a sound-producer having distortion characteristics similar to those of the first mentioned sound-producer.

22. The method of producing musical tones, which includes effecting a relative movement between an electrically-operated sound-producer and a light-controlling pattern containing paths comprising graphs of wave-forms which control the correction of distortion of said sound producer, and producing the desired tones singly and in combination by selectively supplying light to said graphs.

23. In tone synthesis and analysis, the method which includes producing pure simple tones corresponding with selected partials and varying their individual intensities to develop a composite tone of desired quality and indicating their relative intensities in the composite tone so developed whereby the ultimate intensity factors of such partials may be determined.

24. In tone synthesis and analysis, the method which includes producing a composite tone composed of selected partials by converting light variations into sound, empirically varying the relative intensities of the partials to produce a composite tone of desired quality and indicating their relative intensities in the composite tone so developed whereby the ultimate intensity factors of such partials may be determined.

25. In tone synthesis and analysis, the method of simultaneously producing selected partials by converting light variations into sound, empirically varying the relative intensities of the partials to develop a tone of desired quality, and determining the amplitude of the light variations producing each of the partials.

26. The method of producing a sound-controlling record which includes recording harmonic motion in the form of a continuous uniform graph of sinusoidal waves.

27. The method of making a sound-controlling pattern, which includes generating harmonic motion mechanically, and recording said motion in the form of a continuous graph composed of sine waves of uniform amplitude and wave length.

28. The method of producing a sound-controlling record, which includes effecting relative movement between a sensitized blank and a line of light projected thereon, varying harmonically the light striking the blank at said line, and recording the light variations as a wave-form graph on said blank.

29. The method of making a sound controlling pattern, which includes varying light in accordance with harmonic motion, and recording the light variations in the form of a continuous graph composed of sine waves of uniform amplitude and wave length.

30. The method of making a sound-controlling pattern, which includes generating harmonic motion mechanically, utilizing said motion to produce light variations, and recording said light variations in the form of a continuous graph of sine waves of uniform amplitude and wave length.

31. The method of making a sound-controlling pattern, which includes effecting a relative movement between a light-sensitive surface and a line of light imaged thereon, utilizing mechanically-generated harmonic motion to vary the length of said line, and recording said light variation in the form of a continuous graph composed of sine waves of uniform amplitude and wave length.

32. The method of making a sound-controlling pattern, which includes generating harmonic motion mechanically, utilizing said motion to produce electric current variations, converting said current variations into light variations, and recording said light variations in the form of a graph of identical wave forms.

33. The method of making a sound-controlling pattern, which includes generating sinusoidal electric current variations, converting said current variations into light variations and recording said light variations in the form of a continuous light-varying pattern of uniform frequency and variation of light transmission.

34. The method of producing a sound-controlling record, which comprises generating sinusoidal electric current variations of uniform amplitude and wave length, subjecting a recording blank to the action of said current variations by intermediary means, and effecting relative movement between the intermediary means and the blank to produce a record of said current variations on the blank in the form of a continuous wave pattern.

35. The method of producing a sound-controlling pattern which includes recording photographically harmonic motion in such a manner as to control the production of light-controlling sine wave graphs adapted to produce respectively a fundamental tone and selected overtones.

36. The method of producing a sound-controlling record by converting sinusoidal electric current variations into light variations, and photographically recording said light variations in the form of sine wave patterns adapted to control the production respectively of a fundamental tone and selected overtones.

37. The method of producing a sound-controlling record which includes varying the current in an electric circuit by applying harmonic motion to a variable resistance in said circuit, converting said current variations into light variations, and recording photographically said light variations in the form of patterns adapted to control the production of a fundamental tone and selected overtones respectively.

38. The method of making a sound-controlling record, which includes forming in a path on a record blank a continuous graph of wave forms of sinusoidal waves of uniform amplitude and wave length, recording graphs of similar character in additional individual paths, and with each recording so regulating the wave length and amplitude characteristics of the wave forms as to record graphs representative of pure simple tones differing in frequency but approximately equal in loudness.

39. The method of making a light-controlling sound pattern, which comprises progressively recording a continuous graph of wave forms on a light-sensitive pattern blank and automatically arresting such recording to prevent overlapping of exposure.

40. The method of making a sound-controlling pattern, which includes causing light variations by varying the electric constants of a circuit in which a source of light is connected, and progressively recording on a light-sensitive pattern blank said light variations as a continuous graph of identical wave forms.

41. The method of making a sound-controlling pattern, which includes forming on a light-sensitive pattern blank the reduced image of a straight line of light, causing a relative movement between said image and said pattern blank, varying the light at said image, and progressively recording on said pattern blank the resultant light variations as a continuous graph of identical wave forms.

42. The method of making a sound-controlling pattern, which includes forming on a light-sensitive pattern blank the reduced image of a straight line of light, causing a relative movement between said image and said pattern blank, varying the light at said image with a light valve, and progressively recording on said pattern blank the resultant light variations as a graph of identical wave forms.

43. The method of making a light-controlling sound record, which includes forming in a path on a record blank a light-controlling graph comprising a series of identical wave forms representative of a note in a musical scale, recording on said record blank additional light-controlling graphs of other notes of similar character in individual paths, and with each recording so regulating the amplitude of the wave forms that all recorded graphs will be characterized in tone production by substantially the same loudness.

44. The method of making a light-controlling sound record, which includes forming in a path on a light-sensitive blank a graph comprising a series of identical wave forms representative of a note in a musical scale said graph being formed by exposing the blank to periodic light variations, recording on said blank in like manner additional graphs of other notes of similar character in individual paths and with each recording so regulating the brilliancy of the source of illumination that all recorded graphs will be characterized in tone production by substantially the same loudness.

45. The method of producing a sound-controlling record, which comprises forming a primary wave-form pattern, and recording on a record blank a continuous graph of identical wave forms corresponding with said primary pattern, said recording step including effective relative movement between the primary pattern and the record blank.

46. The method of making a sound-controlling record, which includes determining the form of wave requisite for the production of a musical tone of desired quality, translating said wave form to a circular axis line, forming a primary pattern embodying said translated wave form, effecting relative movement between said primary pattern and a record blank, and progressively recording on said record blank a graph of wave-forms corresponding with the wave-form embodied in said primary pattern.

47. The method of making a sound-controlling record, which includes determining the form of wave requisite for the production of a musical tone of desired quality, translating said wave form to a circular axis line, forming a primary pattern embodying said translated wave form, revolving said primary pattern in relation to a source of light and thus causing light variations, and progressively recording the light variations so produced on a record blank as a wave-form graph.

48. The method of making a light-controlling sound record, which includes forming a primary wave-form pattern and utilizing said primary pattern to control the recording on a light-sensitive blank of a continuous graph of identical wave-forms.

49. The method of producing a light-controlling sound record which includes forming a primary wave-form pattern and utilizing said primary pattern in progressively recording on a record blank a continuous light-controlling graph of identical wave-forms corresponding with the wave-form embodied in the primary pattern.

50. The method of making a sound-controlling pattern, which includes determining the form of wave requisite for the production of a musical tone of desired quality, forming a primary pattern corresponding with the said wave-form, utilizing said primary pattern for effecting light variations corresponding therewith, and progressively recording said light variations on a pattern blank in the form of a graph.

51. The method of making a sound-controlling pattern, which includes determining the form of wave requisite for the production of a musical tone of desired quality, forming a primary pattern corresponding with the said wave form, utilizing said primary pattern to vary the intensity of a source of light by varying the electric constants of a circuit in which the light is connected, and progressively recording the light variations thus produced on a pattern blank in the form of a graph.

52. The method of making a sound-controlling record, which comprises projecting a line of light on a photographically sensitized blank, providing relative movement between the line of light and the photographic blank transverse to the line of light, and progressively controlling the length of said line of light by a predetermined wave pattern representative of the wave form to be embodied in the record.

53. The method of making a light-controlling sound record, which includes effecting relative movement between a line of light and a light-sensitive blank, utilizing a primary waveform pattern to cause uniform light variations at said line of light, and progressively recording on the blank the said light variations as a continuous graph of identical wave-forms.

54. The method of producing a light-controlling sound record which includes forming a primary wave-form pattern, and recording in a plurality of circular paths on a record blank a plurality of individual light-controlling graphs of wave-forms corresponding with the wave-form embodied in said primary pattern.

55. The method of producing a light-controlling sound record, which comprises forming a primary wave-form pattern, and recording on a record blank a plurality of light-controlling wave-form graphs corresponding with the waveform of said primary pattern, said recording step including effecting relative movement between the primary pattern and the record blank.

56. The method of making a light-controlling sound record, which includes effecting relative movement between a line of light and a light-sensitive blank, utilizing a primary wave-form pattern to cause light variations at said line of light, progresisvely recording on the blank the said light variations as an individual wave-form graph representative of a note in a musical scale and in like manner recording on the blank additional individual wave-form graphs representative of the other notes in said musical scale.

57. The method of producing a sound-controlling pattern, which includes the empirical determination of a wave form representing a musical tone of desired quality, and permanently embodying the said wave form in a record for playing said tone.

58. The method of producing a sound-controlling pattern, which includes the empirical determination of a wave form representing a musical tone of desired quality, and permanently embodying the said wave form in a light-controlling record for playing said tone.

59. The method of making a sound-controlling pattern, which includes the empirical determination of the wave form representing a musical tone of desired quality, generating electric current variations corresponding with said wave form, and progressively translating said current variations into a graph on a pattern blank.

60. The method of making a sound-controlling pattern, which includes energizing an electrically-operated sound producer with current of such variations as to effect the production of a composite tone, empirically modifying the variations in said current until the tone produced is of the desired quality, and progressively translating the current variations ultimately determined into a graph on a pattern blank.

61. The method of making a pattern adapted to correct the frequency-response distortion of an electric sound-producing apparatus for the playing of musical tones, which includes sounding a composite tone composed of selected partials with a test sound-producing apparatus of distortion characteristics substantially identical with those of the playing apparatus, selectively varying the input current of the test apparatus to vary the relative intensities of the partials of the composite tone until a tone of desired quality is developed with the test apparatus, and making a pattern adapted to vary correspondingly the input current of the playing apparatus to cause the production of the said ultimately developed composite tone thereby.

62. The method of making a sound-controlling pattern, which includes energizing an electrically-operated sound producer with current variations characterized by the known frequencies of selected partial tones so as to effect the production of a composite tone, empirically and individually varying the relative intensities of said current frequencies until the tone produced is of the desired quality, determining the relative intensity factors of the said current frequencies, synthesizing the individual wave forms thus known and determined into a composite wave form, and progressively recording said composite wave form on a pattern blank in the form of a graph.

63. The method of producing a sound-controlling record embodying a plurality of patterns for the production of selected musical tones of uniform quality but of different pitch, which includes the empirical determination of a wave form representing the desired tone quality of the said musical tones, and permanently embodying the said wave form in a record blank in a series of graphs representing respectively said musical notes.

64. The method of making a sound-controlling pattern, which includes generating a composite tone of desired quality, indicating the relative intensities of the partials in the composite tone so generated whereby the ultimate intensity factors of such partials may be determined, and recording on a pattern blank a graph of composite wave forms made in accordance with such determination.

65. The method of producing a sound-controlling record which includes producing separately and simultaneously a fundamental tone and certain overtones thereof in a sound producer, varying the intensities of the various partial tones to produce the tone quality desired, and making a pattern adapted to play said tone with such quality in said sound producer.

66. The method of making a light-controlling sound record, which includes synthesizing sinusoidal wave-forms with desired frequency and amplitude relationship, and recording the result of such synthesis on a record blank in the form of a light-controlling graph.

67. The method of making a light-controlling sound record for controlling the production of a composite musical tone, which includes the mechanical synthesis of the wave forms of partials of selected frequencies and relative amplitudes, and progressively recording the composite wave form thus produced on a light-sensitive record blank in the form of a light-controlling graph.

68. The method of making a light-controlling sound record which includes the mechanical synthesis of the wave-forms of partials of selected frequencies and amplitudes into a composite wave-form motion, utilizing said composite motion to control light variations, and recording said light variations on a record blank as a continuous light-controlling graph of identical wave-forms.

69. The method of producing a sound-controlling record which includes selectively varying the current in an electric circuit adapted to control the vibrations of a sounding body to produce a fundamental tone and selected overtones and varying their individual intensities to develop a composite tone of desired quality and indicating their relative intensities in the composite tone so developed whereby the ultimate intensity factors of such partial tones may be determined and synthesizing the frequency and intensity factors of said partials into a composite pattern adapted to produce said tone on a suitable instrument.

70. The method of producing a sound-controlling record which includes the steps of forming preliminary records of a fundamental tone and selected harmonic overtones, producing simultaneously said fundamental and overtones by means of said records, selectively varying the intensities of the different partials to produce the tone quality required, measuring the intensity factors of the different partials found necessary to produce the required results, synthesizing the records of the fundamental and its overtones according to said measurements of intensity factors, and forming a record in accordance with such synthesis.

71. The method of making a sound-controlling pattern, which includes varying light at a plurality of points in a manner which corresponds with the sinusoidal waves of simple partial tones of selected frequencies and relative intensities, converting the light variations at said plurality of points into composite light variations at a single point, and recording said composite light variations progressively on a light-sensitive pattern blank as a graph of composite wave forms representing a musical tone.

72. The method of producing a sound-controlling record which includes the steps of forming light transmitting preliminary records of a fundamental tone and a plurality of harmonic overtones, producing sounds thereby simultaneously in a suitable instrument, selectively varying the amount of light supplied to each preliminary record for varying the intensity of said sounds and thereby producing the quality of tone required, measuring the adjusted intensity factors of each of the different tones by measuring the amount of light supplied to the corresponding preliminary record, synthesizing said preliminary records according to the measurements of such intensities, and forming a light transmitting record in accordance with such synthesis.

73. The method of producing a sound-controlling record which includes selectively varying the current in an electric circuit adapted to control the vibrations of a sounding body to produce a fundamental tone and selected overtones and to vary the relative intensities of such partials to develop a tone of desired quality, converting said current variations into light variations, and recording photographically said light variations in the form of a pattern adapted to cause the producton of the desired tone.

74. The method of making a light-controlling sound record, which includes forming a composite wave-form by synthesizing sinusoidal wave-forms with the desired frequency and amplitude relationship, embodying said composite wave-form into a primary pattern, and utilizing said primary pattern to control the recording on a light-sensitive blank of a continuous graph of identical wave-forms.

75. The method of making a light-controlling sound record which includes generating mechanically separate harmonic motions of desired frequencies and amplitudes, combining these harmonic motions into one composite wave-form motion, embodying said composite wave-form into a primary pattern and utilizing said primary pattern to control the recording of a light-controlling graph of wave-forms on a record blank.

76. The method of making a sound-controlling record, which includes determining the component partials of the wave-form of a composite musical tone of desired quality, adjusting the relative amplitudes of said component partials to compensate for the frequency distortion of a particular sound-producer, synthesizing the component partials with their amplitudes thus adjusted, forming a primary wave-form pattern to correspond with the synthesized wave-form, utilizing said primary pattern to cause corresponding light variations, and progressively recording said light variations on a record blank as a graph.

77. The method of producing a sound-controlling record which includes purposely forming on said record a pattern or graph comprising a composite wave form, the relative amplitudes of the component partials of which being purposely adjusted so as to correct the frequency distortion of the sound producer in connection with which said record is to be used.

78. The method of making a light-controlling sound record, which includes adjusting the relative amplitudes of the wave forms of the partials of a composite tone to compensate for the frequency distortion of a particular sound-producing apparatus, synthesizing the wave forms of the partials thus modified into a composite wave form, and recording said synthesized wave-form on a light-sensitive record blank.

79. The method of producing a sound-controlling pattern comprising a graph of synthesized wave forms, which includes the determination of the phase relationship of the wave forms of selected partial tones requisite for the production of a composite tone of desired quality in a particular sound-producer and synthesizing into a unitary pattern the said wave forms in this predetermined phase relationship.

80. The method of making a record which consists in making individual sound graphs having regular frequencies corresponding respectively to the frequencies of a fundamental tone and selected harmonic overtones, simultaneously producing sounds in a suitable instrument by means of said various graphs, modifying the intensities of the partial tones produced by said graphs to obtain the required tone quality for reproduction and substantially free from distortion due to said instrument, synthesizing the partial tones so modified as to have the proper frequencies and the corresponding amplitudes to produce the adjusted intensities, and recording the result of such synthesis.

81. The method of correcting the distortion of a sound producer, which includes supplying before amplification electrical waves having sine wave components so related as substantially to effect nullification of said distortion.

82. The method of correcting the distortion of an electrical sound producing system which includes supplying input electrical waves, the relative amplitudes of the component partials of which have been purposely adjusted to correct said distortion.

83. The method of making a sound-controlling record which includes recording a continuous graph of wave-forms and shifting the phase of the wave-forms during the recording process in order that the first and last wave-forms recorded in said graph may be substantially in phase.

84. The method of making a sound-controlling record which includes recording wave-forms in a continuous path and intentionally introducing a plurality of phase shifts in the wave-forms in said path.

85. The method of making a sound-controlling record which includes effecting relative movement between a light-sensitive blank and a source of light, varying the light from said source, recording the light variations as a continuous graph of wave-forms on said blank, and changing the speed of said relative movement during recording of said graph to shift the phase of the wave-forms.

86. The method of making a light-controlling sound record which includes rotating a record blank relative to a recording device, and recording on said blank a plurality of individual light-controlling wave-form graphs representing the twelve tones of the tempered scale octave, and shifting the wave-forms being recorded in each graph so that the first and last wave-forms recorded are substantially in phase.

87. The method of producing a sound-controlling record which includes selectively varying the current in an electric circuit which controls the vibrations of a sounding body to produce musical notes singly and in combination as a musical composition, converting said current variations into light variations and recording photographically said light variations in the form of a pattern adapted to reproduce said musical composition on a suitable instrument.

88. The method of making a light-controlling sound record characterized by a spiral composite wave formed representing sequentially the successive notes of a musical composition, which comprises employing a light-controlling sound record embodying composite wave forms in individual paths each path being characterized by a wave form representing a note of a musical scale to vary the current in a light circuit by illuminating the said composite wave paths in the order of the successive notes of a musical composition, and recording the said variations successively in a spiral path on a light-sensitive pattern blank.

89. A light-controlling sound record comprising a graphical representation of a sine wave having a circular axis line and adapted to control the production of a simple tone of constant pitch and intensity.

90. A light-controlling sound pattern comprising a graphical representation of a sine wave which, by relative movement between the same and a narrow line of light, will cause uniform sinusoidal light variations corresponding with a simple tone of constant pitch and intensity.

91. A light-controlling sound pattern containing a variable density photographic recording of a sine wave, which when scanned by a beam of light is adapted to cause uniform sinusoidal light variations corresponding with a simple tone of constant pitch and intensity.

92. A sound pattern having in concentric bands subordinate sine wave patterns adapted to control the production by a suitable instrument of sounds corresponding to a fundamental tone and selected overtones.

93. A light-controlling sound record having in separate paths uniform continuous patterns, each pattern comprising opaque and transparent portions separated and defined by a sine curve characteristic of a partial tone.

94. A light-controlling sound record having in separate paths uniform continuous patterns, each pattern comprising opaque and transparent portions separated and defined by a sine curve characteristic of a partial tone, the maximum height of the transparent portions equaling the amplitude of the sine curve.

95. A light-controlling sound record comprising separate continuous graphs of sinusoidal waves representing pure simple tones of different pitch, each graph comprising a series of identical wave forms.

96. A light-controlling sound record comprising separate continuous graphs of sinusoidal waves representing respectively a fundamental tone and selected harmonic partial tones, each graph comprising a series of identical wave forms.

97. A light-controlling sound record comprising separate graphs of sinusoidal waves representing pure simple tones of different pitch, each graph comprising a series of identical wave forms, the amplitude characteristics of the individual graphs being such as to effect substantially equal loudness in tone production.

98. A photographic record adapted to control and vary light in the production of sound with a minimum of ground noise, said record comprising a light-controlling graph of wave-forms recorded in a path on said record and the path being completely modulated by the wave-forms embodied in the graph.

99. A light-controlling sound record comprising a plurality of individual light-controlling wave-form graphs representing tones of different pitch, said graphs being recorded in separate paths on the record and each path being completely modulated by the wave-forms embodied in the graph.

100. A light-controlling sound record comprising a plurality of continuous graphs of identical wave-forms, each continuous graph being in an individual path on the record, and each path being completely modulated by the wave-forms embodied in the graph.

101. A sound-controlling record comprising a light-controlling pattern composed of wave-forms representative of a musical tone empirically determined to cause the production of the tone with desired quality.

102. A sound-controlling device having individual patterns representative of the notes of a musical scale empirically determined and adapted to control a suitable instrument to produce corresponding musical tones.

103. A light-controlling pattern comprising a continuous graph of identical composite wave forms representative of a composite musical tone the components of which comprise at least three consecutive harmonic partials.

104. A sound-controlling record embodying individual light-controlling patterns each composed of composite wave forms, the patterns being representative of musical tones of different pitch, the amplitudes of the respective composite wave forms being such as to cause the production by a suitable sound producer of said tones with substantially equal loudness.

105. A sound-controlling record having individual patterns for controlling the production of musical tones of desired pitch, each of said patterns embodying the combination of the corresponding fundamental and harmonic overtone wave forms with suitable relative amplitudes to counteract the distortion characteristics of the playing instrument with which it is to be used.

106. A sound-controlling record comprising a light-controlling pattern composed of composite wave forms, the amplitudes of the components of which are so related as to correct the frequency distortion of an electrical sound producer, and thus adapted to control the production of a tone of desired quality regardless of the distortion of the sound-producer.

107. A sound-controlling record for a playing instrument, having in concentric circular arrangement individual wave-form graphs adapted to control the production of the notes of a musical scale with desired quality, each of said graphs embodying a composite wave-form, the amplitudes of the component partials of which are adjusted to counteract the distortion characteristics of the playing instrument with which the record is to be used.

108. A sound-controlling record comprising a pattern composed of composite wave forms, the phase relation of the components of which is such as to correct the non-linear distortion of an electrical sound producer.

109. A sound-controlling record comprising a graph of wave-forms in a continuous path, said graph of wave-forms containing a plurality of predetermined phase shifts.

110. A sound-controlling record comprising a plurality of individual wave-form graphs representing tones which have a non-integral frequency relationship, the successive wave-forms in each graph being substantially in phase in order to control production of these tones with continuity of uniform tone quality.

111. A sound-controlling record comprising a plurality of wave-form graphs arranged in separate paths, said graphs representing tones which are related to each other in pitch as the twelve notes comprised within the tempered scale octave, the successive wave-forms in each graph being substantially in phase in order to control production of these tones with continuity of uniform tone quality.

112. A sound-controlling record adapted to control the production of the tones of the tempered scale, which comprises wave-forms recorded in separate continuous paths on a blank, the required phase shift in any one path being divided into a plurality of phase shifts.

113. A light-controlling sound record comprising a plurality of continuous graphs of wave-forms, said graphs representing the twelve notes comprised within the tempered scale octave, the successive wave-forms in each graph being substantially in phase in order to control the production of these tones with continuity of uniform tone quality.

114. Apparatus for producing sound-controlling records on a blank, including a recording device, means for effecting a relative travelling movement between said recording device and said blank, means for effecting harmonic movement transversely of the direction of such travelling movement, and adjustable means for causing said recording device to act at different paths on said blank.

115. In apparatus for making sound-controlling patterns, the combination of means for recording on a pattern blank a continuous uniform pattern of sinusoidal waves, and means for controlling the amplitude characteristics and wave length of the wave forms constituting said pattern.

116. In apparatus for producing sound-controlling patterns, the combination of means for causing a tracer to move with harmonic motion, means for effecting a relative movement between said tracer and a pattern blank, means for causing said tracer to record in a path on said blank a continuous uniform pattern of sinusoidal waves, and means for regulating the amplitude and wave length of the wave forms constituting said pattern.

117. In apparatus for producing sound-controlling patterns, the combination of means for generating harmonic motion mechanically to control a recording tracer, means for effecting a relative movement between said tracer and a pattern blank, means for causing said tracer to record in a path on said blank a continuous uniform pattern of sinusoidal waves, and means for regulating the amplitude and wave length of the wave forms constituting the said pattern.

118. In apparatus for producing sound-controlling patterns, the combination of means for generating sinusoidal electric current variations of uniform amplitude, intermediary means for subjecting a recording blank to the action of said current variations, means for effecting a relative movement between the intermediary means and the blank to record said current variations on said blank in the form of a continuous uniform pattern of sinusoidal waves, and means for regulating the amplitude characteristics and wave length of the wave forms constituting the said pattern.

119. In apparatus for making sound-controlling patterns, the combination of means for recording sinusoidal light variations on a light-sensitive blank as a continuous uniform pattern of sinusoidal waves, and means for regulating the amplitude characteristics and wave length of the wave forms constituting said pattern.

120. In apparatus for making sound-controlling patterns, the combination of means for effecting a relative movement between a light-sensitive pattern blank and a line of light, means for forming on said blank a reduced image of said line of light, means for effecting sinusoidal variations of the light at said image, means for recording said light variations as a continuous uniform pattern of sinusoidal waves, and means for varying the amplitude characteristics and wave length of the wave forms constituting said pattern.

121. In apparatus for producing sound-controlling patterns, the combination of means for subjecting a light-sensitive pattern blank to light, means for varying said light with harmonic motion, means for effecting a relative movement between the source of said light and the pattern blank, said means being so designed that such light variations are recorded on said blank as a continuous uniform pattern of sinusoidal waves, and means for regulating the amplitude characteristics and wave length of the wave forms constituting the said pattern.

122. In apparatus for making sound-controlling patterns, the combination of means for effecting a relative movement between a light-sensitive pattern blank and a line of light, means for forming on said blank a reduced image of said line of light, means for generating harmonic motion mechanically, means for utilizing said motion to effect sinusoidal variations of the light at said image, means for recording said light variations as a continuous uniform pattern of sinusoidal waves, and means for regulating the amplitude characteristics and wave length of the wave forms constituting said pattern.

123. In apparatus for making sound-controlling patterns, the combination of means for generating sinusoidal electric current variations, means for converting said current variations into light variations, means for recording said light variations on a light-sensitive pattern blank as a continuous uniform pattern of sinusoidal waves, and means for regulating the amplitude characteristics and wave length of the wave forms constituting said pattern.

124. In apparatus for producing sound-controlling patterns, the combination of means for subjecting a light-sensitive pattern blank to light, means for generating harmonic motion mechanically, means for utilizing the harmonic motion so generated for varying said light, means for effecting a relative movement between the source of said light and the pattern blank, said means being so designed that such light variations are recorded on said blank as a continuous uniform pattern of sinusoidal waves, and means for regulating the amplitude characteristics and wave length of the wave forms constituting said pattern.

125. Apparatus for producing sound controlling records on a blank, including a recording device, means for effecting a relative travelling movement between said recording device and said blank, means for effecting harmonic movement transversely of the direction of such travelling movement, adjustable means for causing said recording device to act at different paths on said blank, and means for varying the relative speed of the travelling movement and the harmonic motion of said recording device.

126. Apparatus for producing sound controlling records on a blank, including a recording device, means for effecting a relative travelling movement between said recording device and said blank, means for effecting harmonic movement transversely of the direction of such travelling movement, adjustable means for causing said recording device to act at different paths on said blank, means for varying the relative speeds of the travelling movement and the harmonic motion of said recording device, and means for varying the amplitude of the harmonic motion of said recording device.

127. Apparatus for producing light-controlling patterns in concentric arrangement on a sensitized photographic blank, including an electric lamp adapted to vary its luminosity in accordance with variations in the current applied thereto, means for rotating said blank, a circuit for said lamp, a variable resistance in said circuit, means operatively connected with the blank rotating means for moving a contact-point harmonically along said resistance, and means for admitting light to said blank along a narrow line extending radially of the path of said patterns.

128. An apparatus for producing light-controlling patterns adapted to produce individually a fundamental tone and selected overtones on a suitable instrument which includes means for varying the current in an electric circuit, means for converting said current variations into light variations, means for controlling said current variations, and means for recording photographically said light variations as individual graphs representing respectively a fundamental and selected overtones.

129. In apparatus for making sound-controlling patterns, the combination of means for progressively recording light variations in a path on a light-sensitive pattern blank and automatic means for interrupting the recording at the desired point in said path.

130. Apparatus for producing circular sound-controlling patterns on a rotatable sensitized photographic blank, including a light source, a shutter for controlling the exposure of said blank, and means settable for opening said shutter and then closing the same upon completion of one rotation of the blank and exposure corresponding with one complete circular pattern.

131. Apparatus for producing light-controlling patterns in concentric arrangement on a rotatable circular sensitized photographic blank, including a shaft for rotating the blank, a light source, a shutter to control the exposure of the blank, and shutter-controlling means settable for opening the shutter when the rotating blank reaches a definite position and adapted to close the shutter at the completion of one revolution of the blank.

132. Apparatus for producing circular sound-controlling patterns on a rotatable photographic blank, including a light source, a shutter for controlling the exposure of said blank, means settable for opening said shutter and then closing the same upon completion of one rotation of the blank, a casing for excluding light other than that from said source, and means for operating said settable device from the outside of the casing without admission of light.

133. Apparatus for producing circular light-controlling patterns on a rotatable sensitized photographic blank, a light source, a shutter for controlling the exposure of said blank, electrical means for controlling the opening and closing of said shutter, and means settable to cause said electrical means to open said shutter when said blank reaches a predetermined position and to close the shutter when said blank again reaches such position at the end of a complete rotation.

134. In apparatus for producing sound patterns in coaxial circular arrangement on a photographically sensitized record blank, means for rotating the blank, a source of light supplying light through a light-transmitting line, a shutter mounted for movement along said line, means for reciprocating the forward edge of said shutter along said line, means for producing an optical image of said light-transmitting line on said record blank, and means for varying the amplitude of movement of the image of the forward edge of said shutter along the image of said line.

135. In apparatus for making sound-controlling patterns, the combination of a source of light, means operatively associated with said source of light for forming on a light-sensitive pattern blank a reduced image of a straight line of light, means for varying the light at said image in a predetermined manner, means for progressively recording said light variations on said pattern blank as a uniform pattern of wave forms, and means for regulating the amplitude characteristics and wave length of said wave forms.

136. In apparatus for making sound-controlling patterns, the combination of a source of light, means operatively associated with said source of light for forming on a light-sensitive pattern blank a reduced image of a straight line of light, means including a light valve for periodically varying the intensity of the light at said image, means for progressively recording the resultant light variations on said pattern blank as a uniform pattern of wave forms, and means for regulating the amplitude characteristics and wave length of the said wave forms.

137. Apparatus for producing sound-controlling patterns along paths on a photographic sensitized blank, including a light source providing a narrow line of light extending transversely of said paths and of sufficient length to extend substantially across each of them, means for effecting a uniform relative speed between said blank and said narrow line of light, means for varying the intensity of the light at said line to vary the exposure at different points along any of said paths to produce thereat, when said blank is developed, a pattern of uniform opacity across the same but varying in opacity along the same, and means for exposing such path on said blank to said line of light and for automatically terminating such exposure after a predetermined length of said path has been exposed.

138. In apparatus for making sound-controlling patterns, the combination of a source of light, means for causing light variations by varying the electric constants of a circuit in which said source of light is connected, means for progressively recording said light variations as a uniform graph of wave forms and means for regulating the amplitude characteristics and wave length of said wave forms.

139. Apparatus for producing light-controlling patterns on a sensitized blank, including a source of light comprising an electric lamp, means for effecting relative travelling movement between said source of light and said blank, an electric circuit for said lamp including a variable resistance, means actuated in synchronism with said travelling movement for changing said variable resistance to vary the intensity of the light of the lamp and thereby cause the blank when developed to bear a variable density graph, and a second variable resistance to cause a lighter or heavier exposure.

140. Apparatus for producing graphs in circular arrangement on a record blank, including means for rotating the record blank, a device for producing successive waves of said graphs as the blank is rotated, and an adjustable driving connection between said device and such blank-rotating means for determining the number of waves in a complete graph.

141. Apparatus for making sound-controlling records having a plurality of graphs representing similar characteristics, including a recording device, means to effect a relative travelling movement between said recording device and record blank, means for operating said recording device transversely of the line of travel and in accordance with the characteristics specified, means for varying the extent of the movement of said recording device, and means for causing said recording device to act at different paths on said blank.

142. Apparatus for making sound-controlling records having a plurality of graphs representing similar characteristics, including a recording device, means to effect a relative travelling movement between said recording device and a record blank, means for operating said recording device transversely of the line of travel and in accordance with the characteristics specified, means for varying the extent of the movement of said recording device and means for causing said recording device to act at different paths on said blank, and means for varying the number of waves in corresponding portions of the different paths.

143. In apparatus for making a sound-controlling record, the combination of means for recording light variations as individual patterns of wave forms on a light-sensitive record blank, each pattern comprising a series of uniform wave forms representative of a musical note and the several patterns representing respectively notes of different pitch, and means for regulating the amplitude of the light variations respecting each of the several patterns so as to produce wave forms of such amplitude as to effect substantially equal loudness in tone production from the several patterns.

144. In apparatus for making a sound-controlling record, the combination of a source of light of adjustable constant brightness, means for periodically varying the light from said source, means for progressively recording the resultant light variations in individual paths on a light-sensitive record blank each pattern constituting a series of uniform wave forms, means for shifting the recording from one path to another on the record blank, and means for predetermining the brightness of the said source of light to assure substantially equal loudness in the tone production from the several patterns.

145. In apparatus for producing sound-controlling patterns along paths on a photographic sensitized transparent blank, the combination of a light source providing a narrow line of light extending transversely of said paths and of sufficient length to extend substantially across each of them, means for effecting uniform relative speeds between said blank and said narrow line of light, means for varying the intensity of the light at said line to vary the exposure at different points along any of said paths to produce thereon, when said blank is developed, a pattern of uniform opacity across the same but varying in opacity along the same, and means for rendering said line of light effective at any of said paths at one time.

146. Apparatus for producing sound-controlling patterns along narrow paths of a photographic sensitized transparent blank, including a light source providing a narrow line of light extending transversely of said paths and of sufficient length to extend across one of said paths, a shutter mounted for movement back and forth along said line to vary the width of the exposed part of the corresponding path, adjustable means for positioning said light source to render said line of light effective on different paths, and means for imparting to said shutter a movement characteristic of the sound to be produced by the corresponding graphs.

147. In apparatus for making sound-controlling patterns, the combinations of means for rotating a primary wave form patterns, means for causing said primary pattern to control a recording device, means for effecting a relative movement between said recording device and a pattern blank, and means for recording in a path on said blank a pattern of wave forms corresponding with said primary pattern.

148. In apparatus for making a sound-controlling pattern, the combination of a primary wave form pattern, means for effecting a relative movement between said primary pattern and a pattern blank, means for recording on said blank a pattern of wave forms corresponding with said primary pattern, and means for regulating the amplitude and wave length of said wave forms.

149. Apparatus for making a light-controlling sound record, which includes a primary waveform pattern, a light-sensitive blank and means for utilizing said pattern to control the recording on said blank of a continuous graph of identical wave-forms.

150. Apparatus for producing a light-controlling sound-record which includes a record blank, a primary wave-form pattern and means for utilizing said primary pattern in progressively recording on said blank a continuous light-controlling graph of identical wave-forms corresponding with the wave-form embodied in said primary pattern.

151. In apparatus for making a light-controlling sound record, the combination of a primary wave-form pattern, means for effecting relative movement between the said primary pattern and a record blank, and means for recording on said record blank during said relative movement a continuous light-controlling graph of identical wave-forms corresponding with the wave-form of said primary pattern.

152. In apparatus for making a sound-controlling record, the combination of a primary pattern embodying a sound-wave form, means for effecting relative movement between said primary pattern and a light-sensitive record blank, means for utilizing said primary pattern to cause light variations in light projected on said record blank, and means for progressively recording said light variations on said record blank.

153. In apparatus for making sound-controlling patterns, the combination of a primary wave form pattern, means for utilizing said primary pattern to vary the brightness of a source of light by varying the electric constants of the circuit in which the light source is connected, and means for progressively recording said light variations on a light-sensitive pattern blank.

154. In apparatus for making a light-controlling sound record, the combination of a light-sensitive blank, means for forming a line of light on said blank, means for effecting relative movement between said line of light and said blank, a primary wave-form pattern, means for utilizing said primary pattern to cause uniform light variations at said line of light, and means for progressively recording the said light variations as a continuous graph of identical wave-forms.

155. In apparatus for making a sound controlling record, the combination of a source of light, optical means operatively associated with said source of light for forming on a light-sensitive record blank a reduced image of a straight line of light, a primary pattern embodying a sound wave form, means for rotating the primary pattern with respect to the said image to cause light variations at said image, means for positioning the said image at the desired point on the record blank, and means for progressively recording the said light variations on the record blank including means for rotating the record blank at a speed having a fixed relation to the speed of rotation of the primary pattern.

156. Apparatus for producing circular graphs on a record blank, including means for rotating the record blank, means including a cam for producing a graph of wave-forms on the record blank as the blank is rotated, and means for determining the number of waves in a complete graph.

157. Apparatus for producing circular graphs on a record blank, including means for rotatably supporting the record blank, means for producing successive waves of a graph as the blank is rotated and including a cam, and means for varying the position of said graphs relative to the axis of rotation, and common driving means for said cam and said blank supporting means.

158. Apparatus for producing concentric graphs on a disk, including a rotatable support for the disk, means for producing successive waves of a graph as the support is rotated and including a cam and means for varying the position of said graphs relative to the center of rotation, driving means for said cam, and driving means for said rotatable support correlated with the cam driving means for maintaining the desired speed ratio between the cam and the support.

159. Apparatus for producing concentric graphs on a disk, including a rotatable support for the disk, means including a cam for producing successive waves of said graphs as the support is rotated, means for varying the amplitude of said waves, and an adjustable driving connection between said cam and said support for determining the number of waves in a complete graph.

160. Apparatus for producing a light-controlling sound-record, which includes a record blank, a primary wave-form pattern, and means for recording in a plurality of individual circular paths on said record blank a plurality of individual light-controlling graphs of wave-forms corresponding with the wave-form embodied in said primary pattern.

161. In apparatus for making a light-controlling sound record, the combination of a light-sensitive blank, means for forming a line of light on said blank, means for effecting relative movement between said line of light and said blank, a primary wave-form pattern, means for utilizing said primary pattern to cause light variations at said line of light and means for progressively recording the light variations as an individual wave-form graph representative of a note in a musical scale, and means for recording additional individual wave-forms graphs representative of the other notes in said musical scale.

162. In apparatus for making a sound-controlling record, the combination of an electric sound producer, means for modifying the current variations in said sound producer to develop a tone of desired quality, means for embodying on a record blank a pattern of a wave form corresponding with the tone ultimately determined, and means for regulating the wave length of said wave form.

163. In apparatus for making a sound-controlling record, the combination of a sound producer, means for varying the output of said sound producer to develop a tone of desired quality, means for generating electric current variations corresponding with the wave form of the tone ultimately determined, means for recording said current variations on a record blank as a pattern of corresponding wave forms, and means for regulating the wave length of said wave forms.

164. In apparatus for making a sound-controlling record, the combination of an electric sound producer, means for modifying the current variations in said sound producer to develop a tone of desired quality, means for embodying on a record blank a pattern of a wave form corresponding with the tone ultimately determined, and means for regulating the amplitude characteristics and wave length of said wave form.

165. In apparatus for making a sound-controlling record, the combination of a sound producer, means for varying the output of said sound producer to develop a tone of desired quality, means for generating electric current variations corresponding with the wave form of the tone ultimately determined, means for recording said current variations on a record blank as a pattern of corresponding wave forms, and means for regulating the amplitude characteristics and wave length of said wave forms.

166. In apparatus for making a sound-controlling record, the combination of means for sounding a composite musical tone, means for independently varying the partials of such a tone to develop a tone of desired quality, means for embodying on a record blank a pattern of a wave form corresponding with the tone ultimately determined, and means for regulating the wave length of said wave form.

167. In apparatus for making a sound-controlling record, the combination of means for sounding a composite musical tone, means for independently varying the partials of such a tone to develop a tone of desired quality, means for embodying on a record blank a pattern of a wave form corresponding with the tone ultimately determined, and means for regulating the amplitude characteristics and wave length of said wave form.

168. In apparatus for making a sound-controlling record, the combination of an electrical sound producer for sounding a composite musical tone, means for selectively varying the current in said sound producer to develop a composite tone of desired quality, means for combining in a composite wave the waves corresponding with the partials of the composite tone ultimately determined, and means for recording on a record blank a pattern of a wave form corresponding with the said composite wave.

169. In apparatus for making a sound-controlling record, the combination of an electric sound producer, means for varying the input current of said sound producer to simultaneously produce selected partial tones, means for varying the relative intensity factors and relative phases of said partials to develop a tone of desired quality, and means for recording on a record blank a pattern composed of wave forms adapted to vary correspondingly the input current of a similar sound producer to produce said desired tone without distortion.

170. In apparatus for making sound-controlling patterns, the combination of means for varying the input current of an electrical sound producer to overcome characteristic distortion thereof and to develop a tone of desired quality, and means for recording on a pattern blank a pattern of wave forms corresponding with said input current variations and adapted to control the production of the tone of desired quality without distortion by similarly varying the input current of a similar sound producer.

171. The combination of means for empirically producing electric current variations corresponding to a tone of desired quality, and means controlled by such electric current variations for producing a sound controlling pattern.

172. In apparatus for making a sound-controlling record, the combination of a mechanical synthesizer embodying a member moved in accordance to a composite curve determined by said synthesizer and representative of a composite musical tone, a recording device actuated by said synthesizer member in operative relation with a record blank, and means for progressively recording on said blank a pattern of said composite wave form including means for effecting a relative movement between said recording device and said record blank.

173. Apparatus for producing graphs in circular arrangement on a record blank, including means for rotating said blank, a tracer for tracing said graphs on said blank, means for actuating said tracer including a device for producing successive waves in accordance with the fundamental partial and selected overtone partials of a musical tone synthesized in accordance with predetermined intensities, and an adjustable driving connection between the blank-rotating means and such wave-producing device for determining the number of waves in a complete graph.

174. Apparatus for making a light-controlling sound record which includes means for synthesizing sinusoidal wave-forms with desired frequency and amplitude relationship, a record blank and means for recording the result of such synthesis on said record blank in the form of a light-controlling graph.

175. In apparatus for producing a sound-controlling pattern, the combination of means for varying light at a plurality of points in a manner which corresponds with the sinusoidal waves of simple partial tones of selected frequencies and relative intensities, means for converting the light variations at said plurality of points into composite light variations at a single point, and means for progressively recording said composite light variations on a light-sensitive pattern blank as a graph of composite wave forms.

176. In apparatus for making a light-controlling sound record, the combination of means for generating separate harmonic motions of desired frequencies and amplitudes, means for combining these harmonic motions into one composite motion, means for utilizing the composite motion to control light variations, and means for progressively recording said light variations on a record blank as a continuous graph of identical wave-forms.

177. Apparatus for producing a light controlling sound record including a mechanical synthesizer adapted to synthesize the wave-forms of partials of selected frequencies and amplitudes into a composite wave-form motion, means for utilizing said composite motion to control light variations, and means for recording said light variations on a record blank as a continuous graph of identical wave-forms.

178. The combination of means for moving a photographic blank along a fixed path, an electric lamp, means for exposing said blank to light from said lamp along a narrow line, and means operatively associated with the circuit of said lamp for varying the intensity of the light in accordance with the partials of a composite musical tone selected as to frequency and intensity.

179. The combination of means for exposing a photographic blank progressively along a path thereon to light from a narrow line transverse to said path, an electric circuit, means for effecting variations in said circuit in accordance with the partials of a composite musical tone selected as to frequency and intensity and means controlled by such current variations in said circuit for varying the light at said line.

180. In apparatus for making a sound-controlling record, the combination of a record blank, means for recording wave-forms in a continuous path on said blank, and means for effecting a shift of phase in the wave-forms in said path.

181. In apparatus for making a sound-controlling record, the combination of a record blank, means for recording wave-forms in a continuous path on said blank, and means for shifting the phase of the wave-forms during the recording process in order that the first and last wave-forms recorded may be substantially in phase.

182. In apparatus for making a sound-controlling record, the combination of a light-sensitive blank, a source of light, means for effecting relative movement between said blank and said source of light, means for varying the light from said source, means for recording the light variations as a continuous graph of wave-forms on said blank, and means for changing the speed of said relative movement during the recording of said graph to shift the phase of the wave-forms.

183. In apparatus for making a sound-controlling record, the combination of a record blank, a recording device, means for rotating said blank relative to said recording device, and means for recording on said blank a plurality of individual wave-form graphs representing the twelve notes comprised within the tempered scale octave, and means for shifting the phase of wave-forms being recorded in any of the graphs so that the first and last wave-forms recorded are substantially in phase.

184. In tone production apparatus, the combination of a sound producer, actuating means therefor governed by light rays, and means for varying the said light rays to determine the loudness of the tone produced, said means embodying a light wedge of graduated translucency mounted in operative relation with the light rays governing said actuating means and movable in respect to such light rays.

185. In apparatus for producing musical tones of desired quality, the combination of a sounding body, means to cause said sounding body to vibrate with a periodic motion which is the sum of a number of simple pendular vibrations corresponding with selected partial tones, and means for gradually and independently varying the relative amplitudes of such pendular vibrations to produce a tone of desired quality.

186. Apparatus controllable by graphs of a fundamental tone and its harmonic overtones to produce the corresponding sounds or partial tones and including means for independently varying the intensities of said partial tones to produce the desired tone quality.

187. In apparatus for producing musical tones, the combination of means for simultaneously producing selected partial tones by converting light variations into sound, and means for varying the relative intensities of said partials.

188. An apparatus for producing musical tones which includes means for converting light variations into electric current variations, means for converting electric current variations into sound, means for controlling said light variations to produce a fundamental tone and selected overtones and to vary independently the relative intensities of such partials.

189. The combination with a photo-electric cell and sound-producing means controlled thereby, of a light-controlling graph adapted to control said cell to produce the fundamental partial of a tone and corresponding harmonic overtones, and means for selectively controlling the passage of light to different parts of said photo-electric cell to vary the intensities of said partial tones and thereby to produce the desired tone quality.

190. Apparatus for producing music, including a light-sensitive device, sound producing means controlled thereby, a record adjacent to said device and having sound record bands adapted to transmit light to said light-sensitive device so as to combine fundamental tones and overtones in said sound producing means, a source of light adjacent to the light-sensitive device but separated therefrom by the record, and light controlling means between the light and the light-sensitive element for varying the light falling on different sound record bands to vary the intensities of the corresponding tones and overtones to give the desired tone quality.

191. In apparatus for producing musical tones, the combination of a light-controlling sound record comprising a plurality of continuous patterns of wave forms of sinusoidal waves respectively representing selected partial tones, a source of light, means operatively associated with said source of light for forming on the said sound record a reduced image of a line of light, means for effecting a relative movement between said record and said image to effect light variations, and means for converting said light variations into sound.

192. In apparatus for producing musical tones, the combination of a light-controlling sound record comprising individual wave-form graphs adapted to control the production of tones of different pitch, said graphs being recorded in separate paths on the record and each path being completely modulated by the wave-forms embodied in the graph, means for utilizing said record to control light variations, and means for converting said light variations into sound.

193. The combination of a sound producer including an electric circuit through which the same is operated and a light-sensitive device in said circuit, means for playing said sound producer including a record having light controlling graphs in concentric circles thereon each graph being adapted to control the production of a musical tone with uniformity of tone quality, a plurality of lights, one for each graph, and means for varying individually the amount of light emitted from said lamps.

194. In apparatus for producing musical tones, the combination of a light-controlling sound pattern, a source of light, means operatively associated with said source of light for forming on the said pattern a reduced image of a straight narrow line of light, means for effecting a relative movement between said pattern and said image to cause light variations, means for interrupting and varying the light at said image, and means for converting such light variations into sound.

195. In apparatus for producing musical tones, the combination of a light-controlling sound record comprising a plurality of individual patterns of wave-forms respectively representing selected musical tones, a source of light, means operatively associated with said source of light for forming on the said sound record at predetermined points a reduced image of a straight narrow line of light, means for selectively controlling the position of said image on said sound record, means for rotating said record to effect light variations, means for converting said light variations into sound, and means for otherwise varying the volume of said sound.

196. The combination of a pattern member having thereon in generally circular arrangement forms adapted for use in effecting variations in light, means for supplying light to pass through said forms, shielding means between such light-supplying means and said pattern member except along light-transmitting line sections extending across said forms, a light sensitive device at the side of the pattern member opposite the light-supplying means to receive light transmitted at said line sections, a sound producer including a circuit controlled by said light-sensitive device, and members movable transversely of said light-transmitting line sections and serving to control the passage of light therethrough.

197. In combination with an instrument for producing sound in accordance with a sound pattern, a photographically produced sound pattern controlling said instrument and counteracting distortion characteristics of the said instrument to produce a tone of desired quality.

198. The combination of sound producing means possessing a distortion characteristic and actuable in accordance with patterns, tone patterns corresponding to the tones of a musical scale and adapted to compensate for distortion of sound by the sound producing means, and means for selectively inducing actuation of the sound producing means in accordance with said tone patterns.

199. In apparatus for producing musical tones, the combination of a light-controlling sound record comprising separate individual light-controlling graphs of wave-forms representing the twelve tones of the tempered scale octave, the successive wave-forms in each graph being substantially in phase to assure continuity of tone quality in tone production, means for utilizing said graphs to cause light variations, and means for converting said light variations into sound.

200. The combination of sound-producing means including light-sentitive means for controlling the same, photographic patterns corresponding to and adapted to control the production of the tones of a musical scale with uniformity of tone quality, means for effecting relative movement between said patterns and said light-sensitive means, lighting means adjacent to said patterns on the opposite side thereof from said light-sensitive means and including electric lamps individual to said patterns, means for forming a narrow line of light across each of said patterns, a keyboard, circuits individual to said lamps, switches in said circuits under the control of the individual keys of said keyboard for opening and closing said circuits.

201. The combination of sound producing means including light-sensitive means for controlling the same, photographic patterns corresponding to the tones of a musical scale, means for effecting relative movement between said patterns and said light-sensitive means, a light source adjacent to said patterns on the opposite side thereof from said light sensitive means and including electric lamps individual to said patterns, a keyboard, circuits individual to said lamps, switches in said circuits for opening and closing the same selectively operable by the keys, and variable resistance means for controlling the intensity of the sound produced.

202. In apparatus for producing musical tones the combination of a light-controlling sound record comprising individual wave-form graphs adapted to control the production of tones of different pitch, said graphs being recorded in separate paths on the record and each path being completely modulated by the wave-forms embodied in the graph, a source of light, means for rotating said record with respect to said source of light to cause light variations, means for automatically determining the graphs of the sound record to be illuminated by the said source of light, and means for converting the resultant light variations into sound.

203. In combination, a sound-controlling record comprising a plurality of graphs of empirically determined wave forms respectively representing selected composite musical tones of desired quality, means for effecting a relative movement between said record and a sound producer, and means for selectively producing said tones.

204. In combination, a source of light, a light-controlling sound record comprising a plurality of graphs of empirically determined wave forms respectively representing selected composite musical tones, means for rotating said record with respect to said source of light to cause light variations, means for converting said light variations into sound, and means for selectively producing said musical tones singly and in combination.

205. In apparatus for producing musical tones, the combination of an electrically-operated sound producer, a record comprising a plurality of graphs of wave forms respectively representing selected composite musical tones, said wave-forms having been empirically determined so as to correct the frequency distortion of said sound producer, means for rotating said record relative to said sound producer, and means for selectively producing said musical tones singly or in combination.

206. In combination, a sound-producer, a source of light, a light-controlling sound record comprising a plurality of patterns of wave-forms respectively representing selected composite musical tones, said wave-forms having been empirically determined so as to correct the frequency distortion of said sound producer, means for rotating said record with respect to said source of light to cause light variations, means in said sound producer for converting said light variations into sound, and means for selectively producing the desired tones singly and in combination.

207. In apparatus for producing musical tones of desired quality, the combination of means for sounding a composite musical tone, and means for independently varying the relative intensities of the component partials of said composite musical tone.

208. The combination of a light-sensitive device, an electrically operated sound producer including a circuit controlled by said light-sensitive device, a source of light, a pattern member to control the passage of light from said source of light to said light-sensitive device and comprising graphs of wave-forms representative of composite tones and having such characteristics as to result in tone production substantially free from distortion, shielding means shutting off light from said pattern member but admitting a line of light to each of said graphs transversely thereof, and means for controlling the admission of light to said graphs in the selected order and combination of a musical composition.

209. The combination of a light-sensitive device, an electrically operated sound producer including a circuit controlled by said light-sensitive device, a source of light, a pattern member to control the passage of light from said source of light to said light-sensitive device, and comprising graphs of wave-forms representative of composite tones and having such characteristics as to result in tone production substantially free from distortion, shielding means shutting off light from said pattern member but admitting a line of light to each of said graphs transversely thereof, shutters controlling the passage of light through the different graphs, and means for selectively operating said shutters.

210. In apparatus for tone synthesis and analysis, the combination of means for sounding a composite musical tone, means for independently varying the relative intensities of the component partials of said composite musical tone, and means for determining the relative intensity factors of the said component partials.

211. In apparatus for tone synthesis and analysis, the combination of means for varying light, means for converting such light variations into the simultaneous sounding of selected partial tones, means for empirically varying the relative intensities of said partials to produce a composite tone of desired quality, and means for determining the relative intensity factors of said partials.

212. In apparatus for tone synthesis and analysis, the combination of a light-controlling sound record comprising a plurality of continuous graphs of wave-forms of sinusoidal waves representing respectively selected partial tones, means for varying light with said record to produce said partial tones, means for varying the relative intensities of said partials, and means for determining the amplitude characteristics of the light variations controlling the intensity of each of the partials.

DU VAL R. GOLDTHWAITE.